(12) United States Patent
Levanon et al.

(10) Patent No.: US 11,707,943 B2
(45) Date of Patent: Jul. 25, 2023

(54) METHOD AND APPARATUS FOR DIGITAL PRINTING

(71) Applicant: LANDA CORPORATION LTD., Rehovot (IL)

(72) Inventors: Moshe Levanon, Rehovot (IL); Tal Shimony-Cohen, Nes Ziona (IL); Yelena Yusupov, Holon (IL); Natalia Zlotnikov, Rehovot (IL)

(73) Assignee: LANDA CORPORATION LTD., Rehovot (IL)

( * ) Notice: Subject to any disclaimer, the term of this patent is extended or adjusted under 35 U.S.C. 154(b) by 377 days.

(21) Appl. No.: 16/767,631

(22) PCT Filed: May 12, 2018

(86) PCT No.: PCT/IB2018/059686
§ 371 (c)(1),
(2) Date: May 28, 2020

(87) PCT Pub. No.: WO2019/111187
PCT Pub. Date: Jun. 13, 2019

(65) Prior Publication Data
US 2021/0070083 A1    Mar. 11, 2021

Related U.S. Application Data

(60) Provisional application No. 62/595,593, filed on Dec. 7, 2017, provisional application No. 62/595,582, filed on Dec. 6, 2017.

(51) Int. Cl.
*B41M 5/025* (2006.01)
*B41M 5/00* (2006.01)
(Continued)

(52) U.S. Cl.
CPC .............. *B41M 5/0256* (2013.01); *B41J 2/01* (2013.01); *B41J 2/2114* (2013.01);
(Continued)

(58) Field of Classification Search
CPC .. B41M 5/0256; B41M 5/0023; B41M 7/009; B41M 5/03; B41M 5/0011;
(Continued)

(56) References Cited

U.S. PATENT DOCUMENTS 2,839,181 A    6/1958 Renner
3,011,545 A    12/1961 Welsh et al.
(Continued)

FOREIGN PATENT DOCUMENTS

CN    1121033 A    4/1996
CN    1200085 A    11/1998
(Continued)

OTHER PUBLICATIONS

CN101592896A Machine Translation (by EPO and Google)—published Dec. 2, 2009; Canon KK.
(Continued)

*Primary Examiner* — Manish S Shah
(74) *Attorney, Agent, or Firm* — Momentum IP; Marc Van Dyke

(57) ABSTRACT

A method of indirect digital printing is disclosed herein. The method employs (i) first (e.g. transparent) and second aqueous ink components (comprising colorant particles) and (ii) a target surface (e.g. hydrophobic) of an intermediate transfer member (ITM). A quantity of first ink component is deposited (e.g. by ink-jetting) onto the target surface and partially dried to produce a partially-dried layer thereon. Droplets of the second ink component are deposited onto the partially-dried layer of first ink component to form a wet, colored ink-image. Upon deposition of the droplets of the
(Continued)

second ink component, the colorant particles from the second component penetrate into the partially-dried layer of the first ink component. The wet, colored image is dried into a tacky ink-image-bearing residue film which is transferred to the substrate. Physical and/or chemical properties of the first and second ink components as provided by various embodiments are disclosed herein.

27 Claims, 19 Drawing Sheets

(51) Int. Cl.
    *B41M 7/00*       (2006.01)
    *C09D 11/107*     (2014.01)
    *C09D 11/322*     (2014.01)
    *C09D 11/40*      (2014.01)
    *B41J 2/01*        (2006.01)
    *B41J 2/21*        (2006.01)
    *B41M 5/03*       (2006.01)

(52) U.S. Cl.
    CPC .......... *B41M 5/0023* (2013.01); *B41M 7/009* (2013.01); *C09D 11/107* (2013.01); *C09D 11/322* (2013.01); *C09D 11/40* (2013.01); *B41J 2002/012* (2013.01); *B41M 5/03* (2013.01)

(58) Field of Classification Search
    CPC .... B41M 5/0017; B41M 5/0047; B41M 7/00; B41M 7/0072; B41M 5/52; B41M 5/5218; B41M 5/5227; B41J 2/01; B41J 2/2114; B41J 2002/012; B41J 2/0057; B41J 2/1433; B41J 2/2107; B41J 29/17; B41J 2/211; B41J 2/17; B41J 2/17593; B41J 2/1755; B41J 2/2117; B41J 2/2056; B41J 2/21; B41J 3/60; B41J 2/04598; B41J 2/04588; B41J 2/04595; B41J 2/04586; B41J 2/14274; B41J 29/02; B41J 2/17513; B41J 2/17509; B41J 29/13; B41J 2/17553; B41J 2/1606; B41J 2/1642; B41J 2/1609; B41J 2/164; B41J 2/162; B41J 2/161; B41J 2/19; B41J 15/04; C09D 11/107; C09D 11/322; C09D 11/40; C09D 7/40; C09D 7/65; C09D 129/04; C09D 11/36; C09D 11/30; C09D 11/38; C09D 11/32; C09D 11/324; C09D 11/328; C09D 11/101; C09D 11/102; C09D 11/005; C09D 11/54; C09D 11/52; C09D 11/106; B41N 10/00

See application file for complete search history.

(56) References Cited

U.S. PATENT DOCUMENTS

| | | |
|---|---|---|
| 3,053,319 A | 9/1962 | Cronin et al. |
| 3,697,551 A | 10/1972 | Thomson |
| 3,697,568 A | 10/1972 | Boissieras et al. |
| 3,889,802 A | 6/1975 | Jonkers |
| 3,898,670 A | 8/1975 | Erikson et al. |
| 3,935,055 A | 1/1976 | Carmien |
| 3,947,113 A | 3/1976 | Buchan et al. |
| 4,009,958 A | 3/1977 | Kurita et al. |
| 4,093,764 A | 6/1978 | Duckett et al. |
| 4,204,471 A | 5/1980 | Becker |
| 4,293,866 A | 10/1981 | Takita et al. |
| 4,401,500 A | 8/1983 | Hamada et al. |
| 4,520,048 A | 5/1985 | Ranger |
| 4,535,694 A | 8/1985 | Fukuda |
| 4,538,156 A | 8/1985 | Durkee et al. |
| 4,555,437 A | 11/1985 | Tanck |
| 4,575,465 A | 3/1986 | Viola |
| 4,586,807 A | 5/1986 | Yuasa |
| 4,642,654 A | 2/1987 | Toganoh et al. |
| 4,792,473 A | 12/1988 | Vitale |
| 4,853,737 A | 8/1989 | Hartley et al. |
| 4,867,830 A | 9/1989 | Chung |
| 4,976,197 A | 12/1990 | Yamanari et al. |
| 5,012,072 A | 4/1991 | Martin et al. |
| 5,039,339 A | 8/1991 | Phan et al. |
| 5,062,364 A | 11/1991 | Lewis et al. |
| 5,075,731 A | 12/1991 | Kamimura et al. |
| 5,099,256 A | 3/1992 | Anderson |
| 5,106,417 A | 4/1992 | Hauser et al. |
| 5,128,091 A | 7/1992 | Agur et al. |
| 5,190,582 A | 3/1993 | Shinozuka et al. |
| 5,198,835 A | 3/1993 | Ando et al. |
| 5,246,100 A | 9/1993 | Stone et al. |
| 5,264,904 A | 11/1993 | Audi et al. |
| 5,305,099 A | 4/1994 | Morcos |
| 5,320,214 A | 6/1994 | Kordis |
| 5,333,771 A | 8/1994 | Cesario |
| 5,349,905 A | 9/1994 | Taylor et al. |
| 5,352,507 A | 10/1994 | Bresson et al. |
| 5,365,324 A | 11/1994 | Gu et al. |
| 5,406,884 A | 4/1995 | Okuda et al. |
| 5,471,233 A | 11/1995 | Okamoto et al. |
| 5,532,314 A | 7/1996 | Sexsmith |
| 5,552,875 A | 9/1996 | Sagiv et al. |
| 5,575,873 A | 11/1996 | Pieper et al. |
| 5,587,779 A | 12/1996 | Heeren et al. |
| 5,608,004 A | 3/1997 | Toyoda et al. |
| 5,613,669 A | 3/1997 | Grueninger |
| 5,614,933 A | 3/1997 | Hindman et al. |
| 5,623,296 A | 4/1997 | Fujino et al. |
| 5,642,141 A | 6/1997 | Hale et al. |
| 5,660,108 A | 8/1997 | Pensavecchia |
| 5,677,719 A | 10/1997 | Granzow |
| 5,679,463 A | 10/1997 | Visser et al. |
| 5,683,841 A | 11/1997 | Kato |
| 5,698,018 A | 12/1997 | Bishop et al. |
| 5,723,242 A | 3/1998 | Woo et al. |
| 5,733,698 A | 3/1998 | Lehman et al. |
| 5,736,250 A | 4/1998 | Heeks et al. |
| 5,772,746 A | 6/1998 | Sawada et al. |
| 5,777,576 A | 7/1998 | Zur et al. |
| 5,777,650 A | 7/1998 | Blank |
| 5,780,412 A | 7/1998 | Scarborough et al. |
| 5,841,456 A | 11/1998 | Takei et al. |
| 5,859,076 A | 1/1999 | Kozma et al. |
| 5,865,299 A | 2/1999 | Williams |
| 5,880,214 A | 3/1999 | Okuda |
| 5,883,144 A | 3/1999 | Bambara et al. |
| 5,883,145 A | 3/1999 | Hurley et al. |
| 5,884,559 A | 3/1999 | Okubo et al. |
| 5,889,534 A | 3/1999 | Johnson et al. |
| 5,891,934 A | 4/1999 | Moffatt et al. |
| 5,895,711 A | 4/1999 | Yamaki et al. |
| 5,902,841 A | 5/1999 | Jaeger et al. |
| 5,923,929 A | 7/1999 | Ben et al. |
| 5,929,129 A | 7/1999 | Feichtinger |
| 5,932,659 A | 8/1999 | Bambara et al. |
| 5,935,751 A | 8/1999 | Matsuoka et al. |
| 5,978,631 A | 11/1999 | Lee |
| 5,978,638 A | 11/1999 | Tanaka et al. |
| 5,991,590 A | 11/1999 | Chang et al. |
| 6,004,647 A | 12/1999 | Bambara et al. |
| 6,009,284 A | 12/1999 | Weinberger et al. |
| 6,024,018 A | 2/2000 | Darel et al. |
| 6,024,786 A | 2/2000 | Gore |
| 6,033,049 A | 3/2000 | Fukuda |
| 6,045,817 A | 4/2000 | Ananthapadmanabhan et al. |
| 6,053,438 A | 4/2000 | Romano, Jr. et al. |
| 6,055,396 A | 4/2000 | Pang |
| 6,059,407 A | 5/2000 | Komatsu et al. |
| 6,071,368 A | 6/2000 | Boyd et al. |
| 6,072,976 A | 6/2000 | Kuriyama et al. |
| 6,078,775 A | 6/2000 | Arai et al. |

(56) References Cited

U.S. PATENT DOCUMENTS

| | | |
|---|---|---|
| 6,094,558 A | 7/2000 | Shimizu et al. |
| 6,102,538 A | 8/2000 | Ochi et al. |
| 6,103,775 A | 8/2000 | Bambara et al. |
| 6,108,513 A | 8/2000 | Landa et al. |
| 6,109,746 A | 8/2000 | Jeanmaire et al. |
| 6,132,541 A | 10/2000 | Heaton |
| 6,143,807 A | 11/2000 | Lin et al. |
| 6,166,105 A | 12/2000 | Santilli et al. |
| 6,195,112 B1 | 2/2001 | Fassler et al. |
| 6,196,674 B1 | 3/2001 | Takemoto |
| 6,213,580 B1 | 4/2001 | Segerstrom et al. |
| 6,214,894 B1 | 4/2001 | Bambara et al. |
| 6,221,928 B1 | 4/2001 | Kozma et al. |
| 6,234,625 B1 | 5/2001 | Wen |
| 6,242,503 B1 | 6/2001 | Kozma et al. |
| 6,257,716 B1 | 7/2001 | Yanagawa et al. |
| 6,261,688 B1 | 7/2001 | Kaplan et al. |
| 6,262,137 B1 | 7/2001 | Kozma et al. |
| 6,262,207 B1 | 7/2001 | Rao et al. |
| 6,303,215 B1 | 10/2001 | Sonobe et al. |
| 6,316,512 B1 | 11/2001 | Bambara et al. |
| 6,318,853 B1 | 11/2001 | Asano et al. |
| 6,332,943 B1 | 12/2001 | Herrmann et al. |
| 6,335,046 B1 | 1/2002 | Mackey |
| 6,354,700 B1 | 3/2002 | Roth |
| 6,357,869 B1 | 3/2002 | Rasmussen et al. |
| 6,357,870 B1 | 3/2002 | Beach et al. |
| 6,358,660 B1 | 3/2002 | Agler et al. |
| 6,363,234 B2 | 3/2002 | Landa et al. |
| 6,364,451 B1 | 4/2002 | Silverbrook |
| 6,377,772 B1 | 4/2002 | Chowdry et al. |
| 6,383,278 B1 | 5/2002 | Hirasa et al. |
| 6,386,697 B1 | 5/2002 | Yamamoto et al. |
| 6,390,617 B1 | 5/2002 | Iwao |
| 6,396,528 B1 | 5/2002 | Yanagawa |
| 6,397,034 B1 | 5/2002 | Tarnawskyj et al. |
| 6,400,913 B1 | 6/2002 | De et al. |
| 6,402,317 B2 | 6/2002 | Yanagawa et al. |
| 6,405,006 B1 | 6/2002 | Tabuchi |
| 6,409,331 B1 | 6/2002 | Gelbart |
| 6,432,501 B1 | 8/2002 | Yang et al. |
| 6,438,352 B1 | 8/2002 | Landa et al. |
| 6,454,378 B1 | 9/2002 | Silverbrook et al. |
| 6,471,803 B1 | 10/2002 | Pelland et al. |
| 6,530,321 B2 | 3/2003 | Andrew et al. |
| 6,530,657 B2 | 3/2003 | Polierer |
| 6,531,520 B1 | 3/2003 | Bambara et al. |
| 6,551,394 B2 | 4/2003 | Hirasa et al. |
| 6,551,716 B1 | 4/2003 | Landa et al. |
| 6,554,189 B1 | 4/2003 | Good et al. |
| 6,559,969 B1 | 5/2003 | Lapstun |
| 6,575,547 B2 | 6/2003 | Sakuma |
| 6,586,100 B1 | 7/2003 | Pickering et al. |
| 6,590,012 B2 | 7/2003 | Miyabayashi |
| 6,608,979 B1 | 8/2003 | Landa et al. |
| 6,623,817 B1 | 9/2003 | Yang et al. |
| 6,630,047 B2 | 10/2003 | Jing et al. |
| 6,633,735 B2 | 10/2003 | Kellie et al. |
| 6,639,527 B2 | 10/2003 | Johnson |
| 6,648,468 B2 | 11/2003 | Shinkoda et al. |
| 6,678,068 B1 | 1/2004 | Richter et al. |
| 6,682,189 B2 | 1/2004 | May et al. |
| 6,685,769 B1 | 2/2004 | Karl et al. |
| 6,704,535 B2 | 3/2004 | Kobayashi et al. |
| 6,709,096 B1 | 3/2004 | Beach et al. |
| 6,716,562 B2 | 4/2004 | Uehara et al. |
| 6,719,423 B2 | 4/2004 | Chowdry et al. |
| 6,720,367 B2 | 4/2004 | Taniguchi et al. |
| 6,755,519 B2 | 6/2004 | Gelbart et al. |
| 6,761,446 B2 | 7/2004 | Chowdry et al. |
| 6,770,331 B1 | 8/2004 | Mielke et al. |
| 6,789,887 B2 | 9/2004 | Yang et al. |
| 6,811,840 B1 | 11/2004 | Cross |
| 6,827,018 B1 | 12/2004 | Hartmann et al. |
| 6,881,458 B2 | 4/2005 | Ludwig et al. |
| 6,898,403 B2 | 5/2005 | Baker et al. |
| 6,912,952 B1 | 7/2005 | Landa et al. |
| 6,916,862 B2 | 7/2005 | Ota et al. |
| 6,917,437 B1 | 7/2005 | Myers et al. |
| 6,966,712 B2 | 11/2005 | Trelewicz et al. |
| 6,970,674 B2 | 11/2005 | Sato et al. |
| 6,974,022 B2 | 12/2005 | Saeki |
| 6,982,799 B2 | 1/2006 | Lapstun |
| 6,983,692 B2 | 1/2006 | Beauchamp et al. |
| 7,025,453 B2 | 4/2006 | Ylitalo et al. |
| 7,057,760 B2 | 6/2006 | Lapstun et al. |
| 7,084,202 B2 | 8/2006 | Pickering et al. |
| 7,128,412 B2 | 10/2006 | King et al. |
| 7,129,858 B2 | 10/2006 | Ferran et al. |
| 7,134,953 B2 | 11/2006 | Reinke |
| 7,160,377 B2 | 1/2007 | Zoch et al. |
| 7,204,584 B2 | 4/2007 | Lean et al. |
| 7,213,900 B2 | 5/2007 | Ebihara |
| 7,224,478 B1 | 5/2007 | Lapstun et al. |
| 7,265,819 B2 | 9/2007 | Raney |
| 7,271,213 B2 | 9/2007 | Hoshida et al. |
| 7,296,882 B2 | 11/2007 | Buehler et al. |
| 7,300,133 B1 | 11/2007 | Folkins et al. |
| 7,300,147 B2 | 11/2007 | Johnson |
| 7,304,753 B1 | 12/2007 | Richter et al. |
| 7,322,689 B2 | 1/2008 | Kohne et al. |
| 7,334,520 B2 | 2/2008 | Geissler et al. |
| 7,348,368 B2 | 3/2008 | Kakiuchi et al. |
| 7,360,887 B2 | 4/2008 | Konno |
| 7,362,464 B2 | 4/2008 | Kitazawa |
| 7,419,257 B2 | 9/2008 | Mouri et al. |
| 7,459,491 B2 | 12/2008 | Tyvoll et al. |
| 7,527,359 B2 | 5/2009 | Stevenson et al. |
| 7,575,314 B2 | 8/2009 | Desie et al. |
| 7,612,125 B2 | 11/2009 | Muller et al. |
| 7,655,707 B2 | 2/2010 | Ma |
| 7,655,708 B2 | 2/2010 | House et al. |
| 7,699,922 B2 | 4/2010 | Breton et al. |
| 7,708,371 B2 | 5/2010 | Yamanobe |
| 7,709,074 B2 | 5/2010 | Uchida et al. |
| 7,712,890 B2 | 5/2010 | Yahiro |
| 7,732,543 B2 | 6/2010 | Loch et al. |
| 7,732,583 B2 | 6/2010 | Annoura et al. |
| 7,808,670 B2 | 10/2010 | Lapstun et al. |
| 7,810,922 B2 | 10/2010 | Gervasi et al. |
| 7,845,788 B2 | 12/2010 | Oku |
| 7,867,327 B2 | 1/2011 | Sano et al. |
| 7,876,345 B2 | 1/2011 | Houjou |
| 7,910,183 B2 | 3/2011 | Wu |
| 7,919,544 B2 | 4/2011 | Matsuyama et al. |
| 7,942,516 B2 | 5/2011 | Ohara et al. |
| 7,977,408 B2 | 7/2011 | Matsuyama et al. |
| 7,985,784 B2 | 7/2011 | Kanaya et al. |
| 8,002,400 B2 | 8/2011 | Kibayashi et al. |
| 8,012,538 B2 | 9/2011 | Yokouchi |
| 8,025,389 B2 | 9/2011 | Yamanobe et al. |
| 8,038,284 B2 | 10/2011 | Hori et al. |
| 8,041,275 B2 | 10/2011 | Soria et al. |
| 8,042,906 B2 | 10/2011 | Chiwata et al. |
| 8,059,309 B2 | 11/2011 | Lapstun et al. |
| 8,095,054 B2 | 1/2012 | Nakamura |
| 8,109,595 B2 | 2/2012 | Tanaka et al. |
| 8,119,315 B1 | 2/2012 | Heuft et al. |
| 8,122,846 B2 | 2/2012 | Stiblert et al. |
| 8,147,055 B2 | 4/2012 | Cellura et al. |
| 8,162,428 B2 | 4/2012 | Eun et al. |
| 8,177,351 B2 | 5/2012 | Taniuchi et al. |
| 8,186,820 B2 | 5/2012 | Chiwata |
| 8,192,904 B2 | 6/2012 | Nagai et al. |
| 8,215,762 B2 | 7/2012 | Ageishi |
| 8,242,201 B2 | 8/2012 | Goto et al. |
| 8,256,857 B2 | 9/2012 | Folkins et al. |
| 8,263,683 B2 | 9/2012 | Gibson et al. |
| 8,264,135 B2 | 9/2012 | Ozolins et al. |
| 8,295,733 B2 | 10/2012 | Imoto |
| 8,303,071 B2 | 11/2012 | Eun |
| 8,303,072 B2 | 11/2012 | Shibata et al. |
| 8,304,043 B2 | 11/2012 | Nagashima et al. |
| 8,353,589 B2 | 1/2013 | Ikeda et al. |

(56) References Cited

U.S. PATENT DOCUMENTS

| | | |
|---|---|---|
| 8,362,108 B2 | 1/2013 | Imai |
| 8,434,847 B2 | 5/2013 | Dejong et al. |
| 8,460,450 B2 | 6/2013 | Taverizatshy et al. |
| 8,469,476 B2 | 6/2013 | Mandel et al. |
| 8,474,963 B2 | 7/2013 | Hasegawa et al. |
| 8,536,268 B2 | 9/2013 | Karjala et al. |
| 8,546,466 B2 | 10/2013 | Yamashita et al. |
| 8,556,400 B2 | 10/2013 | Yatake et al. |
| 8,632,147 B2 | 1/2014 | Onishi |
| 8,693,032 B2 | 4/2014 | Goddard et al. |
| 8,711,304 B2 | 4/2014 | Mathew et al. |
| 8,714,731 B2 | 5/2014 | Leung et al. |
| 8,746,873 B2 | 6/2014 | Tsukamoto et al. |
| 8,779,027 B2 | 7/2014 | Idemura et al. |
| 8,802,221 B2 | 8/2014 | Noguchi et al. |
| 8,867,097 B2 | 10/2014 | Mizuno |
| 8,885,218 B2 | 11/2014 | Hirose |
| 8,891,128 B2 | 11/2014 | Yamazaki |
| 8,894,198 B2 | 11/2014 | Hook et al. |
| 8,919,946 B2 | 12/2014 | Suzuki et al. |
| 8,939,573 B2 | 1/2015 | Kanasugi et al. |
| 9,004,629 B2 | 4/2015 | De et al. |
| 9,044,932 B2 | 6/2015 | Ohnishi et al. |
| 9,186,884 B2 | 11/2015 | Landa et al. |
| 9,207,585 B2 | 12/2015 | Hatano et al. |
| 9,227,429 B1 | 1/2016 | LeStrange et al. |
| 9,229,664 B2 | 1/2016 | Landa et al. |
| 9,264,559 B2 | 2/2016 | Motoyanagi et al. |
| 9,284,469 B2 | 3/2016 | Song et al. |
| 9,290,016 B2 | 3/2016 | Landa et al. |
| 9,327,496 B2 | 5/2016 | Landa et al. |
| 9,327,519 B1 | 5/2016 | Larson et al. |
| 9,353,273 B2 | 5/2016 | Landa et al. |
| 9,381,736 B2 | 7/2016 | Landa et al. |
| 9,446,586 B2 | 9/2016 | Matos et al. |
| 9,498,946 B2 | 11/2016 | Landa et al. |
| 9,505,208 B2 | 11/2016 | Shmaiser et al. |
| 9,517,618 B2 | 12/2016 | Landa et al. |
| 9,566,780 B2 | 2/2017 | Landa et al. |
| 9,568,862 B2 | 2/2017 | Shmaiser et al. |
| 9,573,361 B2 | 2/2017 | Tsuji et al. |
| 9,643,400 B2 | 5/2017 | Landa et al. |
| 9,643,403 B2 | 5/2017 | Landa et al. |
| 9,776,391 B2 | 10/2017 | Landa et al. |
| 9,782,993 B2 | 10/2017 | Landa et al. |
| 9,849,667 B2 | 12/2017 | Landa et al. |
| 9,884,479 B2 | 2/2018 | Landa et al. |
| 9,902,147 B2 | 2/2018 | Shmaiser et al. |
| 9,914,316 B2 | 3/2018 | Landa et al. |
| 9,969,182 B2 | 5/2018 | Torisaka et al. |
| 10,052,865 B2 | 8/2018 | Goto |
| 10,065,411 B2 | 9/2018 | Landa et al. |
| 10,175,613 B2 | 1/2019 | Watanabe |
| 10,179,447 B2 | 1/2019 | Shmaiser et al. |
| 10,190,012 B2 | 1/2019 | Landa et al. |
| 10,195,843 B2 | 2/2019 | Landa et al. |
| 10,201,968 B2 | 2/2019 | Landa et al. |
| 10,226,920 B2 | 3/2019 | Shmaiser et al. |
| 10,266,711 B2 | 4/2019 | Landa et al. |
| 10,300,690 B2 | 5/2019 | Landa et al. |
| 10,336,060 B2 | 7/2019 | Liu |
| 10,357,963 B2 | 7/2019 | Landa et al. |
| 10,357,985 B2 | 7/2019 | Landa et al. |
| 10,427,399 B2 | 10/2019 | Shmaiser et al. |
| 10,434,761 B2 | 10/2019 | Landa et al. |
| 10,477,188 B2 | 11/2019 | Stiglic et al. |
| 10,518,526 B2 | 12/2019 | Landa et al. |
| 10,569,532 B2 | 2/2020 | Shmaiser et al. |
| 10,569,533 B2 | 2/2020 | Shmaiser et al. |
| 10,569,534 B2 | 2/2020 | Shmaiser et al. |
| 10,576,734 B2 | 3/2020 | Landa et al. |
| 10,596,804 B2 | 3/2020 | Landa et al. |
| 10,632,740 B2 | 4/2020 | Landa et al. |
| 10,642,198 B2 | 5/2020 | Landa et al. |
| 10,703,093 B2 | 7/2020 | Karlinski et al. |
| 10,703,094 B2 | 7/2020 | Shmaiser et al. |
| 10,730,333 B2 | 8/2020 | Landa et al. |
| 10,759,953 B2 | 9/2020 | Landa et al. |
| 10,800,936 B2 | 10/2020 | Landa et al. |
| 10,828,888 B2 | 11/2020 | Landa et al. |
| 10,889,128 B2 | 1/2021 | Landa et al. |
| 10,926,532 B2 | 2/2021 | Chechik et al. |
| 10,933,661 B2 | 3/2021 | Landa et al. |
| 11,318,734 B2 | 5/2022 | Chechik et al. |
| 2001/0022607 A1 | 9/2001 | Takahashi et al. |
| 2001/0033688 A1 | 10/2001 | Taylor |
| 2002/0041317 A1 | 4/2002 | Kashiwazaki et al. |
| 2002/0061451 A1 | 5/2002 | Kita et al. |
| 2002/0064404 A1 | 5/2002 | Iwai |
| 2002/0102374 A1 | 8/2002 | Gervasi et al. |
| 2002/0121220 A1 | 9/2002 | Lin |
| 2002/0150408 A1 | 10/2002 | Mosher et al. |
| 2002/0164494 A1 | 11/2002 | Grant et al. |
| 2002/0197481 A1 | 12/2002 | Jing et al. |
| 2003/0004025 A1 | 1/2003 | Okuno et al. |
| 2003/0007055 A1 | 1/2003 | Ogawa |
| 2003/0018119 A1 | 1/2003 | Frenkel et al. |
| 2003/0030686 A1 | 2/2003 | Abe et al. |
| 2003/0032700 A1 | 2/2003 | Morrison et al. |
| 2003/0041777 A1 | 3/2003 | Karl et al. |
| 2003/0043258 A1 | 3/2003 | Kerr et al. |
| 2003/0054139 A1 | 3/2003 | Ylitalo et al. |
| 2003/0055129 A1 | 3/2003 | Alford |
| 2003/0063179 A1 | 4/2003 | Adachi |
| 2003/0064317 A1 | 4/2003 | Bailey et al. |
| 2003/0081964 A1 | 5/2003 | Shimura et al. |
| 2003/0103128 A1 | 6/2003 | Missell et al. |
| 2003/0118381 A1 | 6/2003 | Law et al. |
| 2003/0129435 A1 | 7/2003 | Blankenship et al. |
| 2003/0186147 A1 | 10/2003 | Pickering et al. |
| 2003/0214568 A1 | 11/2003 | Nishikawa et al. |
| 2003/0234849 A1 | 12/2003 | Pan et al. |
| 2004/0003863 A1 | 1/2004 | Eckhardt |
| 2004/0020382 A1 | 2/2004 | McLean et al. |
| 2004/0036758 A1 | 2/2004 | Sasaki et al. |
| 2004/0047666 A1 | 3/2004 | Imaizumi et al. |
| 2004/0087707 A1 | 5/2004 | Zoch et al. |
| 2004/0105971 A1 | 6/2004 | Parrinello et al. |
| 2004/0123761 A1 | 7/2004 | Szumla et al. |
| 2004/0125188 A1 | 7/2004 | Szumla et al. |
| 2004/0145643 A1 | 7/2004 | Nakamura |
| 2004/0173111 A1 | 9/2004 | Okuda |
| 2004/0177779 A1 | 9/2004 | Steffen et al. |
| 2004/0200369 A1 | 10/2004 | Brady |
| 2004/0221943 A1 | 11/2004 | Yu et al. |
| 2004/0228642 A1 | 11/2004 | Iida et al. |
| 2004/0246324 A1 | 12/2004 | Nakashima |
| 2004/0246326 A1 | 12/2004 | Dwyer et al. |
| 2004/0249327 A1 | 12/2004 | Sendijarevic et al. |
| 2004/0252175 A1 | 12/2004 | Bejat et al. |
| 2004/0265016 A1 | 12/2004 | Kitani et al. |
| 2005/0031807 A1 | 2/2005 | Quintens et al. |
| 2005/0082146 A1 | 4/2005 | Axmann |
| 2005/0103437 A1 | 5/2005 | Carroll |
| 2005/0110855 A1 | 5/2005 | Taniuchi et al. |
| 2005/0117859 A1 | 6/2005 | Suzuki et al. |
| 2005/0134874 A1 | 6/2005 | Overall et al. |
| 2005/0150408 A1 | 7/2005 | Hesterman |
| 2005/0185009 A1 | 8/2005 | Claramunt et al. |
| 2005/0195235 A1 | 9/2005 | Kitao |
| 2005/0235870 A1 | 10/2005 | Ishihara |
| 2005/0266332 A1 | 12/2005 | Pavlisko et al. |
| 2005/0272334 A1 | 12/2005 | Wang et al. |
| 2006/0004123 A1 | 1/2006 | Wu et al. |
| 2006/0066704 A1 | 3/2006 | Nishida |
| 2006/0120740 A1 | 6/2006 | Yamada et al. |
| 2006/0135709 A1 | 6/2006 | Hasegawa et al. |
| 2006/0164488 A1 | 7/2006 | Taniuchi et al. |
| 2006/0164489 A1 | 7/2006 | Vega et al. |
| 2006/0175559 A1 | 8/2006 | Fischer et al. |
| 2006/0192827 A1 | 8/2006 | Takada et al. |
| 2006/0233578 A1 | 10/2006 | Maki et al. |
| 2006/0286462 A1 | 12/2006 | Jackson et al. |
| 2007/0014595 A1 | 1/2007 | Kawagoe |

(56) References Cited

U.S. PATENT DOCUMENTS

| | | |
|---|---|---|
| 2007/0025740 A1 | 2/2007 | Katoh et al. |
| 2007/0025768 A1 | 2/2007 | Komatsu et al. |
| 2007/0029171 A1 | 2/2007 | Nemedi |
| 2007/0045939 A1 | 3/2007 | Toya et al. |
| 2007/0054981 A1 | 3/2007 | Yanagi et al. |
| 2007/0064077 A1 | 3/2007 | Konno |
| 2007/0077520 A1 | 4/2007 | Maemoto |
| 2007/0120927 A1 | 5/2007 | Snyder et al. |
| 2007/0123642 A1 | 5/2007 | Banning et al. |
| 2007/0134030 A1 | 6/2007 | Lior et al. |
| 2007/0144368 A1 | 6/2007 | Barazani et al. |
| 2007/0146462 A1 | 6/2007 | Taniuchi et al. |
| 2007/0147894 A1 | 6/2007 | Yokota et al. |
| 2007/0166071 A1 | 7/2007 | Shima |
| 2007/0176995 A1 | 8/2007 | Kadomatsu et al. |
| 2007/0189819 A1 | 8/2007 | Uehara et al. |
| 2007/0199457 A1 | 8/2007 | Cyman et al. |
| 2007/0229639 A1 | 10/2007 | Yahiro |
| 2007/0253726 A1 | 11/2007 | Kagawa |
| 2007/0257955 A1 | 11/2007 | Tanaka et al. |
| 2007/0285486 A1 | 12/2007 | Harris et al. |
| 2008/0006176 A1 | 1/2008 | Houjou |
| 2008/0030536 A1 | 2/2008 | Furukawa et al. |
| 2008/0032072 A1 | 2/2008 | Taniuchi et al. |
| 2008/0044587 A1 | 2/2008 | Maeno et al. |
| 2008/0055356 A1 | 3/2008 | Yamanobe |
| 2008/0055381 A1 | 3/2008 | Doi et al. |
| 2008/0066277 A1 | 3/2008 | Colson et al. |
| 2008/0074462 A1 | 3/2008 | Hirakawa |
| 2008/0101895 A1 | 5/2008 | Holcomb et al. |
| 2008/0112912 A1 | 5/2008 | Springob et al. |
| 2008/0124158 A1 | 5/2008 | Folkins |
| 2008/0138546 A1 | 6/2008 | Soria et al. |
| 2008/0166495 A1 | 7/2008 | Maeno et al. |
| 2008/0167185 A1 | 7/2008 | Hirota |
| 2008/0175612 A1 | 7/2008 | Oikawa et al. |
| 2008/0196612 A1 | 8/2008 | Rancourt et al. |
| 2008/0196621 A1 | 8/2008 | Ikuno et al. |
| 2008/0213548 A1 | 9/2008 | Koganehira et al. |
| 2008/0236480 A1 | 10/2008 | Furukawa et al. |
| 2008/0247780 A1 | 10/2008 | Hara |
| 2008/0253812 A1 | 10/2008 | Pearce et al. |
| 2008/0295724 A1 | 12/2008 | Lohweg et al. |
| 2009/0022504 A1 | 1/2009 | Kuwabara et al. |
| 2009/0041515 A1 | 2/2009 | Kim |
| 2009/0041932 A1 | 2/2009 | Ishizuka et al. |
| 2009/0064884 A1 | 3/2009 | Hook et al. |
| 2009/0073222 A1 | 3/2009 | Hori |
| 2009/0074492 A1 | 3/2009 | Ito |
| 2009/0082503 A1 | 3/2009 | Yanagi et al. |
| 2009/0087565 A1 | 4/2009 | Houjou |
| 2009/0098385 A1 | 4/2009 | Kaemper et al. |
| 2009/0116885 A1 | 5/2009 | Ando |
| 2009/0148200 A1 | 6/2009 | Hara et al. |
| 2009/0165937 A1 | 7/2009 | Inoue et al. |
| 2009/0185204 A1 | 7/2009 | Wu et al. |
| 2009/0190951 A1 | 7/2009 | Torimaru et al. |
| 2009/0202275 A1 | 8/2009 | Nishida et al. |
| 2009/0211490 A1 | 8/2009 | Ikuno et al. |
| 2009/0220873 A1 | 9/2009 | Enomoto et al. |
| 2009/0237479 A1* | 9/2009 | Yamashita ......... B41J 11/00214 347/102 |
| 2009/0256896 A1 | 10/2009 | Scarlata |
| 2009/0279170 A1 | 11/2009 | Miyazaki et al. |
| 2009/0315926 A1 | 12/2009 | Yamanobe |
| 2009/0317555 A1 | 12/2009 | Hori |
| 2009/0318591 A1* | 12/2009 | Ageishi .................. B41J 2/0057 118/620 |
| 2010/0012023 A1 | 1/2010 | Lefevre et al. |
| 2010/0035501 A1 | 2/2010 | Prudhomme et al. |
| 2010/0053292 A1 | 3/2010 | Thayer et al. |
| 2010/0053293 A1 | 3/2010 | Thayer et al. |
| 2010/0060703 A1* | 3/2010 | Ohara .................... B41J 2/0057 347/102 |
| 2010/0066796 A1 | 3/2010 | Yanagi et al. |
| 2010/0075843 A1 | 3/2010 | Ikuno et al. |
| 2010/0086692 A1 | 4/2010 | Ohta et al. |
| 2010/0091064 A1 | 4/2010 | Araki et al. |
| 2010/0123752 A1 | 5/2010 | Eun et al. |
| 2010/0225695 A1 | 9/2010 | Fujikura |
| 2010/0231623 A1 | 9/2010 | Hirato |
| 2010/0239789 A1 | 9/2010 | Umeda |
| 2010/0245511 A1 | 9/2010 | Ageishi |
| 2010/0247171 A1 | 9/2010 | Ono et al. |
| 2010/0282100 A1 | 11/2010 | Okuda et al. |
| 2010/0285221 A1 | 11/2010 | Oki et al. |
| 2010/0300604 A1 | 12/2010 | Goss et al. |
| 2010/0303504 A1 | 12/2010 | Funamoto et al. |
| 2010/0310281 A1 | 12/2010 | Miura et al. |
| 2011/0044724 A1 | 2/2011 | Funamoto et al. |
| 2011/0058001 A1 | 3/2011 | Gila et al. |
| 2011/0058859 A1 | 3/2011 | Nakamatsu et al. |
| 2011/0069110 A1 | 3/2011 | Matsumoto et al. |
| 2011/0069117 A1 | 3/2011 | Ohzeki et al. |
| 2011/0069129 A1 | 3/2011 | Shimizu |
| 2011/0085828 A1 | 4/2011 | Kosako et al. |
| 2011/0128300 A1 | 6/2011 | Gay et al. |
| 2011/0141188 A1 | 6/2011 | Morita |
| 2011/0149002 A1 | 6/2011 | Kessler |
| 2011/0150509 A1 | 6/2011 | Komiya |
| 2011/0150541 A1 | 6/2011 | Michibata |
| 2011/0169889 A1 | 7/2011 | Kojima et al. |
| 2011/0195260 A1 | 8/2011 | Lee et al. |
| 2011/0199414 A1 | 8/2011 | Lang |
| 2011/0234683 A1 | 9/2011 | Komatsu |
| 2011/0234689 A1 | 9/2011 | Saito |
| 2011/0242181 A1 | 10/2011 | Otobe |
| 2011/0249090 A1 | 10/2011 | Moore et al. |
| 2011/0269885 A1 | 11/2011 | Imai |
| 2011/0279554 A1 | 11/2011 | Dannhauser et al. |
| 2011/0298884 A1 | 12/2011 | Furuta |
| 2011/0304674 A1 | 12/2011 | Sambhy et al. |
| 2012/0013693 A1 | 1/2012 | Tasaka et al. |
| 2012/0013694 A1 | 1/2012 | Kanke |
| 2012/0013928 A1 | 1/2012 | Yoshida et al. |
| 2012/0014726 A1 | 1/2012 | Sekihara et al. |
| 2012/0026224 A1 | 2/2012 | Anthony et al. |
| 2012/0039647 A1 | 2/2012 | Brewington et al. |
| 2012/0094091 A1 | 4/2012 | Van et al. |
| 2012/0098882 A1 | 4/2012 | Onishi et al. |
| 2012/0105561 A1 | 5/2012 | Taniuchi et al. |
| 2012/0105562 A1 | 5/2012 | Sekiguchi et al. |
| 2012/0113180 A1 | 5/2012 | Tanaka et al. |
| 2012/0113203 A1 | 5/2012 | Kushida et al. |
| 2012/0127250 A1* | 5/2012 | Kanasugi ............... B41J 2/2107 347/103 |
| 2012/0127251 A1* | 5/2012 | Tsuji .................... B41M 5/0017 347/103 |
| 2012/0140009 A1 | 6/2012 | Kanasugi et al. |
| 2012/0154497 A1 | 6/2012 | Nakao et al. |
| 2012/0156375 A1 | 6/2012 | Brust et al. |
| 2012/0156624 A1 | 6/2012 | Rondon et al. |
| 2012/0162302 A1 | 6/2012 | Oguchi et al. |
| 2012/0163846 A1 | 6/2012 | Andoh et al. |
| 2012/0183756 A1 | 7/2012 | Higuchi |
| 2012/0194830 A1 | 8/2012 | Gaertner et al. |
| 2012/0236100 A1 | 9/2012 | Toya |
| 2012/0237260 A1 | 9/2012 | Sengoku et al. |
| 2012/0249630 A1 | 10/2012 | Bugner et al. |
| 2012/0280447 A1 | 11/2012 | Kayanuma |
| 2012/0287260 A1 | 11/2012 | Lu et al. |
| 2012/0301186 A1 | 11/2012 | Yang et al. |
| 2012/0314013 A1 | 12/2012 | Takemoto et al. |
| 2012/0314077 A1 | 12/2012 | Clavenna, II et al. |
| 2013/0011158 A1 | 1/2013 | Meguro et al. |
| 2013/0017006 A1 | 1/2013 | Suda |
| 2013/0044188 A1 | 2/2013 | Nakamura et al. |
| 2013/0057603 A1 | 3/2013 | Gordon |
| 2013/0088543 A1 | 4/2013 | Tsuji et al. |
| 2013/0096871 A1 | 4/2013 | Takahama |
| 2013/0120513 A1 | 5/2013 | Thayer et al. |
| 2013/0182045 A1 | 7/2013 | Ohzeki et al. |
| 2013/0201237 A1 | 8/2013 | Thomson et al. |
| 2013/0229457 A1 | 9/2013 | Yu |

(56) References Cited

U.S. PATENT DOCUMENTS

| | | |
|---|---|---|
| 2013/0234080 A1 | 9/2013 | Torikoshi et al. |
| 2013/0235139 A1 | 9/2013 | Schnabel et al. |
| 2013/0242016 A1 | 9/2013 | Edwards et al. |
| 2013/0302065 A1 | 11/2013 | Mori et al. |
| 2013/0338273 A1 | 12/2013 | Shimanaka et al. |
| 2014/0001013 A1 | 1/2014 | Takifuji et al. |
| 2014/0011125 A1 | 1/2014 | Inoue et al. |
| 2014/0043398 A1 | 2/2014 | Butler et al. |
| 2014/0104360 A1 | 4/2014 | Häcker et al. |
| 2014/0153956 A1 | 6/2014 | Yonemoto |
| 2014/0168313 A1 | 6/2014 | Ramesh et al. |
| 2014/0168330 A1 | 6/2014 | Liu et al. |
| 2014/0175707 A1 | 6/2014 | Wolk et al. |
| 2014/0176641 A1 | 6/2014 | Hawryschuk et al. |
| 2014/0198162 A1 | 7/2014 | DiRubio et al. |
| 2014/0232782 A1 | 8/2014 | Mukai et al. |
| 2014/0267777 A1 | 9/2014 | Le et al. |
| 2014/0334855 A1 | 11/2014 | Onishi et al. |
| 2014/0339056 A1 | 11/2014 | Iwakoshi et al. |
| 2015/0022605 A1 | 1/2015 | Mantell et al. |
| 2015/0024648 A1 | 1/2015 | Landa et al. |
| 2015/0025179 A1 | 1/2015 | Landa et al. |
| 2015/0044431 A1* | 2/2015 | Landa ............. B41M 5/0256 428/447 |
| 2015/0072090 A1 | 3/2015 | Landa et al. |
| 2015/0085036 A1 | 3/2015 | Liu et al. |
| 2015/0085037 A1 | 3/2015 | Liu et al. |
| 2015/0085038 A1 | 3/2015 | Liu |
| 2015/0097906 A1 | 4/2015 | Beier et al. |
| 2015/0116408 A1 | 4/2015 | Armbruster et al. |
| 2015/0118503 A1 | 4/2015 | Landa et al. |
| 2015/0165758 A1 | 6/2015 | Sambhy et al. |
| 2015/0195509 A1 | 7/2015 | Phipps |
| 2015/0210065 A1* | 7/2015 | Kelly ............. C08K 3/22 524/440 |
| 2015/0273835 A1 | 10/2015 | Arimizu et al. |
| 2015/0304531 A1 | 10/2015 | Rodriguez et al. |
| 2015/0315403 A1 | 11/2015 | Song et al. |
| 2015/0315409 A1* | 11/2015 | Song ............. B41M 5/0256 523/400 |
| 2015/0336378 A1 | 11/2015 | Guttmann et al. |
| 2015/0343797 A1* | 12/2015 | Song ............. C09D 113/02 524/158 |
| 2015/0361288 A1 | 12/2015 | Song et al. |
| 2015/0375543 A1 | 12/2015 | Barnett et al. |
| 2016/0031246 A1 | 2/2016 | Sreekumar et al. |
| 2016/0083609 A1 | 3/2016 | Sisler et al. |
| 2016/0222232 A1 | 8/2016 | Landa et al. |
| 2016/0250879 A1 | 9/2016 | Chen et al. |
| 2016/0274519 A1 | 9/2016 | Lim et al. |
| 2016/0286462 A1 | 9/2016 | Gohite et al. |
| 2016/0369119 A1 | 12/2016 | Landa et al. |
| 2016/0375680 A1 | 12/2016 | Nishitani et al. |
| 2016/0378036 A1 | 12/2016 | Onishi et al. |
| 2017/0028688 A1 | 2/2017 | Dannhauser et al. |
| 2017/0104887 A1 | 4/2017 | Nomura |
| 2017/0282599 A1 | 10/2017 | Ido |
| 2018/0149998 A1 | 5/2018 | Furukawa |
| 2018/0259888 A1 | 9/2018 | Mitsui et al. |
| 2018/0281382 A1 | 10/2018 | Umezawa et al. |
| 2018/0348672 A1 | 12/2018 | Yoshida |
| 2018/0348675 A1 | 12/2018 | Nakamura et al. |
| 2019/0016114 A1 | 1/2019 | Sugiyama et al. |
| 2019/0152218 A1 | 5/2019 | Stein et al. |
| 2019/0218411 A1 | 7/2019 | Landa et al. |
| 2019/0232638 A1 | 8/2019 | Ziegenbalg et al. |
| 2019/0366705 A1 | 12/2019 | Landa et al. |
| 2020/0073301 A1 | 3/2020 | Sakai et al. |
| 2020/0156366 A1 | 5/2020 | Shmaiser et al. |
| 2020/0171813 A1 | 6/2020 | Chechik et al. |
| 2020/0198322 A1 | 6/2020 | Landa et al. |
| 2020/0276801 A1 | 9/2020 | Landa et al. |
| 2020/0314413 A1 | 10/2020 | Stiglic et al. |
| 2020/0326646 A1 | 10/2020 | Landa et al. |
| 2020/0353746 A1 | 11/2020 | Landa et al. |
| 2020/0361202 A1 | 11/2020 | Burkatovsky |
| 2020/0361715 A1 | 11/2020 | Meier |
| 2020/0376860 A1 | 12/2020 | Paker et al. |
| 2020/0384758 A1 | 12/2020 | Shmaiser et al. |
| 2021/0055666 A1 | 2/2021 | Landa et al. |
| 2021/0245528 A1 | 8/2021 | Landa et al. |
| 2021/0260869 A1 | 8/2021 | Landa et al. |
| 2021/0268793 A1 | 9/2021 | Burkatovsky |
| 2021/0283899 A1 | 9/2021 | Landa et al. |
| 2021/0309020 A1 | 10/2021 | Siman Tov et al. |
| 2022/0016880 A1 | 1/2022 | Landa et al. |
| 2022/0016881 A1 | 1/2022 | Shmaiser et al. |
| 2022/0057732 A1 | 2/2022 | Landa et al. |
| 2022/0111633 A1 | 4/2022 | Shmaiser et al. |
| 2022/0119659 A1 | 4/2022 | Landa et al. |
| 2022/0153015 A1 | 5/2022 | Landa et al. |
| 2022/0153048 A1 | 5/2022 | Landa et al. |
| 2023/0001710 A1 | 1/2023 | Landa et al. |
| 2023/0037462 A1 | 2/2023 | Burkatovsky |

FOREIGN PATENT DOCUMENTS

| | | |
|---|---|---|
| CN | 1212229 A | 3/1999 |
| CN | 1305895 A | 8/2001 |
| CN | 1324901 A | 12/2001 |
| CN | 1445622 A | 10/2003 |
| CN | 1493514 A | 5/2004 |
| CN | 1535235 A | 10/2004 |
| CN | 1543404 A | 11/2004 |
| CN | 1555422 A | 12/2004 |
| CN | 1680506 A | 10/2005 |
| CN | 1703326 A | 11/2005 |
| CN | 1720187 A | 1/2006 |
| CN | 1261831 C | 6/2006 |
| CN | 1809460 A | 7/2006 |
| CN | 1289368 C | 12/2006 |
| CN | 1961015 A | 5/2007 |
| CN | 101073937 A | 11/2007 |
| CN | 101096455 A | 1/2008 |
| CN | 101177057 A | 5/2008 |
| CN | 101248146 A | 8/2008 |
| CN | 101249768 A | 8/2008 |
| CN | 101344746 A | 1/2009 |
| CN | 101359210 A | 2/2009 |
| CN | 101396910 A | 4/2009 |
| CN | 101433074 A | 5/2009 |
| CN | 101508200 A | 8/2009 |
| CN | 101519007 A | 9/2009 |
| CN | 101524916 A | 9/2009 |
| CN | 101544100 A | 9/2009 |
| CN | 101544101 A | 9/2009 |
| CN | 101592896 A | 12/2009 |
| CN | 101607468 A | 12/2009 |
| CN | 201410787 Y | 2/2010 |
| CN | 101820241 A | 9/2010 |
| CN | 101835611 A | 9/2010 |
| CN | 101835612 A | 9/2010 |
| CN | 101873982 A | 10/2010 |
| CN | 102229294 A | 11/2011 |
| CN | 102248776 A | 11/2011 |
| CN | 102300932 A | 12/2011 |
| CN | 102341249 A | 2/2012 |
| CN | 102529257 A | 7/2012 |
| CN | 102555450 A | 7/2012 |
| CN | 102566343 A | 7/2012 |
| CN | 102648095 A | 8/2012 |
| CN | 102673209 A | 9/2012 |
| CN | 102925002 A | 2/2013 |
| CN | 103045008 A | 4/2013 |
| CN | 103309213 A | 9/2013 |
| CN | 103568483 A | 2/2014 |
| CN | 103627337 A | 3/2014 |
| CN | 103991293 A | 8/2014 |
| CN | 104015415 A | 9/2014 |
| CN | 104220934 A | 12/2014 |
| CN | 104271356 A | 1/2015 |
| CN | 104284850 A | 1/2015 |
| CN | 104618642 A | 5/2015 |
| CN | 105058999 A | 11/2015 |

(56) References Cited

FOREIGN PATENT DOCUMENTS

| | | |
|---|---|---|
| CN | 105844621 A | 8/2016 |
| CN | 107111267 A | 8/2017 |
| CN | 107879147 A | 4/2018 |
| DE | 102010060999 A1 | 6/2012 |
| DE | 102012011783 A1 | 12/2013 |
| EP | 0457551 A2 | 11/1991 |
| EP | 0499857 A1 | 8/1992 |
| EP | 0606490 A1 | 7/1994 |
| EP | 0609076 A2 | 8/1994 |
| EP | 0613791 A2 | 9/1994 |
| EP | 0676300 A2 | 10/1995 |
| EP | 0530627 B1 | 3/1997 |
| EP | 0784244 A2 | 7/1997 |
| EP | 0835762 A1 | 4/1998 |
| EP | 0843236 A2 | 5/1998 |
| EP | 0854398 A2 | 7/1998 |
| EP | 0923007 A2 | 6/1999 |
| EP | 1013466 A2 | 6/2000 |
| EP | 1146090 A2 | 10/2001 |
| EP | 1158029 A1 | 11/2001 |
| EP | 0825029 B1 | 5/2002 |
| EP | 1247821 A2 | 10/2002 |
| EP | 1271263 A1 | 1/2003 |
| EP | 0867483 B1 | 6/2003 |
| EP | 0923007 B1 | 3/2004 |
| EP | 1454968 A1 | 9/2004 |
| EP | 1503326 A1 | 2/2005 |
| EP | 1777243 A1 | 4/2007 |
| EP | 2028238 A1 | 2/2009 |
| EP | 2042317 A1 | 4/2009 |
| EP | 2065194 A2 | 6/2009 |
| EP | 2228210 A1 | 9/2010 |
| EP | 2270070 A1 | 1/2011 |
| EP | 2042318 B1 | 2/2011 |
| EP | 2042325 B1 | 2/2012 |
| EP | 2634010 A1 | 9/2013 |
| EP | 2683556 A1 | 1/2014 |
| EP | 2075635 B1 | 10/2014 |
| EP | 3260486 A1 | 12/2017 |
| EP | 2823363 B1 | 10/2018 |
| GB | 748821 A | 5/1956 |
| GB | 1496016 A | 12/1977 |
| GB | 1520932 A | 8/1978 |
| GB | 1522175 A | 8/1978 |
| GB | 2321430 A | 7/1998 |
| JP | 18043941 | 12/1973 |
| JP | S5578904 A | 6/1980 |
| JP | S57121446 U | 7/1982 |
| JP | S6076343 A | 4/1985 |
| JP | S60199692 A | 10/1985 |
| JP | S6223783 A | 1/1987 |
| JP | S63274572 A | 11/1988 |
| JP | H03248170 A | 11/1991 |
| JP | H05147208 A | 6/1993 |
| JP | H05192871 A | 8/1993 |
| JP | H05249870 A | 9/1993 |
| JP | H05297737 A | 11/1993 |
| JP | H06954 A | 1/1994 |
| JP | H06100807 A | 4/1994 |
| JP | H06171076 A | 6/1994 |
| JP | H06345284 A | 12/1994 |
| JP | H07112841 A | 5/1995 |
| JP | H07186453 A | 7/1995 |
| JP | H07238243 A | 9/1995 |
| JP | H0862999 A | 3/1996 |
| JP | H08112970 A | 5/1996 |
| JP | 2529651 B2 | 8/1996 |
| JP | H08272224 A | 10/1996 |
| JP | H09123432 A | 5/1997 |
| JP | H09157559 A | 6/1997 |
| JP | H09174646 A | 7/1997 |
| JP | H09281851 A | 10/1997 |
| JP | H09300678 A | 11/1997 |
| JP | H09314867 A | 12/1997 |
| JP | H10130597 A | 5/1998 |
| JP | H1142811 A | 2/1999 |
| JP | H11503244 A | 3/1999 |
| JP | H11106081 A | 4/1999 |
| JP | H11138740 A | 5/1999 |
| JP | H11245383 A | 9/1999 |
| JP | 2000094660 A | 4/2000 |
| JP | 2000108320 A | 4/2000 |
| JP | 2000108334 A | 4/2000 |
| JP | 2000141710 A | 5/2000 |
| JP | 2000141883 A | 5/2000 |
| JP | 2000168062 A | 6/2000 |
| JP | 2000169772 A | 6/2000 |
| JP | 2000190468 A | 7/2000 |
| JP | 2000206801 A | 7/2000 |
| JP | 2000337464 A | 12/2000 |
| JP | 2000343025 A | 12/2000 |
| JP | 2001088430 A | 4/2001 |
| JP | 2001098201 A | 4/2001 |
| JP | 2001139865 A | 5/2001 |
| JP | 3177985 B2 | 6/2001 |
| JP | 2001164165 A | 6/2001 |
| JP | 2001199150 A | 7/2001 |
| JP | 2001206522 A | 7/2001 |
| JP | 2002020666 A | 1/2002 |
| JP | 2002049211 A | 2/2002 |
| JP | 2002504446 A | 2/2002 |
| JP | 2002069346 A | 3/2002 |
| JP | 2002103598 A | 4/2002 |
| JP | 2002169383 A | 6/2002 |
| JP | 2002229276 A | 8/2002 |
| JP | 2002234243 A | 8/2002 |
| JP | 2002278365 A | 9/2002 |
| JP | 2002304066 A | 10/2002 |
| JP | 2002326733 A | 11/2002 |
| JP | 2002371208 A | 12/2002 |
| JP | 2003057967 A | 2/2003 |
| JP | 2003076159 A | 3/2003 |
| JP | 2003094795 A | 4/2003 |
| JP | 2003107819 A | 4/2003 |
| JP | 2003114558 A | 4/2003 |
| JP | 2003145914 A | 5/2003 |
| JP | 2003183557 A | 7/2003 |
| JP | 2003211770 A | 7/2003 |
| JP | 2003219271 A | 7/2003 |
| JP | 2003227549 A | 8/2003 |
| JP | 2003246135 A | 9/2003 |
| JP | 2003246484 A | 9/2003 |
| JP | 2003292855 A | 10/2003 |
| JP | 2003313466 A | 11/2003 |
| JP | 2004009632 A | 1/2004 |
| JP | 2004011263 A | 1/2004 |
| JP | 2004019022 A | 1/2004 |
| JP | 2004025708 A | 1/2004 |
| JP | 2004034441 A | 2/2004 |
| JP | 2004077669 A | 3/2004 |
| JP | 2004114377 A | 4/2004 |
| JP | 2004114675 A | 4/2004 |
| JP | 2004148687 A | 5/2004 |
| JP | 2004167902 A | 6/2004 |
| JP | 2004231711 A | 8/2004 |
| JP | 2004524190 A | 8/2004 |
| JP | 2004261975 A | 9/2004 |
| JP | 2004325782 A | 11/2004 |
| JP | 2004340983 A | 12/2004 |
| JP | 2005014255 A | 1/2005 |
| JP | 2005014256 A | 1/2005 |
| JP | 2005114769 A | 4/2005 |
| JP | 2005215247 A | 8/2005 |
| JP | 2005224737 A | 8/2005 |
| JP | 3712547 B2 | 11/2005 |
| JP | 2005307184 A | 11/2005 |
| JP | 2005319593 A | 11/2005 |
| JP | 2006001688 A | 1/2006 |
| JP | 2006023403 A | 1/2006 |
| JP | 2006095870 A | 4/2006 |
| JP | 2006102975 A | 4/2006 |
| JP | 2006137127 A | 6/2006 |
| JP | 2006143778 A | 6/2006 |
| JP | 2006152133 A | 6/2006 |

(56) References Cited

FOREIGN PATENT DOCUMENTS

| | | |
|---|---|---|
| JP | 2006224583 A | 8/2006 |
| JP | 2006231666 A | 9/2006 |
| JP | 2006234212 A | 9/2006 |
| JP | 2006243212 A | 9/2006 |
| JP | 2006263984 A | 10/2006 |
| JP | 2006347081 A | 12/2006 |
| JP | 2006347085 A | 12/2006 |
| JP | 2007025246 A | 2/2007 |
| JP | 2007041530 A | 2/2007 |
| JP | 2007069584 A | 3/2007 |
| JP | 2007079159 A | 3/2007 |
| JP | 2007083445 A | 4/2007 |
| JP | 2007190745 A | 8/2007 |
| JP | 2007216673 A | 8/2007 |
| JP | 2007253347 A | 10/2007 |
| JP | 2007334125 A | 12/2007 |
| JP | 2008006816 A | 1/2008 |
| JP | 2008018716 A | 1/2008 |
| JP | 2008019286 A | 1/2008 |
| JP | 2008036968 A | 2/2008 |
| JP | 2008082820 A | 4/2008 |
| JP | 2008137146 A | 6/2008 |
| JP | 2008137239 A | 6/2008 |
| JP | 2008139877 A | 6/2008 |
| JP | 2008142962 A | 6/2008 |
| JP | 2008183744 A | 8/2008 |
| JP | 2008194997 A | 8/2008 |
| JP | 2008532794 A | 8/2008 |
| JP | 2008201564 A | 9/2008 |
| JP | 2008238674 A | 10/2008 |
| JP | 2008246787 A | 10/2008 |
| JP | 2008246990 A | 10/2008 |
| JP | 2008254203 A | 10/2008 |
| JP | 2008255135 A | 10/2008 |
| JP | 2009040892 A | 2/2009 |
| JP | 2009045794 A | 3/2009 |
| JP | 2009045851 A | 3/2009 |
| JP | 2009045885 A | 3/2009 |
| JP | 2009083314 A | 4/2009 |
| JP | 2009083317 A | 4/2009 |
| JP | 2009083325 A | 4/2009 |
| JP | 2009096175 A | 5/2009 |
| JP | 2009148908 A | 7/2009 |
| JP | 2009154330 A | 7/2009 |
| JP | 2009154377 A | 7/2009 |
| JP | 2009190375 A | 8/2009 |
| JP | 2009202355 A | 9/2009 |
| JP | 2009214318 A | 9/2009 |
| JP | 2009214439 A | 9/2009 |
| JP | 2009532240 A | 9/2009 |
| JP | 2009226805 A | 10/2009 |
| JP | 2009226852 A | 10/2009 |
| JP | 2009226886 A | 10/2009 |
| JP | 2009226890 A | 10/2009 |
| JP | 2009227909 A | 10/2009 |
| JP | 2009233977 A | 10/2009 |
| JP | 2009234219 A | 10/2009 |
| JP | 2009240925 A | 10/2009 |
| JP | 2009258587 A | 11/2009 |
| JP | 2009271422 A | 11/2009 |
| JP | 2009279808 A | 12/2009 |
| JP | 2010005815 A | 1/2010 |
| JP | 2010030300 A | 2/2010 |
| JP | 2010054855 A | 3/2010 |
| JP | 2010076214 A | 4/2010 |
| JP | 2010510357 A | 4/2010 |
| JP | 2010105365 A | 5/2010 |
| JP | 2010173201 A | 8/2010 |
| JP | 2010184376 A | 8/2010 |
| JP | 2010214885 A | 9/2010 |
| JP | 4562388 B2 | 10/2010 |
| JP | 2010228192 A | 10/2010 |
| JP | 2010228392 A | 10/2010 |
| JP | 2010234599 A | 10/2010 |
| JP | 2010234681 A | 10/2010 |
| JP | 2010240897 A | 10/2010 |
| JP | 2010241073 A | 10/2010 |
| JP | 2010247381 A | 11/2010 |
| JP | 2010247528 A | 11/2010 |
| JP | 2010258193 A | 11/2010 |
| JP | 2010260204 A | 11/2010 |
| JP | 2010260287 A | 11/2010 |
| JP | 2010260302 A | 11/2010 |
| JP | 2010286570 A | 12/2010 |
| JP | 2011002532 A | 1/2011 |
| JP | 2011025431 A | 2/2011 |
| JP | 2011031619 A | 2/2011 |
| JP | 2011037070 A | 2/2011 |
| JP | 2011064850 A | 3/2011 |
| JP | 2011067956 A | 4/2011 |
| JP | 2011126031 A | 6/2011 |
| JP | 2011133884 A | 7/2011 |
| JP | 2011144271 A | 7/2011 |
| JP | 2011523601 A | 8/2011 |
| JP | 2011168024 A | 9/2011 |
| JP | 2011173325 A | 9/2011 |
| JP | 2011173326 A | 9/2011 |
| JP | 2011186346 A | 9/2011 |
| JP | 2011189627 A | 9/2011 |
| JP | 2011201951 A | 10/2011 |
| JP | 2011224032 A | 11/2011 |
| JP | 2012042943 A | 3/2012 |
| JP | 2012081770 A | 4/2012 |
| JP | 2012086499 A | 5/2012 |
| JP | 2012111194 A | 6/2012 |
| JP | 2012126123 A | 7/2012 |
| JP | 2012139905 A | 7/2012 |
| JP | 2012196787 A | 10/2012 |
| JP | 2013001081 A | 1/2013 |
| JP | 2013060299 A | 4/2013 |
| JP | 2013103474 A | 5/2013 |
| JP | 2013104044 A | 5/2013 |
| JP | 2013121671 A | 6/2013 |
| JP | 2013129158 A | 7/2013 |
| JP | 2014008609 A | 1/2014 |
| JP | 2014047005 A | 3/2014 |
| JP | 2014073675 A | 4/2014 |
| JP | 2014094827 A | 5/2014 |
| JP | 2014131843 A | 7/2014 |
| JP | 2015202616 A | 11/2015 |
| JP | 2016074206 A | 5/2016 |
| JP | 2016093999 A | 5/2016 |
| JP | 2016179678 A | 10/2016 |
| JP | 2016185688 A | 10/2016 |
| JP | 2016539830 A | 12/2016 |
| JP | 2017093178 A | 5/2017 |
| JP | 2018017429 A | 2/2018 |
| JP | 2020014350 A | 1/2020 |
| RU | 2180675 C2 | 3/2002 |
| RU | 2282643 C1 | 8/2006 |
| WO | WO-8600327 A1 | 1/1986 |
| WO | WO-9307000 A1 | 4/1993 |
| WO | WO-9401283 A1 | 1/1994 |
| WO | WO-9604339 A1 | 2/1996 |
| WO | WO-9631809 A1 | 10/1996 |
| WO | WO-9707991 A1 | 3/1997 |
| WO | WO-9736210 A1 | 10/1997 |
| WO | WO-9821251 A1 | 5/1998 |
| WO | WO-9855901 A1 | 12/1998 |
| WO | WO-9912633 A1 | 3/1999 |
| WO | WO-9942509 A1 | 8/1999 |
| WO | WO-9943502 A2 | 9/1999 |
| WO | WO-0064685 A1 | 11/2000 |
| WO | WO-0154902 A1 | 8/2001 |
| WO | WO-0170512 A1 | 9/2001 |
| WO | WO-02068191 A1 | 9/2002 |
| WO | WO-02078868 A2 | 10/2002 |
| WO | WO-02094912 A1 | 11/2002 |
| WO | WO-2004113082 A1 | 12/2004 |
| WO | WO-2004113450 A1 | 12/2004 |
| WO | WO-2006051733 A1 | 5/2006 |
| WO | WO-2006069205 A1 | 6/2006 |
| WO | WO-2006073696 A1 | 7/2006 |
| WO | WO-2006091957 A2 | 8/2006 |

(56) References Cited

FOREIGN PATENT DOCUMENTS

| | | |
|---|---|---|
| WO | WO-2007009871 A2 | 1/2007 |
| WO | WO-2007145378 A1 | 12/2007 |
| WO | WO-2008078841 A1 | 7/2008 |
| WO | WO-2009025809 A1 | 2/2009 |
| WO | WO-2009134273 A1 | 11/2009 |
| WO | WO-2010042784 A3 | 7/2010 |
| WO | WO-2010073916 A1 | 7/2010 |
| WO | WO-2011142404 A1 | 11/2011 |
| WO | WO-2012014825 A1 | 2/2012 |
| WO | WO-2012148421 A1 | 11/2012 |
| WO | WO-2013060377 A1 | 5/2013 |
| WO | WO-2013087249 A1 | 6/2013 |
| WO | WO-2013132339 A1 | 9/2013 |
| WO | WO-2013132340 A1 | 9/2013 |
| WO | WO-2013132343 A1 | 9/2013 |
| WO | WO-2013132345 A1 | 9/2013 |
| WO | WO-2013132356 A1 | 9/2013 |
| WO | WO-2013132418 A2 | 9/2013 |
| WO | WO-2013132419 A1 | 9/2013 |
| WO | WO-2013132420 A1 | 9/2013 |
| WO | WO-2013132424 A1 | 9/2013 |
| WO | WO-2013132432 A1 | 9/2013 |
| WO | WO-2013132438 A2 | 9/2013 |
| WO | WO-2013132439 A1 | 9/2013 |
| WO | WO-2013136220 A1 | 9/2013 |
| WO | 2015026864 A1 | 2/2015 |
| WO | 2015036865 A1 | 3/2015 |
| WO | WO-2015036864 A1 | 3/2015 |
| WO | WO-2015036906 A1 | 3/2015 |
| WO | WO-2015036960 A1 | 3/2015 |
| WO | WO-2016166690 A1 | 10/2016 |
| WO | 2017208152 A1 | 12/2017 |
| WO | WO-2017208246 A1 | 12/2017 |
| WO | WO-2018100541 A1 | 6/2018 |
| WO | 2019012456 A1 | 1/2019 |
| WO | 2019111223 A1 | 6/2019 |
| WO | 2020003088 A1 | 1/2020 |
| WO | 2020136517 A1 | 7/2020 |
| WO | 2020141465 A1 | 7/2020 |
| WO | 2021137063 A1 | 7/2021 |

OTHER PUBLICATIONS

CN101820241 A Machine Translation (by EPO and Google)—published Sep. 1, 2010; Canon KK.
CN102529257A Machine Translation (by EPO and Google)—published Jul. 4, 2012; Nippon Synthetic Chem IND.
CN102673209A Machine Translation (by EPO and Google)—published Sep. 19, 2012; Wistron Corp.
CN103568483A Machine Translation (by EPO and Google)—published Feb. 12, 2014; Anhui Printing Mechanical & Electrical Co LTD.
CN104015415A Machine Translation (by EPO and Google)—published Sep. 3, 2014; Avery Dennison Dorp.
CN1305895A Machine Translation (by EPO and Google)—published Aug. 1, 2001; Imaje Sa [FR].
CN1543404A Machine Translation (by EPO and Google)—published Nov. 3, 2004; 3M Innovative Properties CO [US].
CN1703326A Machine Translation (by EPO and Google)—published Nov. 30, 2005; Nissha Printing [JP].
Co-pending U.S. Appl. No. 17/155,121, filed Jan. 22, 2021.
Co-pending U.S. Appl. No. 17/438,497, inventors Helena; Chechik et al., filed on Sep. 13, 2021.
Co-pending U.S. Appl. No. 17/551,219, filed Dec. 15, 2021.
Co-pending U.S. Appl. No. 17/583,372, inventor Pomerantz; Uriel, filed on Jan. 25, 2022.
Co-pending U.S. Appl. No. 17/676,398, filed Mar. 21, 2022.
Co-pending U.S. Appl. No. 17/683,401, filed Mar. 1, 2022.
Co-pending U.S. Appl. No. 17/694,702, filed Mar. 15, 2022.
IP.com search (Year: 2021).
JP2000343025A Machine Translation (by EPO and Google)—published Dec. 12, 2000; Kyocera Corp.
JP2003076159A Machine Translation (by EPO and Google)—published Mar. 14, 2003, Ricoh KK.
JP2003094795A Machine Translation (by EPO and Google)—published Apr. 3, 2003; Ricoh KK.
JP2004011263A Machine Translation (by EPO and Google)—published Jan. 15, 2004; Sumitomo Denko Steel Wire KK.
JP2004167902A Machine Translation (by EPO and Google)—published Jun. 17, 2004; Nippon New Chrome KK.
JP2004340983A Machine Translation (by EPO and Google)—published Dec. 2, 2004; Ricoh KK.
JP2008082820A Machine Translation (by EPO and Google)—published Apr. 10, 2008; Ricoh KK.
JP2008137146A Machine Translation (by EPO and Google)—published Jun. 19, 2008; CBG Acciai SRL.
JP2009226805A Machine Translation (by EPO and Google)—published Oct. 8, 2009; Fuji Xerox CO LTD.
JP2009226890A Machine Translation (by EPO and Google)—published Oct. 8, 2009; Fuji Xerox CO LTD.
JP2009240925A Machine Translation (by EPO and Google)—published Oct. 22, 2009; Fujifilm Corp.
JP2009532240A Machine Translation (by EPO and Google)—published Sep. 10, 2009; Aisapack Holding SA.
JP2010030300A Machine Translation (by EPO and Google)—published Feb. 12, 2010; Xerox Corp.
JP2010240897A Machine Translation (by EPO and Google)—published Oct. 28, 2010; Toppan Printing CO LTD.
JP2011031619A Machine Translation (by EPO and Google)—published Feb. 17, 2011; Xerox Corp.
JP2011064850A Machine Translation (by EPO and Google)—published Mar. 31, 2011; Seiko Epson Corp.
JP2016093999A Machine Translation (by EPO and Google)—published May 26, 2016; Canon KK.
JP4562388B2 Machine Translation (by EPO and Google)—published Oct. 13, 2010; SK Kaken CO LTD.
JPH09300678A Machine Translation (by EPO and Google)—published Nov. 25, 1997; Mitsubishi Electric Corp.
JPH11138740A Machine Translation (by EPO and Google)—published May 25, 1999; Nikka KK.
Xiameter™ "OFS-0777 Siliconate Technical Data Sheet," Dec. 31, 2017, 5 pages. [Retrieved from the internet on Oct. 13, 2021]: https://www.dow.com/en-us/document-viewer.html?ramdomVar=6236427586842315077&docPath=/content/dam/dcc/documents/en-us/productdatasheet/95/95-4/95-435-01-xiameter-ofs-0777-siliconate.pdf.
"Amino Functional Silicone Polymers", in Xiameter.COPYRGT. 2009 Dow Corning Corporation.
Basf , "JONCRYL 537", Datasheet, Retrieved from the internet: Mar. 23, 2007 p. 1.
Clariant., "Ultrafine Pigment Dispersion for Design and Creative Materials: Hostafine Pigment Preparation" Jun. 19, 2008. Retrieved from the Internet: [URL: http://www.clariant.com/C125720D002B963C/4352DOBC052E90CEC1257479002707D9/$FILE/DP6208E_0608_FL_Hostafinefordesignandcreativematerials.pdf].
CN101073937A Machine Translation (by EPO and Google)—published Nov. 21, 2007; Werner Kaman Maschinen GMBH & [DE].
CN101177057 Machine Translation (by EPO and Google)—published May 14, 2008—Hangzhou Yuanyang Industry Co.
CN101249768A Machine Translation (by EPO and Google)—published Aug. 27, 2008; Shantou Xinxie Special Paper T [CN].
CN101344746A Machine Translation (by EPO and Google)—published Jan. 14, 2009; Ricoh KK [JP].
CN101359210A Machine Translation (by EPO and Google)—published Feb. 4, 2009; Canon KK [JP].
CN101524916A Machine Translation (by EPO and Google)—published Sep. 9, 2009; Fuji Xerox Co Ltd.
CN101544100A Machine Translation (by EPO and Google)—published Sep. 30, 2009; Fuji Xerox Co Ltd.
CN101873982A Machine Translation (by EPO and Google)—published Oct. 27, 2010; Habasit AG, Delair et al.
CN102229294A Machine Translation (by EPO and Google)—published Nov. 2, 2011; Guangzhou Changcheng Ceramics Co Ltd.

(56) References Cited

OTHER PUBLICATIONS

CN102300932A Machine Translation (by EPO and Google)—published Dec. 28, 2011; Yoshida Hiroaki et al.
CN102648095A Machine Translation (by EPO and Google)—published Aug. 22, 2012; Mars Inc.
CN102925002 Machine Translation (by EPO and Google)—published Feb. 13, 2013; Jiangnan University, Fu et al.
CN103045008A Machine Translation (by EPO and Google)—published Apr. 17, 2013; Fuji Xerox Co Ltd.
CN103627337A Machine Translation (by EPO and Google)—published Mar. 12, 2014; Suzhou Banlid New Material Co Ltd.
CN103991293A Machine Translation (by EPO and Google)—published Aug. 20, 2014; Miyakoshi Printing Machinery Co., Ltd, Junichi et al.
CN104618642 Machine Translation (by EPO and Google); published on May 13, 2015, Yulong Comp Comm Tech Shenzhen.
CN105058999A Machine Translation (by EPO and Google)—published Nov. 18, 2015; Zhuoli Imaging Technology Co Ltd.
CN107111267A Machine Translation (by EPO and Google)—published Aug. 29, 2017; Hewlett Packard Indigo BV.
CN1121033A Machine Translation (by EPO and Google)—published Apr. 24, 1996; Kuehnle Manfred R [US].
CN1212229A Machine Translation (by EPO and Google)—published Mar. 31, 1999; Honta Industry Corp [JP].
CN1493514A Machine Translation (by EPO and Google)—published May 5, 2004; GD SPA, Boderi et al.
CN1555422A Machine Translation (by EPO and Google)—published Dec. 15, 2004; Noranda Inc.
CN1680506A Machine Translation (by EPO and Google)—published Oct. 12, 2005; Shinetsu Chemical Co [JP].
CN1809460A Machine Translation (by EPO and Google)—published Jul. 26, 2006; Canon KK.
CN201410787Y Machine Translation (by EPO and Google)—published Feb. 24, 2010; Zhejiang Chanx Wood Co Ltd.
Co-pending U.S. Appl. No. 16/512,915, inventor Vitaly; Burkatovsky, filed on Jul. 16, 2019.
Co-pending U.S. Appl. No. 16/590,397, filed Oct. 2, 2019.
Co-pending U.S. Appl. No. 16/764,330, inventors Uriel; Pomerantz et al., filed on May 14, 2020.
Co-pending U.S. Appl. No. 17/068,088, inventor Benzion; Landa, filed on Oct. 12, 2020.
Co-pending U.S. Appl. No. 17/088,257, filed Nov. 3, 2020.
Co-pending U.S. Appl. No. 17/106,245, filed Nov. 30, 2020.
Co-pending U.S. Appl. No. 17/252,747, filed Dec. 16, 2020.
DE102010060999 Machine Translation (by EPO and Google)—published Jun. 6, 2012; Wolf, Roland, Dr.-Ing.
Epomin Polymer, product information from Nippon Shokubai, dated Feb. 28, 2014.
Flexicon., "Bulk Handling Equipment and Systems: Carbon Black," 2018, 2 pages.
Furia, T.E.,"CRC Handbook of Food Additives, Second Edition, vol. 1" CRC Press LLC, 1972, p. 434.
Handbook of Print Media, 2001, Springer Verlag, Berlin/Heidelberg/New York, pp. 127-136,748—With English Translation.
IP.com Search, 2018, 2 pages.
IP.com Search, 2019, 1 page.
JP2000108320 Machine Translation (by PlatPat English machine translation)—published Apr. 18, 2000 Brother Ind. Ltd.
JP2000108334A Machine Translation (by EPO and Google)—published Apr. 18, 2000; Brother Ind Ltd.
JP2000141710A Machine Translation (by EPO and Google)—published May 23, 2000; Brother Ind Ltd.
JP2000168062A Machine Translation (by EPO and Google)—published Jun. 20, 2000; Brother Ind Ltd.
JP2000169772 Machine Translation (by EPO and Google)—published Jun. 20, 2000; Tokyo Ink MFG Co Ltd.
JP2000206801 Machine Translation (by PlatPat English machine translation); published on Jul. 28, 2000, Canon KK, Kobayashi et al.
JP2001088430A Machine Translation (by EPO and Google)—published Apr. 3, 2001; Kimoto KK.
JP2001098201A Machine Translation (by EPO and Google)—published Apr. 10, 2001; Eastman Kodak Co.
JP2001139865A Machine Translation (by EPO and Google)—published May 22, 2001; Sharp KK.
JP2001164165A Machine Translation (by EPO and Google)—published Jun. 19, 2001; Dainippon Ink & Chemicals.
JP2001199150A Machine Translation (by EPO and Google)—published Jul. 24, 2001; Canon KK.
JP2001206522 Machine Translation (by EPO, PlatPat and Google)—published Jul. 31, 2001; Nitto Denko Corp, Kato et al.
JP2002049211A Machine Translation (by EPO and Google)—published Feb. 15, 2002; Pfu Ltd.
JP2002069346A Machine Translation (by EPO and Google)—published Mar. 8, 2002; Dainippon Ink & Chemicals.
JP2002103598A Machine Translation (by EPO and Google)—published Apr. 9, 2002; Olympus Optical Co.
JP2002169383 Machine Translation (by EPO, PlatPat and Google)—published Jun. 14, 2002 Ricoh KK.
JP2002234243 Machine Translation (by EPO and Google)—published Aug. 20, 2002; Hitachi Koki Co Ltd.
JP2002278365 Machine Translation (by PlatPat English machine translation)—published Sep. 27, 2002 Katsuaki, Ricoh KK.
JP2002304066A Machine Translation (by EPO and Google)—published Oct. 18, 2002; Pfu Ltd.
JP2002326733 Machine Translation (by EPO, PlatPat and Google)—published Nov. 12, 2002; Kyocera Mita Corp.
JP2002371208 Machine Translation (by EPO and Google)—published Dec. 26, 2002; Canon Inc.
JP2003114558 Machine Translation (by EPO, PlatPat and Google)—published Apr. 18, 2003 Mitsubishi Chem Corp, Yuka Denshi Co Ltd, et al.
JP2003145914A Machine Translation (by EPO and Google)—published May 21, 2003; Konishiroku Photo Ind.
JP2003211770 Machine Translation (by EPO and Google)—published Jul. 29, 2003 Hitachi Printing Solutions.
JP2003219271 Machine Translation (by EPO and Google); published on Jul. 31, 2003, Japan Broadcasting.
JP2003246135 Machine Translation (by PlatPat English machine translation)—published Sep. 2, 2003 Ricoh KK, Morohoshi et al.
JP2003246484 Machine Translation (English machine translation)—published Sep. 2, 2003 Kyocera Corp.
JP2003292855A Machine Translation (by EPO and Google)—published Oct. 15, 2003; Konishiroku Photo Ind.
JP2003313466A Machine Translation (by EPO and Google)—published Nov. 6, 2003; Ricoh KK.
JP2004009632A Machine Translation (by EPO and Google)—published Jan. 15, 2004; Konica Minolta Holdings Inc.
JP2004019022 Machine Translation (by EPO and Google)—published Jan. 22, 2004; Yamano et al.
JP2004025708A Machine Translation (by EPO and Google)—published Jan. 29, 2004; Konica Minolta Holdings Inc.
JP2004034441A Machine Translation (by EPO and Google)—published Feb. 5, 2004; Konica Minolta Holdings Inc.
JP2004077669 Machine Translation (by PlatPat English machine translation)—published Mar. 11, 2004 Fuji Xerox Co Ltd.
JP2004114377(A) Machine Translation (by EPO and Google)—published Apr. 15, 2004; Konica Minolta Holdings Inc, et al.
JP2004114675 Machine Translation (by EPO and Google)—published Apr. 15, 2004; Canon Inc.
JP2004148687A Machine Translation (by EPO and Google)—published May 27, 2014; Mitsubishi Heavy Ind Ltd.
JP2004231711 Machine Translation (by EPO and Google)—published Aug. 19, 2004; Seiko Epson Corp.
JP2004261975 Machine Translation (by EPO, PlatPat and Google); published on Sep. 24, 2004, Seiko Epson Corp, Kataoka et al.
JP2004325782A Machine Translation (by EPO and Google)—published Nov. 18, 2004; Canon KK.
JP2004524190A Machine Translation (by EPO and Google)—published Aug. 12, 2004; Avery Dennison Corp.
JP2005014255 Machine Translation (by EPO and Google)—published Jan. 20, 2005; Canon Inc.
JP2005014256 Machine Translation (by EPO and Google)—published Jan. 20, 2005; Canon Inc.

(56) References Cited

OTHER PUBLICATIONS

JP2005114769 Machine Translation (by PlatPat English machine translation)—published Apr. 28, 2005 Ricoh KK.
JP2005215247A Machine Translation (by EPO and Google)—published Aug. 11, 2005; Toshiba Corp.
JP2005319593 Machine Translation (by EPO and Google)—published Nov. 17, 2005, Jujo Paper Co Ltd.
JP2006001688 Machine Translation (by PlatPat English machine translation)—published Jan. 5, 2006 Ricoh KK.
JP2006023403A Machine Translation (by EPO and Google)—published Jan. 26, 2006; Ricoh KK.
JP2006095870A Machine Translation (by EPO and Google)—published Apr. 13, 2006; Fuji Photo Film Co Ltd.
JP2006102975 Machine Translation (by EPO and Google)—published Apr. 20, 2006; Fuji Photo Film Co Ltd.
JP2006137127 Machine Translation (by EPO and Google)—published Jun. 1, 2006; Konica Minolta Med & Graphic.
JP2006143778 Machine Translation (by EPO, PlatPat and Google)—published Jun. 8, 2006 Sun Bijutsu Insatsu KK et al.
JP2006152133 Machine Translation (by EPO, PlatPat and Google)—published Jun. 15, 2006 Seiko Epson Corp.
JP2006224583A Machine Translation (by EPO and Google)—published Aug. 31, 2006; Konica Minolta Holdings Inc.
JP2006231666A Machine Translation (by EPO and Google)—published Sep. 7, 2006; Seiko Epson Corp.
JP2006234212A Machine Translation (by EPO and Google)—published Sep. 7, 2006; Matsushita Electric Ind Co Ltd.
JP2006243212 Machine Translation (by PlatPat English machine translation)—published Sep. 14, 2006 Fuji Xerox Co Ltd.
JP2006263984 Machine Translation (by EPO, PlatPat and Google)—published Oct. 5, 2006 Fuji Photo Film Co Ltd.
JP2006347081 Machine Translation (by EPO and Google)—published Dec. 28, 2006; Fuji Xerox Co Ltd.
JP2006347085 Machine Translation (by EPO and Google)—published Dec. 28, 2006 Fuji Xerox Co Ltd.
JP2007025246A Machine Translation (by EPO and Google)—published Feb. 1, 2007; Seiko Epson Corp.
JP2007041530A Machine Translation (by EPO and Google) - published Feb. 15, 2007; Fuji Xerox Co Ltd.
JP2007069584 Machine Translation (by EPO and Google)—published Mar. 22, 2007 Fujifilm.
JP2007079159A Machine Translation (by EPO and Google)—published Mar. 29, 2007; Ricoh KK.
JP2007083445A Machine Translation (by EPO and Google)—published Apr. 5, 2007; Fujifilm Corp.
JP2007216673 Machine Translation (by EPO and Google)—published Aug. 30, 2007 Brother Ind.
JP2007253347A Machine Translation (by EPO and Google)—published Oct. 4, 2007; Ricoh KK, Matsuo et al.
JP2008006816 Machine Translation (by EPO and Google)—published Jan. 17, 2008; Fujifilm Corp.
JP2008018716 Machine Translation (by EPO and Google)—published Jan. 31, 2008; Canon Inc.
JP2008137239A Machine Translation (by EPO and Google); published on Jun. 19, 2008, Kyocera Mita Corp.
JP2008139877A Machine Translation (by EPO and Google)—published Jun. 19, 2008; Xerox Corp.
JP2008142962 Machine Translation (by EPO and Google)—published Jun. 26, 2008; Fuji Xerox Co Ltd.
JP2008183744A Machine Translation (by EPO and Google)—published Aug. 14, 2008, Fuji Xerox Co Ltd.
JP2008194997A Machine Translation (by EPO and Google)—published Aug. 28, 2008; Fuji Xerox Co Ltd.
JP2008201564 Machine Translation (English machine translation)—published Sep. 4, 2008 Fuji Xerox Co Ltd.
JP2008238674A Machine Translation (by EPO and Google)—published Oct. 9, 2008; Brother Ind Ltd.
JP2008246990 Machine Translation (by EPO and Google)—published Oct. 16, 2008, Jujo Paper Co Ltd.
JP2008254203A Machine Translation (by EPO and Google)—published Oct. 23, 2008; Fujifilm Corp.
JP2008255135 Machine Translation (by EPO and Google)—published Oct. 23, 2008; Fujifilm Corp.
JP2009045794 Machine Translation (by EPO and Google)—published Mar. 5, 2009; Fujifilm Corp.
JP2009045851A Machine Translation (by EPO and Google); published on Mar. 5, 2009, Fujifilm Corp.
JP2009045885A Machine Translation (by EPO and Google)—published Mar. 5, 2009; Fuji Xerox Co Ltd.
JP2009083314 Machine Translation (by EPO, PlatPat and Google)—published Apr. 23, 2009 Fujifilm Corp.
JP2009083317 Abstract; Machine Translation (by EPO and Google)—published Apr. 23, 2009; Fuji Film Corp.
JP2009083325 Abstract; Machine Translation (by EPO and Google)—published Apr. 23, 2009 Fujifilm.
JP2009096175 Machine Translation (EPO, PlatPat and Google) published on May 7, 2009 Fujifilm Corp.
JP2009148908A Machine Translation (by EPO and Google)—published Jul. 9, 2009; Fuji Xerox Co Ltd.
JP2009154330 Machine Translation (by EPO and Google)—published Jul. 16, 2009; Seiko Epson Corp.
JP2009190375 Machine Translation (by EPO and Google)—published Aug. 27, 2009; Fuji Xerox Co Ltd.
JP2009202355 Machine Translation (by EPO and Google)—published Sep. 10, 2009; Fuji Xerox Co Ltd.
JP2009214318 Machine Translation (by EPO and Google)—published Sep. 24, 2009 Fuji Xerox Co Ltd.
JP2009214439 Machine Translation (by PlatPat English machine translation)—published Sep. 24, 2009 Fujifilm Corp.
JP2009226852 Machine Translation (by EPO and Google)—published Oct. 8, 2009; Hirato Katsuyuki, Fujifilm Corp.
JP2009233977 Machine Translation (by EPO and Google)—published Oct. 15, 2009; Fuji Xerox Co Ltd.
JP2009234219 Machine Translation (by EPO and Google)—published Oct. 15, 2009; Fujifilm Corp.
JP2010054855 Machine Translation (by PlatPat English machine translation)—published Mar. 11, 2010 Itatsu, Fuji Xerox Co.
JP2010105365 Machine Translation (by EPO and Google)—published May 13, 2010; Fuji Xerox Co Ltd.
JP2010173201 Abstract; Machine Translation (by EPO and Google)—published Aug. 12, 2010; Richo Co Ltd.
JP2010184376 Machine Translation (by EPO, PlatPat and Google)—published Aug. 26, 2010 Fujifilm Corp.
JP2010214885A Machine Translation (by EPO and Google)—published Sep. 30, 2010; Mitsubishi Heavy Ind Ltd.
JP2010228192 Machine Translation (by PlatPat English machine translation)—published Oct. 14, 2010 Fuji Xerox.
JP2010228392A Machine Translation (by EPO and Google)—published Oct. 14, 2010; Jujo Paper Co Ltd.
JP2010234599A Machine Translation (by EPO and Google)—published Oct. 21, 2010; Duplo Seiko Corp et al..
JP2010234681A Machine Translation (by EPO and Google)—published Oct. 21, 2010; Riso Kagaku Corp.
JP2010241073 Machine Translation (by EPO and Google)—published Oct. 28, 2010; Canon Inc.
JP2010247381A Machine Translation (by EPO and Google); published on Nov. 4, 2010, Ricoh Co Ltd.
JP2010258193 Machine Translation (by EPO and Google)—published Nov. 11, 2010; Seiko Epson Corp.
JP2010260204A Machine Translation (by EPO and Google)—published Nov. 18, 2010; Canon KK.
JP2010260287 Machine Translation (by EPO and Google)—published Nov. 18, 2010; Canon KK.
JP2010260302A Machine Translation (by EPO and Google)—published Nov. 18, 2010; Riso Kagaku Corp.
JP2011002532 Machine Translation (by PlatPat English machine translation)—published Jan. 6, 2011 Seiko Epson Corp.
JP2011025431 Machine Translation (by EPO and Google)—published Feb. 10, 2011; Fuji Xerox Co Ltd.
JP2011037070A Machine Translation (by EPO and Google)—published Feb. 24, 2011; Riso Kagaku Corp.

(56) References Cited

OTHER PUBLICATIONS

JP2011067956A Machine Translation (by EPO and Google)—published Apr. 7, 2011; Fuji Xerox Co Ltd.
JP2011126031A Machine Translation (by EPO and Google); published on Jun. 30, 2011, Kao Corp.
JP2011144271 Machine Translation (by EPO and Google)—published Jun. 28, 2011 Toyo Ink Sc Holdings Co Ltd.
JP2011173325 Abstract; Machine Translation (by EPO and Google)—published Sep. 8, 2011; Canon Inc.
JP2011173326 Machine Translation (by EPO and Google)—published Sep. 8, 2011; Canon Inc.
JP2011186346 Machine Translation (by PlatPat English machine translation)—published Sep. 22, 2011 Seiko Epson Corp, Nishimura et al.
JP2011189627 Machine Translation (by Google Patents)—published Sep. 29, 2011; Canon KK.
JP2011201951A Machine Translation (by PlatPat English machine translation); published on Oct. 13, 2011, Shin-Etsu Chemical Co Ltd, Todoroki et al.
JP2011224032 Machine Translation (by EPO & Google)—published Nov. 10, 2011, Mameita KK.
JP2012086499 Machine Translation (by EPO and Google)—published May 10, 2012; Canon Inc.
JP2012111194 Machine Translation (by EPO and Google)—published Jun. 14, 2012; Konica Minolta.
JP2012196787A Machine Translation (by EPO and Google)—published Oct. 18, 2012; Seiko Epson Corp.
JP2012201419A Machine Translation (by EPO and Google)—published Oct. 22, 2012, Seiko Epson Corp.
JP2013001081 Machine Translation (by EPO and Google)—published Jan. 7, 2013; Kao Corp.
JP2013060299 Machine Translation (by EPO and Google)—published Apr. 4, 2013; Ricoh Co Ltd.
JP2013103474 Machine Translation (by EPO and Google)—published May 30, 2013; Ricoh Co Ltd.
JP2013121671 Machine Translation (by EPO and Google)—published Jun. 20, 2013; Fuji Xerox Co Ltd.
JP2013129158 Machine Translation (by EPO and Google)—published Jul. 4, 2013; Fuji Xerox Co Ltd.
JP2014047005A Machine Translation (by EPO and Google)—published Mar. 17, 2014; Ricoh Co Ltd.
JP2014094827A Machine Translation (by EPO and Google)—published May 22, 2014; Panasonic Corp.
JP2014131843A Machine Translation (by EPO and Google)—published Jul. 17, 2014; Ricoh Co Ltd.
JP2016185688A Machine Translation (by EPO and Google)—published Oct. 27, 2016; Hitachi Industry Equipment Systems Co Ltd.
JP2529651B2 Machine Translation (by EPO and Google)—issued Aug. 28, 1996;Osaka Sealing Insatsu KK.
JPH03248170A Machine Translation (by EPO & Google)—published Nov. 6, 1991; Fujitsu Ltd.
JPH05147208 Machine Translation (by EPO and Google)—published Jun. 15, 1993—Mita Industrial Co Ltd.
JPH06100807 Machine Translation (by EPO and Google)—published Apr. 12, 1994; Seiko Instr Inc.
JPH06171076A Machine Translation (by PlatPat English machine translation)—published Jun. 21, 1994, Seiko Epson Corp.
JPH06345284A Machine Translation (by EPO and Google); published on Dec. 20, 1994, Seiko Epson Corp.
JPH06954A Machine Translation (by EPO and Google)—published Jan. 11, 1994; Seiko Epson Corp.
JPH07186453A Machine Translation (by EPO and Google)—published Jul. 25, 1995; Toshiba Corp.
JPH07238243A Machine Translation (by EPO and Google)—published Sep. 12, 1995; Seiko Instr Inc.
JPH08112970 Machine Translation (by EPO and Google)—published May 7, 1996; Fuji Photo Film Co Ltd.
JPH0862999A Machine Translation (by EPO & Google)—published Mar. 8, 1996 Toray Industries, Yoshida, Tomoyuki.
JPH09123432 Machine Translation (by EPO and Google)—published May 13, 1997, Mita Industrial Co Ltd.
JPH09157559A Machine Translation (by EPO and Google)—published Jun. 17, 1997; Toyo Ink Mfg Co.
JPH09281851A Machine Translation (by EPO and Google)—published Oct. 31, 1997; Seiko Epson Corp.
JPH09314867A Machine Translation (by PlatPat English machine translation)—published Dec. 9, 1997, Toshiba Corp.
JPH11106081A Machine Translation (by EPO and Google)—published Apr. 20, 1999; Ricoh KK.
JPH11245383A Machine Translation (by EPO and Google)—published Sep. 14, 1999; Xerox Corp.
JPH5297737 Machine Translation (by EPO & Google machine translation)—published Nov. 12, 1993 Fuji Xerox Co Ltd.
JPS5578904A Machine Translation (by EPO and Google)—published Jun. 14, 1980; Yokoyama Haruo.
JPS57121446U Machine Translation (by EPO and Google)—published Jul. 28, 1982.
JPS60199692A Machine Translation (by EPO and Google)—published Oct. 9, 1985; Suwa Seikosha KK.
JPS6076343A Machine Translation (by EPO and Google)—published Apr. 30, 1985; Toray Industries.
JPS6223783A Machine Translation (by EPO and Google)—published Jan. 31, 1987; Canon KK.
Larostat 264 A Quaternary Ammonium Compound, Technical Bulletin, BASF Corporation, Dec. 2002, p. 1.
Machine Translation (by EPO and Google) of JPH07112841 published on May 2, 1995 Canon KK.
Marconi Studios, Virtual SET Real Time; http://www.marconistudios.il/pages/virtualset_en.php.
Montuori G.M., et al., "Geometrical Patterns for Diagrid Buildings: Exploring Alternative Design Strategies From the Structural Point of View," Engineering Structures, Jul. 2014, vol. 71, pp. 112-127.
"Solubility of Alcohol", in http://www.solubilityoflhings.com/water/alcohol; downloaded on Nov. 30, 2017.
Poly(vinyl acetate) datasheet. PolymerProcessing.com. Copyright 2010. http://polymerprocessing.com/polymers/PV AC.html.
Royal Television Society, The Flight of the Phoenix; https://rts.org.uk/article/flight-phoenix, Jan. 27, 2011.
RU2180675C2 Machine Translation (by EPO and Google)—published Mar. 20, 2002; Zao Rezinotekhnika.
RU2282643C1 Machine Translation (by EPO and Google)—published Aug. 27, 2006; Balakovorezinotekhnika Aoot.
Technical Information Lupasol Types, Sep. 2010, 10 pages.
The Engineering Toolbox., "Dynamic Viscosity of Common Liquids," 2018, 4 pages.
Units of Viscosity published by Hydramotion Ltd. 1 York Road Park, Malton, York Y017 6YA, England; downloaded from www.hydramotion.com website on Jun. 19, 2017.
WO2006051733A1 Machine Translation (by EPO and Google)—published May 18, 2006; Konica Minolta Med & Graphic.
WO2010073916A1 Machine Translation (by EPO and Google)—published Jul. 1, 2010; Nihon Parkerizing [JP] et al.
WO2013087249 Machine Translation (by EPO and Google)—published Jun. 20, 2013; Koenig & Bauer AG.
CN101096455A Machine Translation (EPO, PlatPat and Google) published on Jan. 2, 2008 Fujifilm Corp.
CN101248146A Machine Translation (EPO, PlatPat and Google) published on Aug. 20, 2008 Ricoh KK.
CN102341249A Machine Translation (EPO, PlatPat and Google) published on Feb. 1, 2012 Eastman Kodak Co.
CN1961015A Machine Translation (EPO, PlatPat and Google) published on May 9, 2007 Dainippon Ink & Chemicals.
Co-pending U.S. Appl. No. 17/712,198, filed Apr. 4, 2022.
Co-pending U.S. Appl. No. 17/773,609, filed May 1, 2022.
Co-pending U.S. Appl. No. 17/788,335, filed Jun. 23, 2022.
Co-pending U.S. Appl. No. 17/842,860, filed Jun. 17, 2022.
JP2000141883A Machine Translation (EPO, PlatPat and Google) published on May 23, 2000 Ricoh KK.
JP2000190468A Machine Translation (EPO, PlatPat and Google) published on Jul. 11, 2000 Brother Ind Ltd.
JP2005224737A Machine Translation (by EPO and Google)—published Aug. 25, 2005; Mitsubishi Paper Mills Ltd.

(56) References Cited

OTHER PUBLICATIONS

JP2009154377A Machine Translation (by EPO and Google)—published Jul. 16, 2009; Fujifilm Corp.
JP2009227909A Machine Translation (EPO, PlatPat and Google) published on Oct. 8, 2009 Fujifilm Corp.
JP2009271422A Machine Translation (by EPO and Google)—published Nov. 19, 2009; Ricoh KK.
JP2011168024A Machine Translation (EPO, PlatPat and Google) published on Sep. 1, 2011 Ricoh Co Ltd.
JP2013104044A Machine Translation (by EPO and Google)—published May 30, 2013; Three M Innovative Properties.
JP2014008609A Machine Translation (EPO, PlatPat and Google) published on Jan. 20, 2014 Seiko Epson Corp.
JP2014073675A Machine Translation (EPO and Google) published on Apr. 24, 2014 Ricoh Co Ltd.
JP2015202616A Machine Translation (EPO, PlatPat and Google) published on Nov. 16, 2015 Canon KK.
JP2016074206A Machine Translation (EPO and Google) published on May 12, 2016 Xerox Corp.
JP2016179678A Machine Translation (EPO, PlatPat and Google) published on Oct. 13, 2016 Xerox Corp.
JP2017093178A Machine Translation (EPO and Google) published on May 25, 2017 Samsung Electronics Co Ltd.
JP4804394I Machine Translation (by EPO and Google)—published Dec. 21, 1973.
JPH10130597A Machine Translation (by EPO and Google)—published May 19, 1998; Sekisui Chemical Co Ltd.
CN101433074A Machine Translation (by EPO and Google)—published May 13, 2009; Kyocera Mita Corp [JP].
CN102566343A Machine Translation (by EPO and Google)—published Jul. 11, 2012; Canon KK.
CN105844621A Machine Translation (by EPO and Google)—published Aug. 10, 2016; Fuyang Feiyang Printing Co Ltd.
CN107879147A Machine Translation (by EPO and Google)—published Apr. 6, 2018; Brother Ind Ltd.
Co-pending U.S. Appl. No. 18/016,343, inventors Levanon; Moshe et al., filed on Jan. 15, 2023.
Co-pending U.S. Appl. No. 18/069,232, filed Dec. 21, 2022.
Co-pending U.S. Appl. No. 18/076,420, inventor Burkatovsky; Vitaly, filed on Dec. 7, 2022.
Co-pending U.S. Appl. No. 18/083,532, inventors Landa; Benzion et al., filed on Dec. 18, 2022.
DE102012011783A1 Machine Translation (by EPO, PlatPat and Google)—published Dec. 19, 2013; Heidelberger Druckmasch AG.
IP.com search (Year: 2022).
JP2000094660A Machine Translation (by EPO and Google)—published Apr. 4, 2000; Brother Ind Ltd.
JP2000337464A Machine Translation (by EPO and Google)—published Dec. 5, 2000; Fuji Xerox Co Ltd.
JP2003107819A Machine Translation (by EPO and Google)—published Apr. 9, 2003; Kanegafuchi Chemical Ind.
JP2003227549A Machine Translation (by EPO, PlatPat and Google)—published Aug. 15, 2003; Xerox Corp.
JP2004117118A Machine Translation (by EPO and Google)—published Apr. 15, 2004; Nidec Copal Corp.
JP2006256087 Machine Translation (by EPO and Google)—published Sep. 28, 2006; Ricoh Printing Sys Ltd.
JP2009258587A Machine Translation (by EPO and Google)—published Nov. 5, 2009; Fuji Xerox Co Ltd.
JP2009279808A Machine Translation (by EPO and Google)—published Dec. 3, 2009; Fuji Xerox Co Ltd.
JP2018017429A Machine Translation (by EPO and Google)—published Feb. 1, 2018; Rinnai KK.
JP2020014350A Machine Translation (by EPO and Google)—published Jan. 23, 2020; Toshiba Mitsubishi Elec Ind.
JPH05249870A Machine Translation (by EPO, PlatPat and Google)—published Sep. 28, 1993; Matsushita Electric Ind Co Ltd.
JPH08272224A Machine Translation (by EPO, PlatPat and Google)—published Oct. 18, 1996; Ricoh KK.
JPS63274572A Machine Translation (by EPO and Google)—published Nov. 11, 1988; Canon KK.
JP2010076214A Machine Translation (EPO, PlatPat and Google) published on Apr. 8, 2010 Fuji Xerox Co Ltd.
JP2012081770A Machine Translation (EPO, PlatPat and Google) published on Apr. 26, 2012 Komori Printing Mach.
JP3712547B2 Machine Translation (EPO, PlatPat and Google) published on Nov. 2, 2005 Sasaya Shunji.

\* cited by examiner

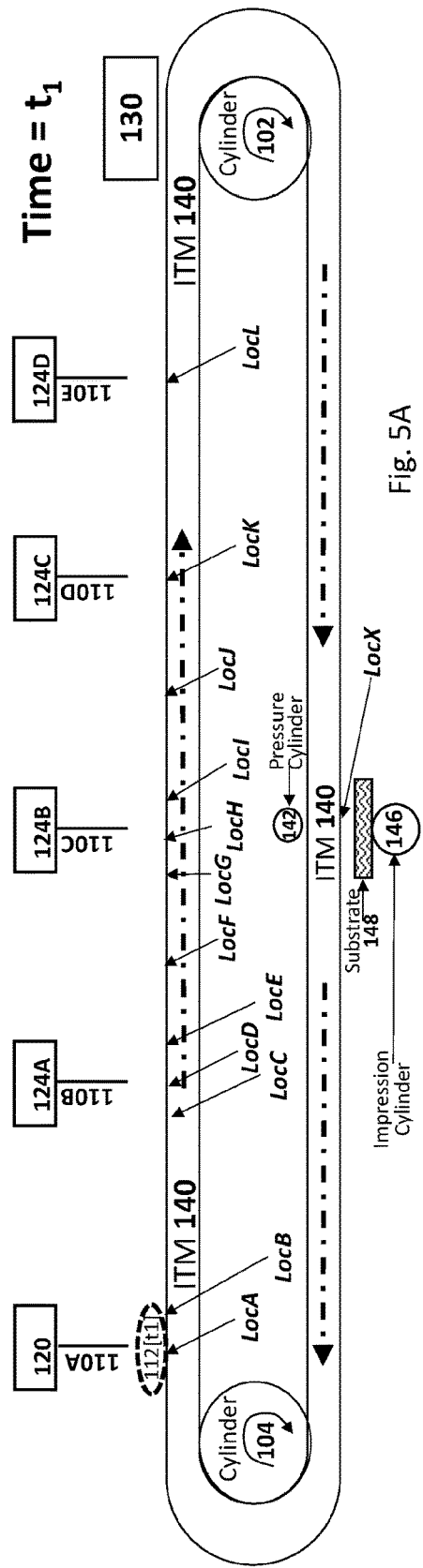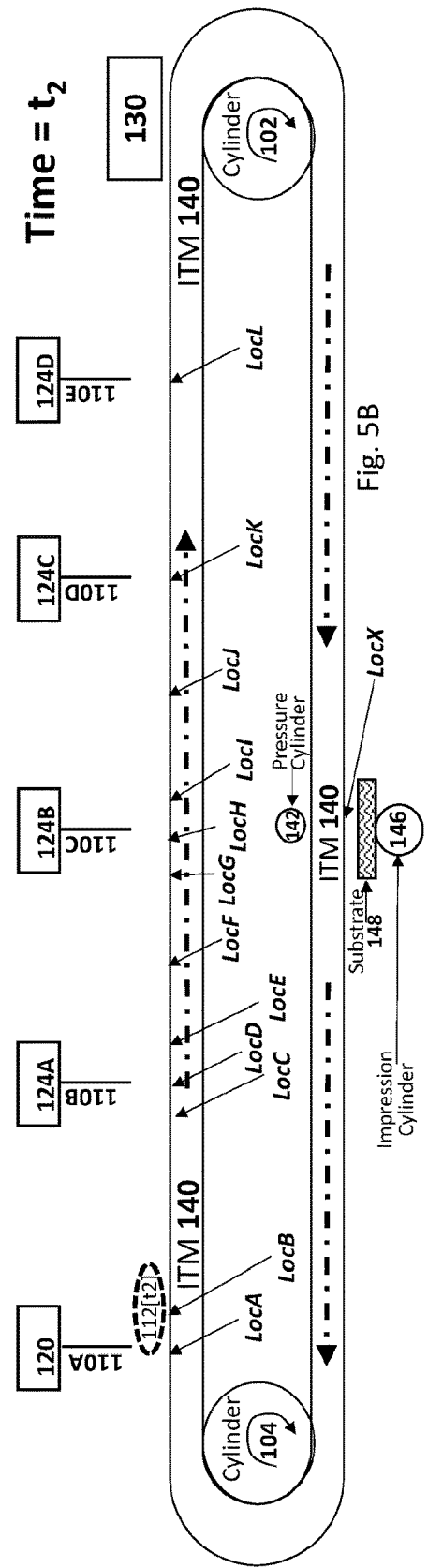

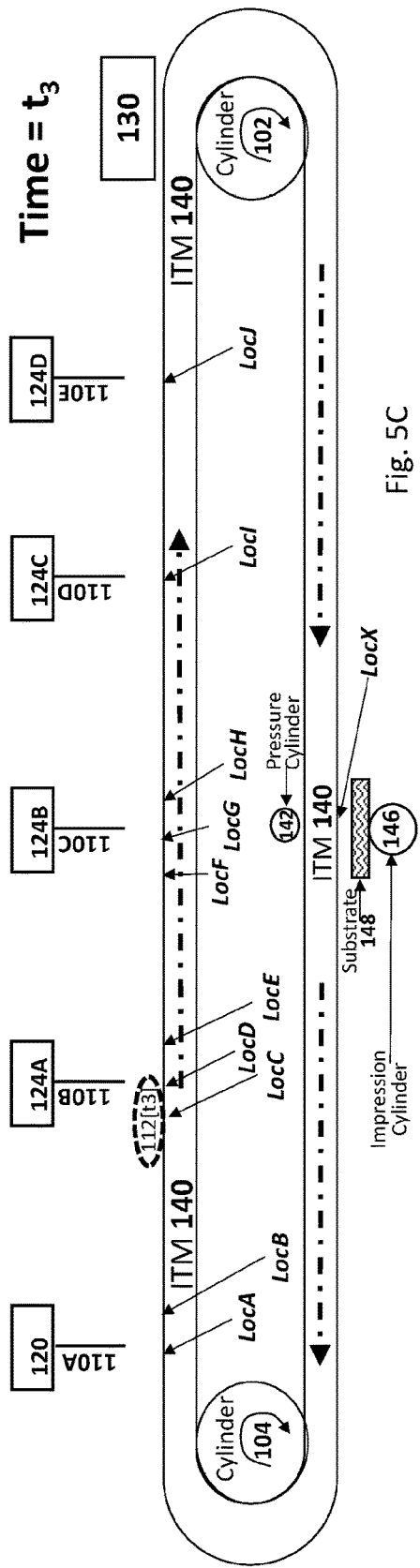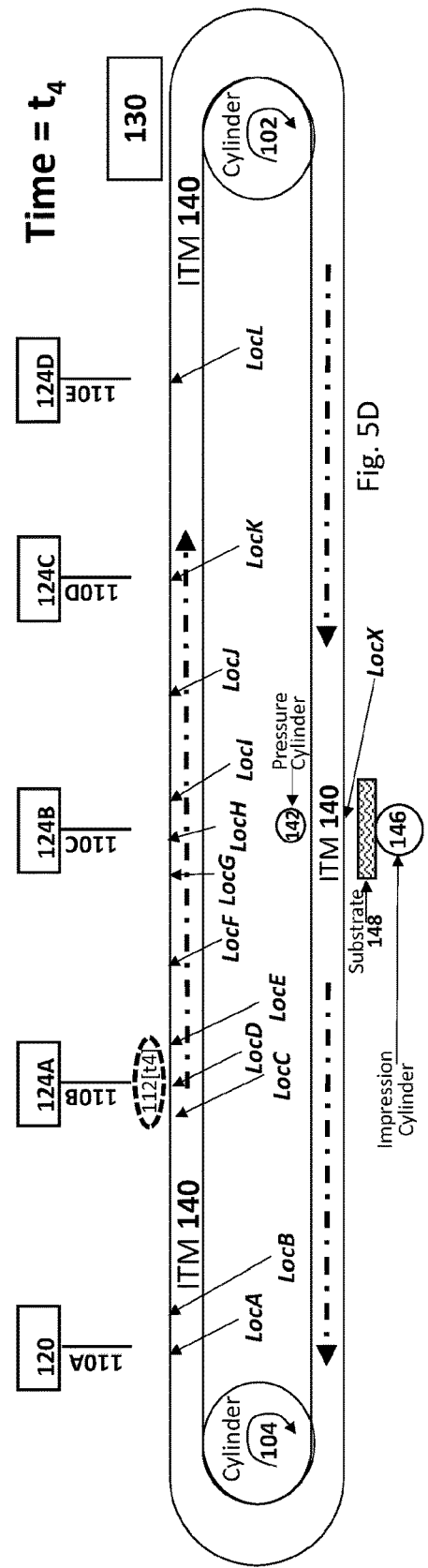

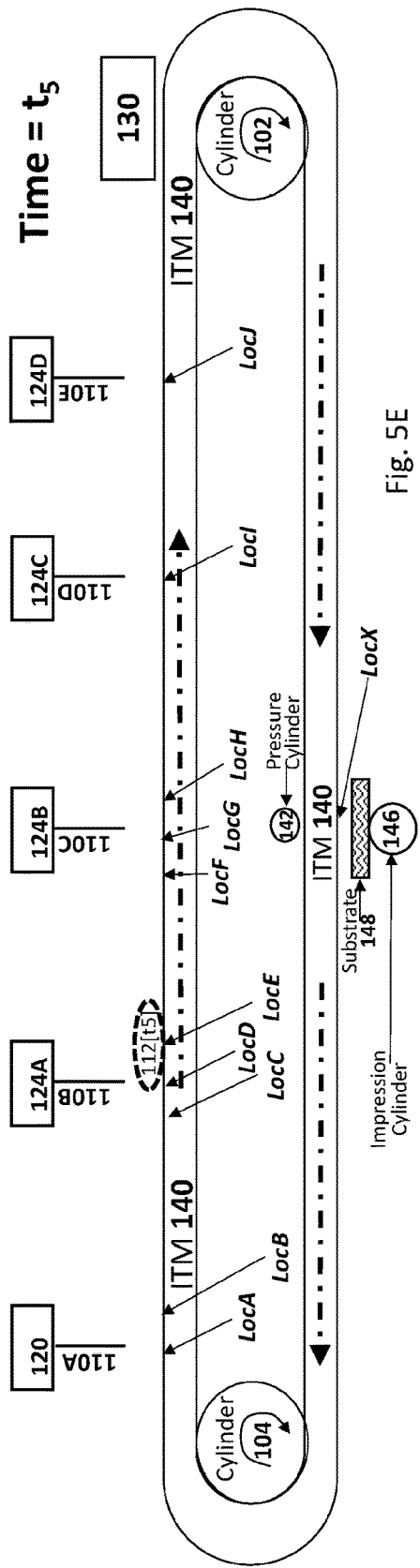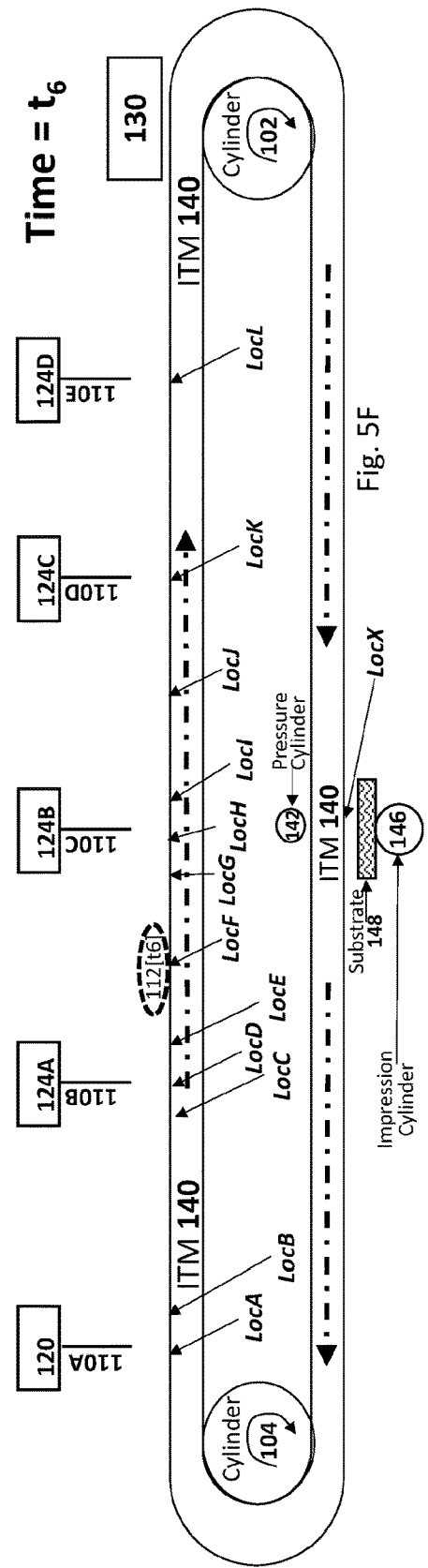

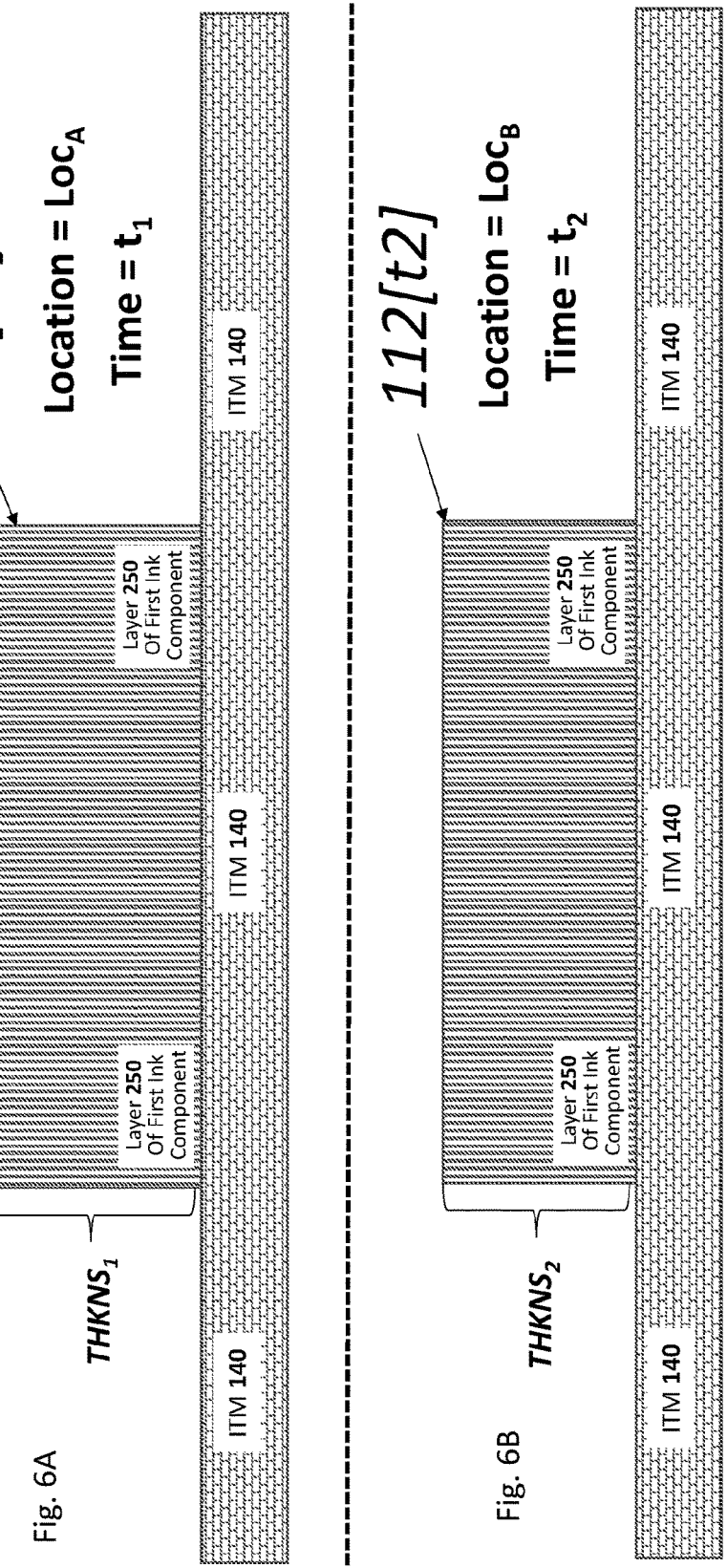

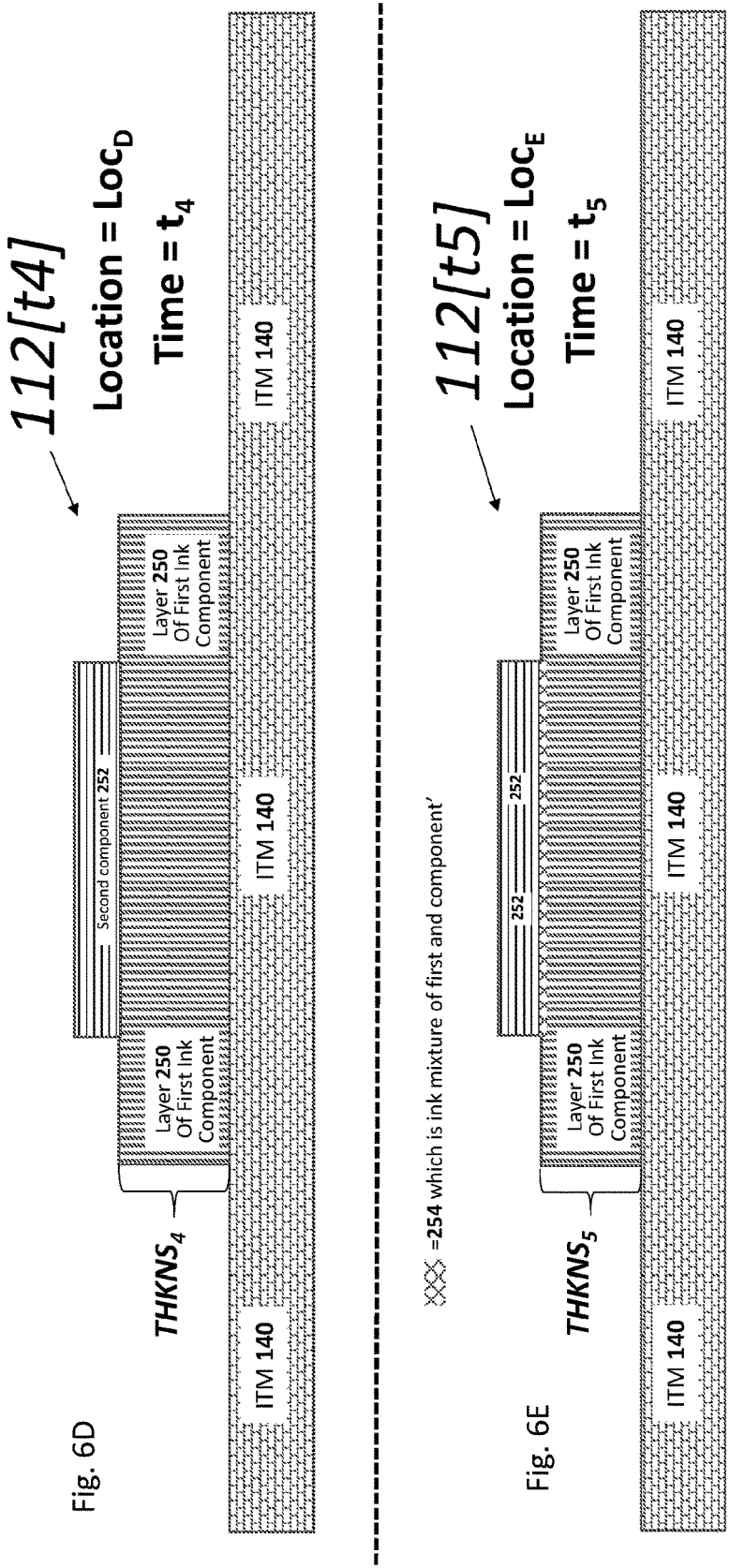

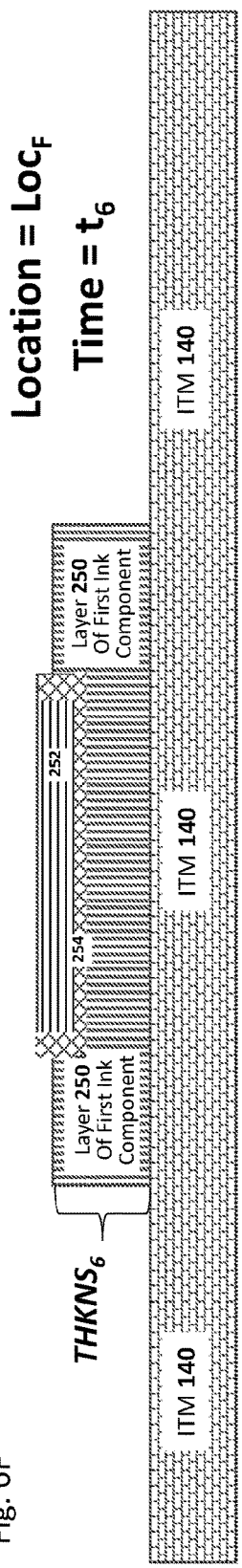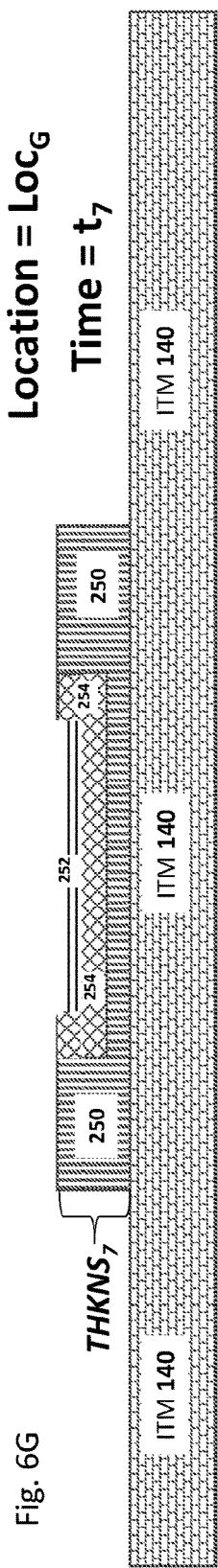

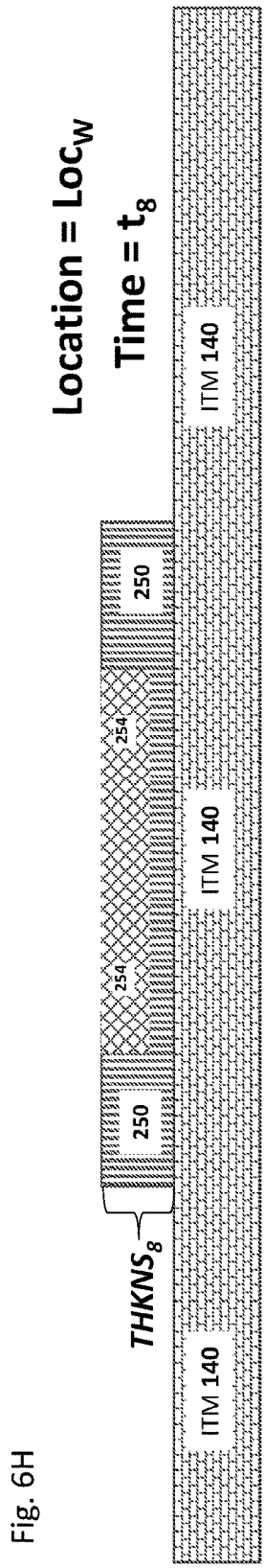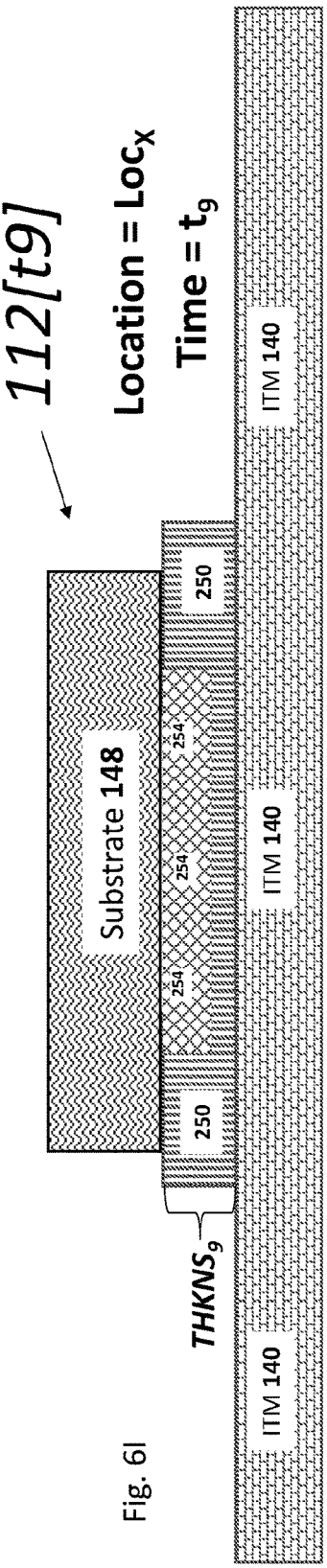

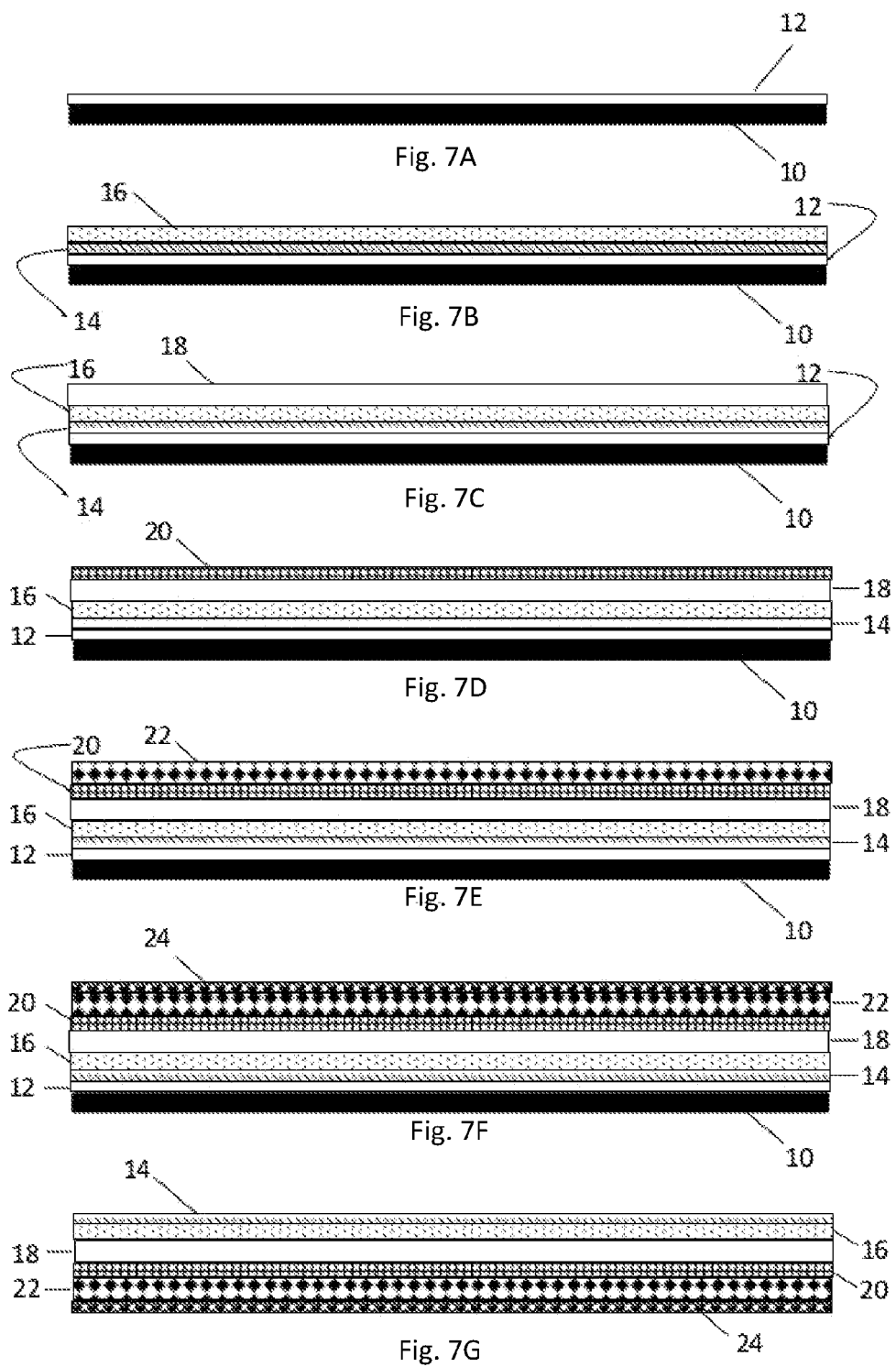

METHOD AND APPARATUS FOR DIGITAL PRINTING

CROSS-REFERENCE TO RELATED APPLICATIONS

This application draws priority from U.S. Provisional Patent Application Ser. No. 62/595,582, filed Dec. 6, 2017 and from U.S. Provisional Patent Application Ser. No. 62/595,593 filed Dec. 7, 2017, both of which are incorporated by reference for all purposes as if fully set forth herein.

FIELD OF THE INVENTION

The present disclosure relates to a digital printing process, ink component formulations, and related apparatus and systems.

BACKGROUND OF THE INVENTION

The following patent publications provide potentially relevant background material, and are all incorporated by reference in their entirety: WO/2017/009722 (publication of PCT/IB2016/053049 filed May 25, 2016), WO/2016/166690 (publication of PCT/IB2016/052120 filed Apr. 4, 2016), WO/2016/151462 (publication of PCT/IB2016/051560 filed Mar. 20, 2016), WO/2016/113698 (publication of PCT/IB2016/050170 filed Jan. 14, 2016), WO/2015/110988 (publication of PCT/IB2015/050501 filed Jan. 22, 2015), WO/2015/036812 (publication of PCT/IB2013/002571 filed Sep. 12, 2013), WO/2015/036864 (publication of PCT/IB2014/002366 filed Sep. 11, 2014), WO/2015/036865 (publication of PCT/IB2014/002395 filed Sep. 11, 2014), WO/2015/036906 (publication of PCT/IB2014/064277 filed Sep. 12, 2014), WO/2013/136220 (publication of PCT/IB2013/051719 filed Mar. 5, 2013), WO/2013/132419 (publication of PCT/IB2013/051717 filed Mar. 5, 2013), WO/2013/132424 (publication of PCT/IB2013/051727 filed Mar. 5, 2013), WO/2013/132420 (publication of PCT/IB2013/051718 filed Mar. 5, 2013), WO/2013/132439 (publication of PCT/IB2013/051755 filed Mar. 5, 2013), WO/2013/132438 (publication of PCT/IB2013/051751 filed Mar. 5, 2013), WO/2013/132418 (publication of PCT/IB2013/051716 filed Mar. 5, 2013), WO/2013/132356 (publication of PCT/IB2013/050245 filed Jan. 10, 2013), WO/2013/132345 (publication of PCT/IB2013/000840 filed Mar. 5, 2013), WO/2013/132339 (publication of PCT/IB2013/000757 filed Mar. 5, 2013), WO/2013/132343 (publication of PCT/IB2013/000822 filed Mar. 5, 2013), WO/2013/132340 (publication of PCT/IB2013/000782 filed Mar. 5, 2013), WO/2013/132432 (publication of PCT/IB2013/051743 filed Mar. 5, 2013).

Processes for indirect digital printing using aqueous inks are known in the art (e.g., see the flow chart of FIG. 1). These aqueous inks comprise a mixture of coloring agent (e.g. pigment) and binder (e.g. polymeric resin). In these processes, an ink image is formed on a surface of an intermediate transfer member ITM (e.g. a drum or a flexible blanket mounted over rollers), dried, and then transferred from the ITM to a printing substrate (e.g. paper or cardboard or plastic).

Thus, in step S101 and S105 of FIG. 1, the aqueous ink and the ITM are provided. According to conventional processes, it is advantageous for surfaces of the ITM to have hydrophobic properties, for example using silicone-based release surfaces, in order to facilitate image transfer of the dried image to substrate. However, if one were to apply an aqueous ink directly to such a hydrophobic surface, the ink would bead on the hydrophobic surface, which might appreciably detract from image quality. In order to facilitate ink reception, the surface of the ITM is first 'conditioned' before depositing droplets of the aqueous ink (i.e. comprising the coloring agent and the binder) on the ITM (e.g. by ink-jetting). In particular, it is possible (step S109) to first apply a wet layer of conditioner to the ITM to 'condition' the ITM surface, where a surface energy of the conditioner exceeds that of the ITM surface but is less than that of the aqueous ink. This conditioner layer is completely dried (step S113). Subsequently, droplets of the aqueous ink are deposited onto the completely-dried conditioner layer in step S117.

In step S117, the ink-jetting of droplets of aqueous ink forms an ink image on top of the dried layer of conditioner. This ink image is sufficiently heated (i.e. to evaporate solvent of the ink) in step S121 to convert the ink image into a tacky residue-film. In particular, evaporation of solvent of the ink increases the viscosity of the jetted drop to solidify the ink-image. Furthermore, the heating in step S121 also serves to soften the binder of the ink so that the ink residue-film is tacky. The tacky residue-film ink-image is then transferred (e.g. together with the dried conditioner layer, or without this layer) to the printing substrate in step S125.

A presence of binder within the original ink (i.e. droplets of which are deposited in step S117) is critical for ensuring that the residue film ink-image produced (i.e. on top of the dried conditioner layer) in step S121 is a tacky residue-film. This tackiness property increases the ability of the residue-film to adhere to the substrate as compared to its previous ability to adhere to the transfer member. Because complete transfer of the ink-image in step S125 is absolutely essential to a technologically and commercially viable process, it is a requirement that inks employed in indirect printing processes contain a sufficient fraction of binder such that the residue film formed in step S121 is a tacky residue film.

The temperature of the tacky residue film on the intermediate transfer member is typically higher than the temperature of the substrate, whereby the residue film cools during adhesion to the substrate.

By suitable selection of the thermo-rheological characteristics of the residue film (i.e. due to a presence of a sufficient quantity of binder in the aqueous ink provided in step S101 and ink-jetted in step S117), the effect of the cooling may be to increase the cohesion of the residue film, whereby the residue film cohesion exceeds the residue film adhesion to the transfer member, so that, in an ideal process, all of the residue film is separated from the intermediate transfer member and impressed as a film onto the substrate.

In conclusion, it is desirable for indirect digital printing processes to provide, inter alia, the following properties: (i) avoiding the beading of aqueous ink droplets over the surface of the ITM; and (ii) good transfer properties (e.g. due to tackiness) of the ink-image residue film so that an entirety of the ink-image is transferred from the ITM surface to substrate.

The second property, relatively complete transfer of ink images from the ITM surface to the substrate, is of particular importance. Not only can incomplete image transfer lead to discontinuities or other defects in the image on the final surface, incomplete transfer of ink images leaves an ink residue on a section of the ITM surface. This residue must be cleaned, and practically, this is not always possible. In situations where the ink residue is not cleaned or not fully cleaned, the ITM surface exhibits a 'memory', which can harm or destroy the quality of subsequent images printed using the ITM surface.

Because of the need for 'complete image transfer' (step S125) from the ITM to substrate, the role of binder as an ingredient of the ink is considered essential. In particular, aqueous inks typically contain a sufficient quantity of polymeric binder or resin to enable the hot, tacky, dried ink-image (e.g. film) to transfer to the printing substrate, and to provide sufficient cohesiveness to the dried ink-image upon transfer from the ITM to substrate—i.e. so that the dried ink-image does not split or break apart during transfer.

Although printing with aqueous ink is considered more environmentally friendly than printing with inks based on various organic solvents, aqueous printing technologies are still developing. There is an ongoing need for methods, apparatus, and compositions that can reduce the cost of indirect digital printing with aqueous inks and/or improve the quality of the resulting images and/or reduce the amount of equipment maintenance and/or improve the process in any other manner.

SUMMARY

Embodiments of the invention relate to a process of indirect printing where an ink-image-bearing residue film is manufactured on a surface of an ITM (e.g. having a silicone-based release layer) and heated on the ITM surface to a transfer temperature $T_{TRANSFER}$. At the transfer temperature $T_{TRANSFER}$, the residue film is tacky. When tacky and at the transfer temperature $T_{TRANSFER}$, the residue film is transferred from the ITM the printing substrate.

The tacky ink-image-bearing residue film is produced as follows. First and second aqueous liquid ink components are delivered sequentially to the ITM surface. On the ITM surface, the second aqueous component mixes with, or penetrates into a layer of, the previously-delivered and partially dried first component on the ITM surface to form thereon a wet colored ink-image, which is heated and dried on the ITM surface.

In different examples, the transfer temperature $T_{TRANSFER}$ at which this occurs is both (i) at most 115° C., at most 110° C., at most 105° C., at most 100° C., at most 95° C., or at most 90° C., and (ii) at least 60° C., at least 65° C., at least 70° C., at least 75° C., at least 80° C., or at least 85° C.

For example, the first component is transparent and the second component is colored (e.g. comprising colorant particles and/or a dye).

In embodiments of the invention, a concentration of binder (or of specific types of binder) in the first component significantly exceeds the binder concentration (or the concentration of specific types of binder) of binder in the second component. In some embodiments, (i) as a pure component, the second component (i.e. colored) by itself, lacks sufficient binder to produce the tacky dry ink-image-bearing residue film at this aforementioned 'transfer temperature' $T_{TRANSFER}$ and (ii) nevertheless, a concentration of binder in a 5:1 weight-ratio mixture of the first and second components (and more typically, in a 4:1, 3:1, 2.5:1 or 2:1 weight-ratio of mixture) is sufficient to produce the tacky dry ink-image-bearing residue film at the 'transfer temperature' $T_{TRANSFER}$.

In a first example, both the first and second components are delivered digitally (e.g. by droplet deposition—for example, by ink-jetting) according to a pre-determined image pattern (e.g. which is stored in computer memory and accessed by a digital computer controlling operation of ink-jet print head(s)). According to a second example, the first component is applied to the ITM surface as a continuous wet layer over a relatively large area (e.g. at least 1 cm by 1 cm, and typically more) of the ITM surface.

In non-limiting embodiments, the binder in the first ink component (and hence in the 5:1 weight-ratio mixture) comprises a polymer such as a film-forming polymer—e.g. a polymer capable of forming a film residue, and that may be sufficiently coherent to transfer from the ITM surface to the printing substrate without breaking apart on or before transfer.

For the present disclosure, a 'dry film glass transition temperature $T_g^{dry\_film}$' of an ink component (or of a mixture between two ink components) is defined as a glass transition temperature of a dry film formed from an ink component (or from the mixture of components).

Some embodiments relate to a relation between (i) a dry film glass transition temperature $T_g^{dry\_film}$ ($2^{nd}$ component; pure) of the second component (i.e. as a pure component); and (ii) a dry film glass transition temperature $T_g^{dry\_film}$ (5:1 $2^{nd}$ component:$1^{st}$ component) of a 5:1 weight-ratio mixture of the first and second components (and substantially as above, in a 4:1, 3:1, 2.5:1 or 2:1 weight-ratio mixture).

In order to enable in-situ mixing between the two ink components (i.e. since the second ink component, in-and-of-itself may be incapable of forming the dried tacky film at the required temperature) on the ITM surface, the second ink component may be delivered to the ITM surface before the first ink component has had opportunity to completely dry on the ITM surface.

According to example embodiments of the invention, the presently-disclosed indirect printing process includes (i) a first stage where a quantity of the first ink component is delivered (e.g. by ink-jetting or by spreading) to a target surface of the ITM to cover a portion thereof with a volume of the first ink component—this first ink component is only partially dried during the first stage to produce a partially-dried layer of the first component on the ITM surface; (ii) a subsequent second stage where droplets of the second component are deposited (e.g. digitally deposited) onto the partially-dried layer of the first component so that the first and second components mix in situ and eventually form (i.e. after heating and drying) a tacky ink-image-bearing residue film; and (iii) a subsequent third stage where this tacky ink-image-bearing residue film is transferred (e.g. by pressured contact) from the ITM surface to substrate.

In some embodiments, the first stage is performed such that a wet thickness of the volume of the first component on the target ITM surface is at least 6 μm or at least 7.5 μm or at least 8.5 μm or at least 10 μm or at least 12 μm. Not wishing to be bound by theory, it is believed that gravitational forces acting upon the relatively 'thick' first component volume may be useful for counteracting a thermodynamic tendency towards beading of the aqueous first ink component on the silicone-based release layer of the ITM.

In some embodiments, the first stage is performed such that this wet thickness is within a range of 6 to 30 μm, 6 to 25 μm, 7 to 20 μm, 8 to 25 μm, 8 to 20 μm, 10 to 25 μm, 10 to 20 μm, 10 to 18 μm, 10 to 16 μm, 11 to 25 μm, 11 to 20 μm, 12 to 25 μm, or 12 to 20 μm.

Embodiments of the invention relate to features that minimize and/or counteract this thermodynamic tendency towards beading of the first component on the ITM surface.

Thus, in some embodiments, even though the first component is aqueous, a static surface tension of the first component at 25° C. is at most 40 dynes/cm. For example, a presence of at least one surfactant (e.g., surface energy modifiers) in the first component may result in a static surface tension that is appreciably reduced with respect to water, or with respect to the identical first component, sans surfactant.

Alternatively, or additionally, in embodiments of the invention, even though the release layer of the ITM is silicone-based, (i) the silicone-based release layer surface is sufficiently hydrophilic so that a receding contact angle of a drop of distilled water deposited on the silicone-based release layer surface is at most 60°; and/or (ii) a 10-second dynamic contact angle (DCA) of a drop of distilled water deposited on the silicone-based release layer surface is at most 108°.

Non-limiting methods of manufacturing such a silicone-based release layer are described below.

In embodiments of the invention, the second ink component is applied (i.e. by droplet-deposition) to the partially dried layer of the first ink component before this layer is completely dried—when the layer of the first ink component is sufficiently moist and permeable so that at least a portion of the colorant particles penetrate into the partially-dried layer of the first ink component.

In embodiments of the invention, the operating parameters of the printing system or of component(s) thereof are controlled such that (e.g. per droplet of second ink component that is delivered to the layer of first ink component) at least majority, or at least 75% of, or at least 90% of, or substantially all of the colorant particles penetrate into the partially-dried layer of the first ink component.

In embodiments of the invention, the operating parameters of the printing system or of component(s) thereof are controlled such that the colorant particles penetrate completely into the partially-dried layer of the first ink component, so as to form a single, unified layer on the release layer, and/or to ultimately form, on the release layer and/or on the printing substrate, a single merged layer (generally parallel to the release layer and printing substrate, respectively) in which the solids of the $1^{st}$ and $2^{nd}$ ink components co-reside.

Although this penetration is desirable, in embodiments of the invention, the printing process is controlled so as to limit the extent of penetration of the second component—e.g. to prevent a situation where the second component (or portions thereof, e.g., pigment particles) completely bleeds through the layer of the first component so as to contact the release layer or target surface of the ITM.

In different embodiments, one or more of (i.e. any combination of) the following features may be useful for preventing such a situation: (i) when a volume of the first component initially covers a portion of the ITM, a thickness of this volume is at least 6μ or at least 7.5μ or at least 8.5 μm or at least 10μ—even if subsequent evaporation reduces a covering thickness, the high initial thickness may help to insure that the second component does not have an opportunity to bleed through the entire thickness to contact the release layer surface of the ITM; (ii) a 60° C. evaporation load of the $1^{st}$ ink component is at most 10:1 or at most 9:1 or at most 8:1 or at most 7:1 or at most 6:1 or at most 5:1 or at most 4:1 or at most 3.5:1 or at most 3:1—this bounded evaporation load may promote or help ensure that the viscosity of the layer of the first component increases sufficiently quickly, with the initial evaporation therefrom, to prevent colorant particles of the second component from bleeding through the entire first component layer and contact the release layer of the ITM. Although a rapid increase in the dynamic viscosity of the partially-dried layer of the first ink-component may be desirable to prevent contact between colorant particles and the ITM release layer, in embodiments of the invention the dynamic viscosity increase should be controlled or moderated, so as to enable mixing between the first and second ink components.

Thus, some embodiments relate to regulating a degree of penetration of the second ink component beneath the upper surface of the layer of the first ink component—i.e. not too little, not too much. Thus, in different embodiments, the degree of penetration may be sufficient for adequate in-situ mixing between the first and second components to occur—e.g. at least 25% or at least a majority or at least 75% or an entirety of the second ink component may penetrate beneath an upper surface of the layer of the first ink component. Nevertheless, although some penetration of the second ink component into the layer of the first ink component is advantageous, the process may be performed so that the second ink component does not fully penetrates through an entirety of the layer of the first ink component so as to contact the ITM.

In some embodiments, the provided ITM comprises: (a) a support layer; and (b) a release layer having an ink reception surface for receiving an ink image, and a second surface opposing said ink reception surface, said second surface attached to said support layer, said release layer formed of an addition-cured silicone material, said release layer having a thickness of at most 500 micrometers (μm); the ITM satisfying at least one of the following structural properties: (1) a total surface energy of said ink reception surface is at least 2 mN/m, at least 3 mN/m, at least 4 mN/m, at least 5 mN/m, at least 6 mN/m, at least 8 mN/m, or at least 10 mN/m higher than a total surface energy of a modified ink reception surface produced by subjecting an ink reception surface of a corresponding release layer to a standard aging procedure; (2) a total surface energy of said ink reception surface is at least 4 mN/m, at least 6 mN/m, at least 8 mN/m, at least 10 mN/m, at least 12 mN/m, at least 14 mN/m, or at least 16 mN/m higher than a total surface energy of a hydrophobic ink reception surface of a corresponding release layer prepared by standard air curing of a silicone precursor of said cured silicone material; (3) a receding contact angle of a droplet of distilled water on said ink reception surface is least 7°, at least 8°, at least 10°, at least 12°, at least 14°, at least 16°, at least 18°, or at least 20° lower than a receding contact angle of a droplet of distilled water on an ink reception surface of a corresponding release layer prepared by standard air curing of a silicone precursor of said cured silicone material; (4) a receding contact angle of a droplet of distilled water on said ink reception surface is at least 5°, at least 6°, at least 7°, or at least 8° lower than a receding contact angle of a droplet of distilled water on an aged surface, produced by subjecting said ink reception surface to a standard aging procedure; (5) a surface hydrophobicity of said ink reception surface is less than a bulk hydrophobicity of said cured silicone material within said release layer, said surface hydrophobicity being characterized by a receding contact angle of a droplet of distilled water on said ink reception surface, said bulk hydrophobicity being characterized by a receding contact angle of a droplet of distilled water disposed on an inner surface formed by exposing an area of said cured silicone material within said release layer to form an exposed area; wherein said receding contact angle measured on said ink reception surface is at least 7°, at least 8°, at least 10°, at least 12°, at least 14°, at least 16°, at least 18°, or at least 20° lower than said receding contact angle measured on said exposed area; and (6) a receding contact angle of a droplet of distilled water on said ink reception surface is at most 60°, at most 58°, at most 56°, at most 54°, at most 52°, at most 50°, at most 48°, at most 46°, at most 44°, at most 42°, at most 40°, at most 38°, or at most 36°.

In some embodiments, in functional groups make up at most 5%, at most 3%, at most 2%, or at most 1%, by weight, said addition-cured silicone material, or wherein said addition-cured silicone material is substantially devoid of said functional groups. In some embodiments, a polyether glycol functionalized poly-dimethyl siloxane is impregnated in said addition-cured silicone material.

In some embodiments, a polyether glycol functionalized siloxane is impregnated in said addition-cured silicone material, but without forming a part of a covalent structure of said addition-cured silicone material.

In some embodiments, the intermediate transfer member (ITM) (e.g. this may be the ITM that is the 'provided ITM') is for use with a printing system, the ITM comprising: (a) a support layer; and (b) a release layer having an ink reception surface for receiving an ink image, and a second surface opposing said ink reception surface, said second surface attached to said support layer, said release layer formed of an addition-cured silicone material, said release layer having a thickness of at most 500 micrometers (μm); said ink reception surface is adapted to satisfy at least one of the following structural properties: (i) a receding contact angle of a droplet of distilled water on said ink reception surface is at most 60°; (ii) for a droplet of distilled water deposited on said ink reception surface, a 10 second dynamic contact angle (DCA) is at most 108°; and wherein said release layer has at least one of the following structural properties: (1) said addition-cured silicone material consisting essentially of an addition-cured silicone, or containing, by weight, at least 95% of said addition-cured silicone; (2) functional groups make up at most 3%, by weight, of said addition-cured silicone material.

In some embodiments, the provided ITM has this feature: a polyether glycol functionalized siloxane is impregnated in said addition-cured silicone material, but without forming a part of a covalent structure of said addition-cured silicone material.

In some embodiments, the provided ITM has this feature: said thickness of said release layer is at most 500 μm, at most 100 μm, at most 50 μm, at most 25 μm, or at most 15 μm.

In some embodiments, the provided ITM has this feature: said thickness of said release layer is within a range of 1-100 μm, 5-100 μm, 8-100 μm, 10-100 μm, or 10-80 μm.

In some embodiments, the provided support layer of the ITM has a thickness of said support layer is within a range of about 50-1000 micrometers (μm), 100-1000 μm, 100-800 μm, or 100-500 μm.

In some embodiments, the provided ITM has this feature: a total surface energy of the ink reception surface is at least 2 J/m$^2$, at least 3 J/m$^2$, at least 4 J/m$^2$, at least 5 J/m$^2$, at least 6 J/m$^2$, at least 8 J/m$^2$, or at least 10 J/m$^2$ higher than a total surface energy of a modified ink reception surface produced by subjecting an ink reception surface of a corresponding release layer to a standard aging procedure.

In some embodiments, the provided ITM has this feature: a total surface energy of the ink reception surface is at least 4 J/m$^2$, at least 6 J/m$^2$, at least 8 J/m$^2$, at least 10 J/m$^2$, at least 12 J/m$^2$, at least 14 J/m$^2$, or at least 16 J/m$^2$ more than a total surface energy of a hydrophobic ink reception surface of a corresponding release layer prepared by standard air curing of a silicone precursor of the cured silicone material.

In some embodiments, the provided ITM has this feature: a receding contact angle of a droplet of distilled water on the ink reception surface is at least 7°, at least 8°, at least 10°, at least 12°, at least 15°, at least 18°, or at least 20° lower than a receding contact angle of a droplet of distilled water on an ink reception surface of a corresponding release layer prepared by standard air curing of a silicone precursor of the cured silicone material.

In some embodiments, a receding contact angle of a droplet of distilled water on the ink reception surface is at least 5°, at least 6°, at least 7°, or at least 8° lower than a receding contact angle of a droplet of distilled water on an aged surface, produced by subjecting the ink reception surface to a standard aging procedure.

In some embodiments, a surface hydrophobicity of the ink reception surface is less than a bulk hydrophobicity of the cured silicone material within the release layer, the surface hydrophobicity being characterized by a receding contact angle of a droplet of distilled water on the ink reception surface, the bulk hydrophobicity being characterized by a receding contact angle of a droplet of distilled water disposed on an inner surface formed by exposing an area of the cured silicone material within the release layer to form an exposed area. In some embodiments, the provided ITM (i.e. of the method of printing) has this feature: a receding contact angle measured on the ink reception surface is at least 7°, at least 8°, at least 10°, at least 12°, at least 14°, at least 16°, at least 18°, or at least 20° lower than the receding contact angle measured on the exposed area.

In some embodiments, said receding contact angle of said droplet of distilled water on the ink reception surface is at least 25°, at least 28°, at least 30°, at least 32°, at least 34°, or at least 36°, and further optionally, within a range of 25° to 60°, 28° to 60°, 30° to 60°, 30° to 60°, 30° to 55°, 30° to 50°, 32° to 60°, 32° to 55°, 32° to 44°, 35° to 60°, 35° to 55°, 36° to 44°, or 38° to 50°.

In some embodiments, the release layer is adapted such that when the ITM is in an operative mode, with said ink reception surface exposed to an ambient environment, said polar groups of the ink reception surface have an orientation towards or facing said ambient environment.

In some embodiments, the provided ITM forms a component of a digital printing system and comprises a release layer which contains, within a silicone polymer matrix thereof, a total amount of at most 3%, at most 2%, at most 1%, at most 0.5%, at most 0.2%, or substantially 0% of functional groups, by weight.

In some embodiments, the provided ITM has this feature: said release layer contains, within a silicone polymer matrix thereof, a total amount of at most 3%, at most 2%, at most 1%, at most 0.5%, at most 0.2%, or substantially 0%, by weight, of functional groups selected from the group of moieties consisting of C=O, S=O, O—H, and COO.

In some embodiments, the provided ITM has this feature: said release layer contains, within a silicone polymer matrix thereof, a total amount of at most 3%, at most 2%, at most 1%, at most 0.5%, at most 0.2%, or substantially 0%, by weight, of functional groups selected from the group consisting of silane, alkoxy, amido, and amido-alkoxy moieties.

In some embodiments, the provided ITM has this feature: said release layer contains, within a silicone polymer matrix thereof, a total amount of at most 3%, at most 2%, at most 1%, at most 0.5%, at most 0.2%, or substantially 0%, by weight, of functional groups selected from the group consisting of amine, ammonium, aldehyde, $SO_2$, $SO_3$, $SO_4$, $PO_3$, $PO_4$, and C—O—C.

In some embodiments, the provided ITM has an addition-cured silicone material having a structure built from a vinyl-functional silicone. The addition-cured silicone material may include polar groups of the "MQ" type.

In some embodiments, the provided ITM has a total surface energy of said ink reception surface is evaluated using the Owens-Wendt Surface Energy Model.

In some embodiments, the provided ITM has a 10 second DCA of at most 108°, at most 106°, at most 103°, at most 100°, at most 96°, at most 92°, or at most 88°, optionally at least 60°, at least 65°, at least 70°, at least 75°, at least 78°, at least 80°, at least 82°, at least 84°, or at least 86°, and further optionally, within a range of 60 to 108°, 65 to 105°, 70 to 105°, 70 to 100°, 70 to 96°, 70 to 92°, 75 to 105°, 75 to 100°, 80 to 105°, 80 to 100°, 85 to 105°, or 85 to 100°.

In some embodiments, the provided ITM has an ink reception surface adapted such that, for said droplet of distilled water deposited on said ink reception surface, said difference between said 70 second dynamic contact angle (DCA) and said 10 second DCA, is at least 7°, at least 8°, at least 10°, or at least 12°, optionally at most 25°, at most 22°, at most 20°, at most 18°, or at most 17°, and further optionally, within a range of 6 to 25°, 6 to 22°, 6 to 20°, 6 to 18°, 6 to 17°, 7 to 25°, 7 to 20°, 7 to 17°, 8 to 25°, 8 to 22°, 18 to 20°, 8 to 18°, 8 to 17°, 10 to 25°, 10 to 22°, 10 to 20°, 10 to 18°, or 10 to 17°. In some embodiments, said ink reception surface is adapted whereby, for said droplet of distilled water deposited on said ink reception surface, said 70 second DCA is at most 92°, at most 90°, at most 88°, at most 85°, at most 82°, at most 80°, at most 78°, at most 76°, at most 74°, or at most 72°, optionally at least 55°, at least 60°, at least 65°, or at least 68°, and further optionally, within a range of 55 to 92°, 55 to 90°, 55 to 85°, 55 to 80°, 65 to 92°, 65 to 90°, 65 to 85°, 65 to 80°, 68 to 85°, 68 to 80°, 70 to 92°, 70 to 90°, 70 to 85°, or 70 to 80°.

In some embodiments, the substrate is selected from the group consisting of an uncoated fibrous printing substrate, a commodity coated fibrous printing substrate, and a plastic printing substrate.

In some embodiments, the printing substrate is a paper, optionally selected from the group of papers consisting of bond paper, uncoated offset paper, coated offset paper, copy paper, ground wood paper, coated ground wood paper, freesheet paper, coated freesheet paper, and laser paper.

In some embodiments, the silicone-based release layer surface is sufficiently hydrophilic such that a 10-second dynamic contact angle (DCA) of a drop of distilled water deposited on the silicone-based release layer surface is at most 108°.

In some embodiments, the provided ITM comprises a support layer and a release layer having said silicone-based release layer surface and a second surface that (i) opposes said silicone-based release layer surface, and (ii) is attached to said support layer, and wherein said release layer is formed of an addition-cured silicone material, and wherein a thickness of said release layer is at most 500 micrometers (μm).

In different embodiments, the presently disclosed digital printing system may provide any feature or combination of features disclosed anywhere in the present document (e.g. controlled to perform any method disclosed herein).

BRIEF DESCRIPTION OF THE DRAWINGS

Some embodiments of the printing system are described herein with reference to the accompanying drawings. The description, together with the figures, makes apparent to a person having ordinary skill in the art how the teachings of the disclosure may be practiced, by way of non-limiting examples. The figures are for the purpose of illustrative discussion and no attempt is made to show structural details of an embodiment in more detail than is necessary for a fundamental understanding of the disclosure. For the sake of clarity and simplicity, some objects depicted in the figures are not to scale.

In the Figures:

FIGS. 3-4, 5A-5I, and 6A-6I schematically illustrate printing systems or components thereof according to example embodiments;

FIG. 7A schematically shows a section through a carrier;

FIGS. 7B to 7F schematically exhibit different stages in the manufacture of an ITM, according to the present disclosure;

FIG. 7G is a section through a finished ITM after installation in a printing system;

DETAILED DESCRIPTION OF EMBODIMENTS

Figure 1:
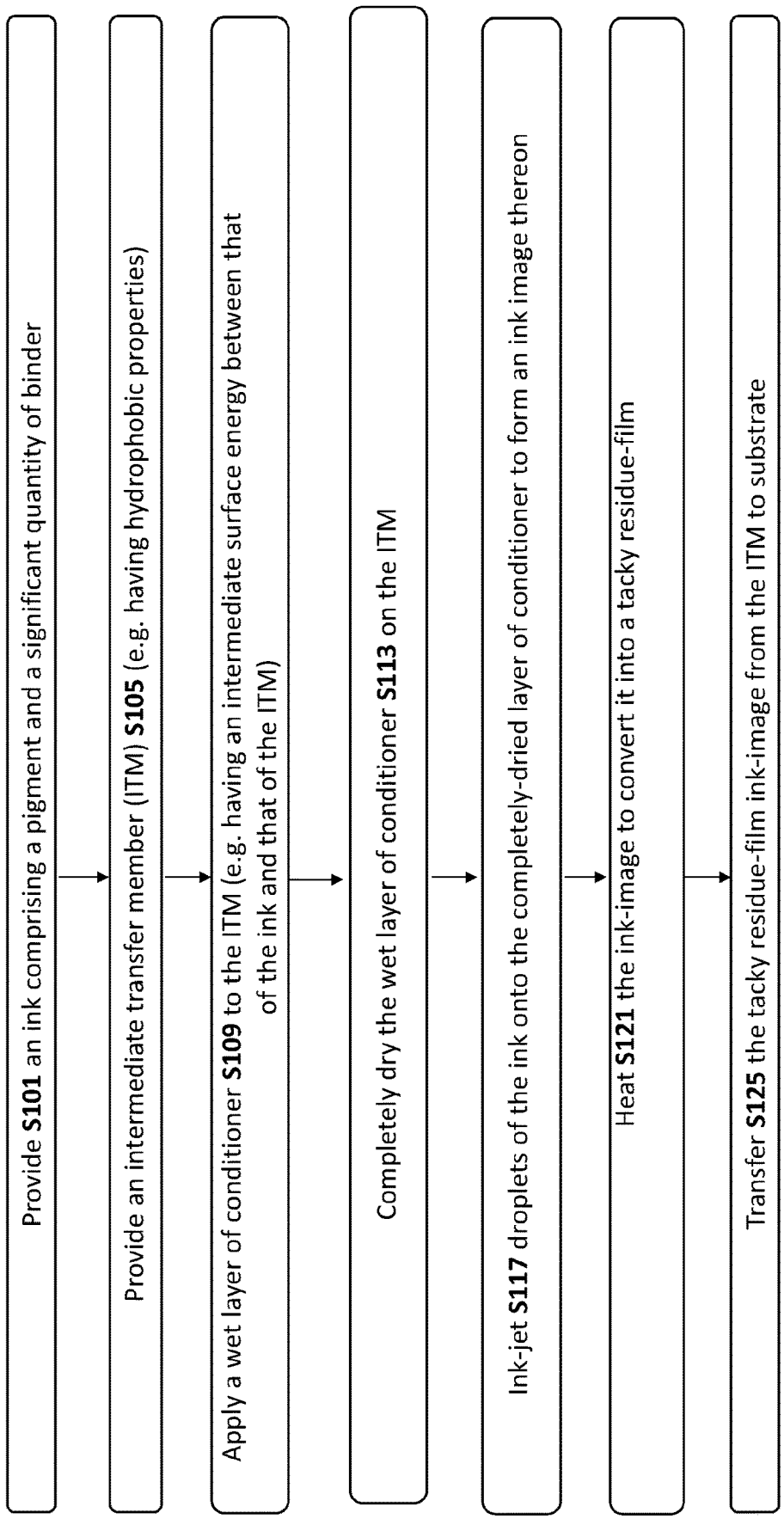
FIG. 1 is a flow chart of a prior art printing process.

The invention is herein described, by way of example only, with reference to the accompanying drawings. With specific reference now to the drawings in detail, it is stressed that the particulars shown are by way of example and for purposes of illustrative discussion of the preferred embodiments of the present invention only, and are presented in the cause of providing what is believed to be the most useful and readily understood description of the principles and conceptual aspects of the invention. In this regard, no attempt is made to show structural details of the invention in more detail than is necessary for a fundamental understanding of the invention, the description taken with the drawings making apparent to those skilled in the art how the several forms of the invention may be embodied in practice. Throughout the drawings, like-referenced characters are generally used to designate like elements.

Definitions

Within this application, the following terms should be understood to have the following meaning:

a1) the term "receding contact angle" or "RCA", refers to a receding contact angle as measured using a Data physics OCA15 Pro Contact Angle measuring device, or a comparable Video-Based Optical Contact Angle Measuring System, using the above-described Drop Shape Method, at ambient temperatures. The analogous "advancing contact angle", or "ACA", refers to an advancing contact angle measured substantially in the same fashion, using the method elaborated by Dr. Roger P. Woodward in the above-referenced "Contact Angle Measurements Using the Drop Shape Method", at ambient temperatures, and as elaborated herein below in EXAMPLE 46.

a2) the term "dynamic contact angle" or "DCA", refers to a dynamic contact angle as measured using a Data physics OCA15 Pro Contact Angle measuring device, or a comparable Video-Based Optical Contact Angle Measuring System, using the method elaborated by Dr. Roger P. Woodward in the above-referenced "Contact Angle Measurements Using the Drop Shape Method", at ambient temperatures, and as elaborated herein below in EXAMPLE 53.

b) the term "standard aging procedure" refers to an accelerated aging protocol performed on each tested release layer at 160° C., for 2 hours, in a standard convection oven.

c) the term "standard air curing" refers to a conventional curing process for curing the release layer, in which, during the curing of the release layer, the release layer surface (or "ink reception surface") is exposed to air.

d) the term "bulk hydrophobicity" is characterized by a receding contact angle of a droplet of distilled water disposed on an inner surface of the release layer, the inner surface formed by exposing an area of the cured silicone material within the release layer.

e) the term "image transfer member" or "intermediate transfer member" or "transfer member" refers to the component of a printing system upon which the ink is initially applied by the printing heads, for instance by inkjet heads, and from which the jetted image is subsequently transferred to another substrate or substrates, typically, the final printing substrates.

f) the term "blanket" refers to a flexible transfer member that can be mounted within a printing device to form a belt-like structure on two or more rollers, at least one of which is able to rotate and move the blanket (e.g. by moving the belt thereof) to travel around the rollers.

g) the term "on the release surface" with respect to an object such as an ink image or ink residue, means supported by and/or over that release surface. The term "on the release surface" does not necessarily imply direct contact between the ink image or ink residue and the release surface.

h) the term "has a static surface tension sufficiently high so as to increase said static surface tension of the aqueous treatment formulation", and the like, with regard to a particular surfactant within that formulation, is evaluated by adding an additional quantities or aliquots of that particular surfactant to the formulation, and comparing the attained static surface tension of the formulation with the static surface tension of the formulation prior to the addition of those aliquots.

i) the term "liquid hygroscopic agent" refers to a hygroscopic agent that is liquid at least one temperature within the range of 25° C.-90° C., and has, in a pure state and at 90° C., a vapor pressure of at most 0.05 ata, and more typically, at most 0.02 ata, at most 0.01 ata, or at most 0.003 ata. The term "liquid hygroscopic agent" is specifically meant to refer to materials like glycerol.

j) the terms "hydrophobicity" and "hydrophilicity" and the like, may be used in a relative sense, and not necessarily in an absolute sense.

k) the term '(treatment) formulation' refers to either a solution or a dispersion.

l) an x degrees' Celsius evaporation load is now defined, where x is a positive number. When a solution is y % solids wt/wt and z % liquid wt/wt at x degrees Celsius, the 'x-degrees Celsius evaporation load' of the solution is that ratio z/y. The units of 'evaporation load' are "weight solvent per weight total solute.' For the present disclosure, evaporation load is always defined at atmospheric pressure. For the present disclosure, a default value of 'x' is 60 degrees C.—the term 'evaporation load' without a prefix specifying a temperature refers to a 60 degrees' Celsius evaporation load at atmospheric pressure.

m) when a portion of an ITM is in motion at a speed of v meters/second, this means that the portion of the blanket ITM moves in a direction parallel to its local surface/plane at a speed of at least v meters/second—e.g. relative to an applicator which is stationary.

n) the term 'Static surface tension' refers to the static surface tension at 25° C. and atmospheric pressure.

o) the term 'thickness' of a wet layer may be determined as follows: when a volume of material (herein "vol") covers a surface area of a surface having an area SA with a wet layer—the thickness of the wet layer is assumed to be vol/SA.

p) the term 'thickness' of a dry film is defined as follows. When a volume of material vol that is x % liquid, by weight, wets or covers a surface area SA of a surface, and all the liquid is evaporated away to convert the wet layer into a dry film, a thickness of the dry film is assumed to be:

$$\text{Vol}/\rho_{wet\ layer}(100-x)/(SA \cdot \rho_{dry\ layer})$$

where $\rho_{wet\ layer}$ is the specific gravity of the wet layer and $\rho_{dry\ layer}$ is the specific gravity of the dry layer.

q) the term 'cohesive film' refers to a construct which stays together when peeled away from a surface to which it is adhered—i.e. when peeled away from the surface, the 'cohesive film' retains it structural integrity and is peeled as a skin, rather than breaking into little pieces.

r) unless stated otherwise, physical properties of a liquid (e.g. treatment formulation) such as viscosity and surface tension, refer to the properties at 25° C.

s) unless stated otherwise, a 'concentration' refers to a wt/wt—i.e. a weight of a component of formulation per total weight of that formulation.

t) the term "functional group" refers to a group or moiety attached to the polymer structure of the release layer, and having a higher polarity than the O—Si—O group of conventional addition-cured silicones. Various examples are provided herein. The inventors observe that pure addition cure poly-dimethyl siloxane polymer contains O—Si—O, $SiO_4$, Si—$CH_3$ and C—C groups, and that most other functional groups will have a higher dipole, such that they may be considered "functional". It will be appreciated by those of skill in the art that such functional groups, may have a tendency or strong tendency to react with components typically present in aqueous inks utilized in indirect inkjet printing, at process temperatures of up to 120° C.

u) the term "transparent", with respect to an ink component such as the first aqueous ink component, refers to at least one of: (i) an opacity of at most 4%, and more typically, at most 3%, at most 2.5%, at most 2%, at most 1.5%, or at most 1.2%, as elaborated in EXAMPLE 8 herein below; (ii) having a colorant (e.g. pigment) content of at most 0.2%, at most 0.1%, at most 0.05%, or at most 0.02%, or being substantially devoid of such colorant; (iii) being transparent, as measured or characterized by those of skill in the art of printing; and (iv) being transparent, as understood by those of skill in the art of printing.

v) the term "resoluble", "re-solubility", and the like, with respect to an ink component such as the second aqueous ink component, refers to a feature as determined by the Re-solubility Characterization procedure provided below in EXAMPLE 25.

w) the term "transfer temperature", and the like, refers to the temperature as measured by an IR thermometer pointed at the release surface of the blanket, at the nip area.

x) the term "5:1 weight ratio of the $1^{st}$ and $2^{nd}$ ink components", and the like, with respect to one or more dry ink films, refers to the weight of the dry film of the $1^{st}$ ink component divided by the weight of the dry film of the $2^{nd}$ ink component.

Figure 2:
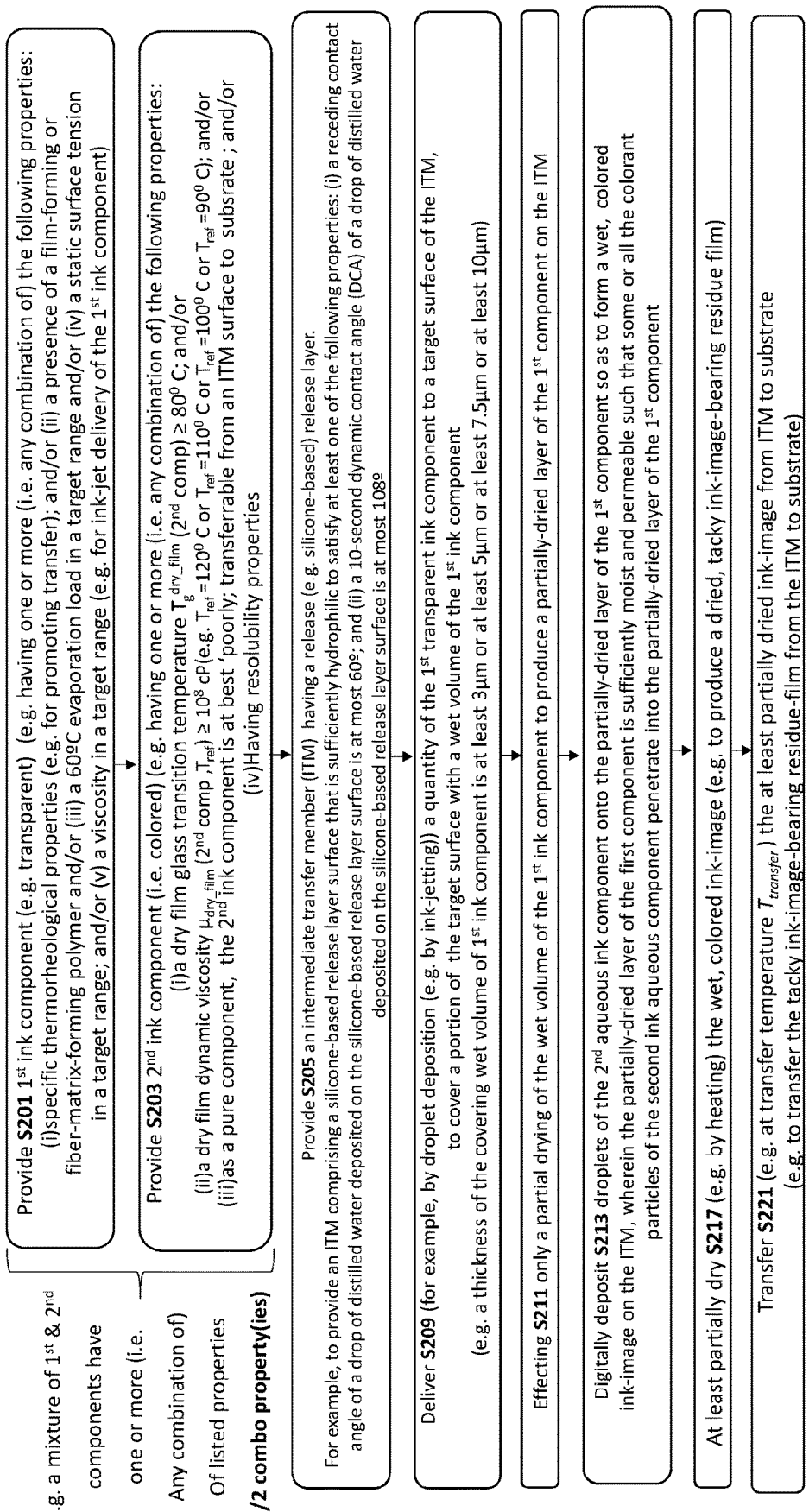
FIG. 2 is a flow chart of a printing process in accordance with some aspects and embodiments of the invention.

A Discussion of FIG. 2

Figure 3:
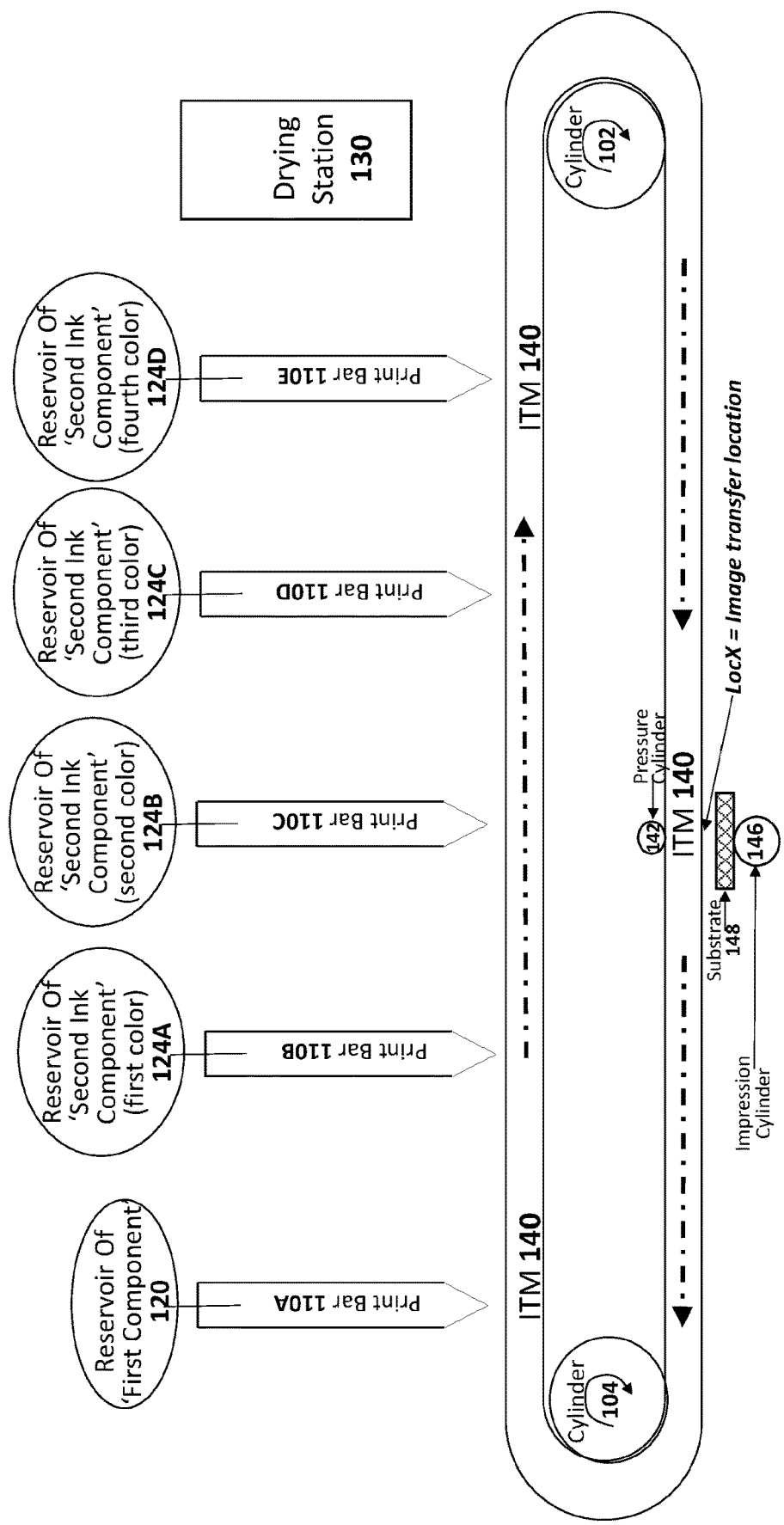
Figure 4:
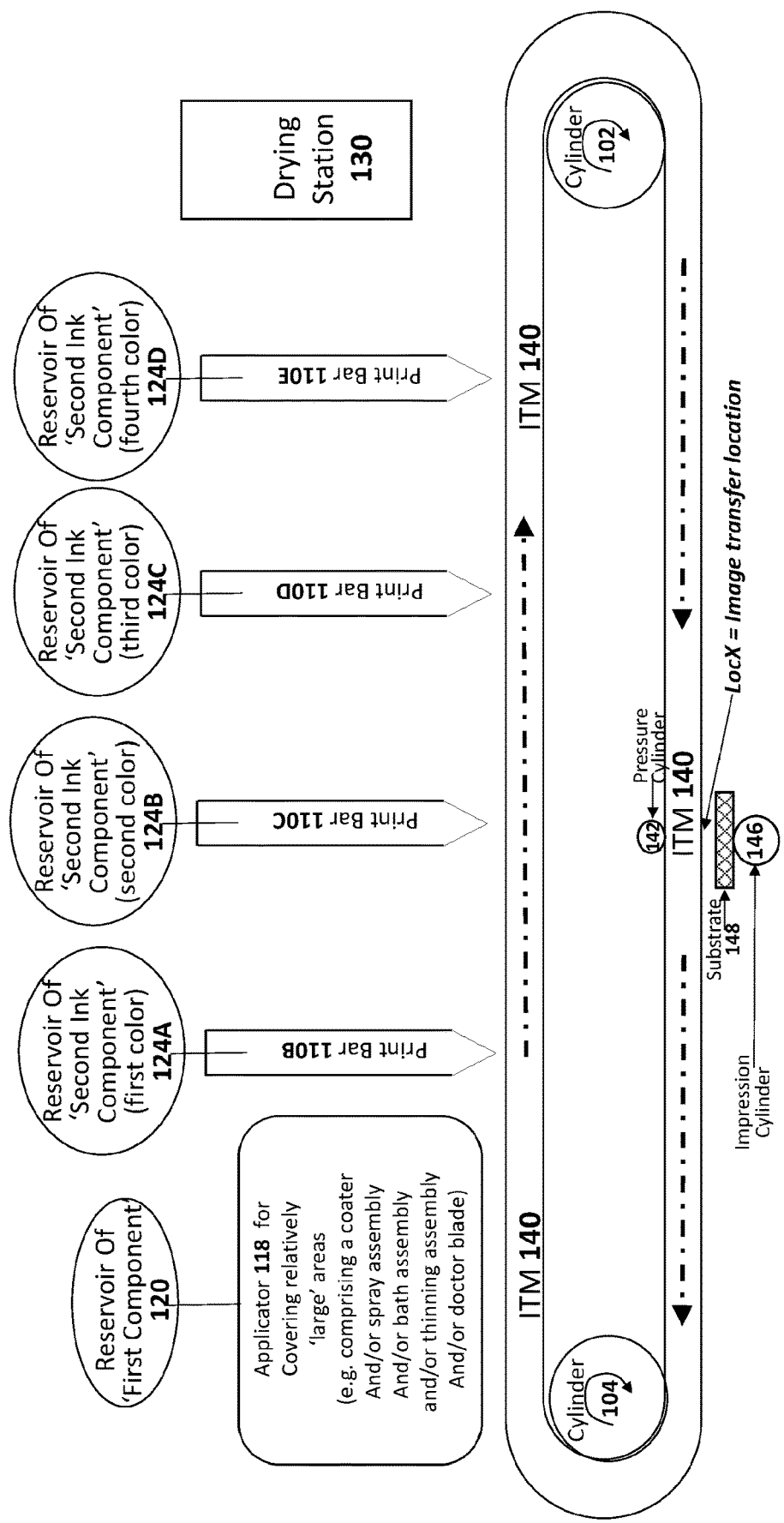

FIG. 2 is a flow-chart of a method of indirect printing by an aqueous ink onto a (e.g. silicone-based) release layer surface of an intermediate transfer member (ITM), In some embodiments, the method of FIG. 2 (or any combination of steps thereof) may be performed using apparatus (or component(s) thereof) disclosed in FIGS. 3 and 4, though not every component illustrated in these figures is required in every embodiment.

FIG. 2 includes steps S201, S203, S205, S209, S211, S213, S217 and S221.

In particular, steps S201-S205 relate to the ingredients or components or consumables used in the printing process of FIG. 2, while steps S209-S221 relate to the process itself. In particular, in step S221 a tacky ink-image-bearing residue film, which has been heated on the surface of the ITM to a transfer temperature $T_{TRANSFER}$, is transferred (i.e. when at the transfer temperature $T_{TRANSFER}$ from the ITM surface) to printing substrate. One or more features related to step S201 or S203, and one or more '1/2 combo properties' (defined below) are explained in terms of the transfer temperature $T_{TRANSFER}$ of step S221.

Briefly, the steps of FIG. 2 are as follows: (i) in steps S201 and S203. first and second components of an ink are provided (e.g. the first component is transparent) (e.g. the second component comprises colorant particles or dye); (ii) in step S205, an ITM (i.e. comprising a silicone-based release layer surface) is provided. Physical and chemical properties of the ink components (i.e. both each component individually, or as '1/2 combo properties'), and of the ITM, according to example embodiments, are discussed below.

In step S209, a quantity of the first ink component is delivered to a target surface of the ITM, to cover a portion of said target surface with a wet volume of said first ink component. For example, droplets of the first ink component may be deposited (e.g. by ink-jetting) onto the ITM target surface such the covered 'portion' of the target surface may be dis-contiguous. However, this is not a requirement, and in other examples, a relatively large contiguous region (e.g. at least 1 cm by 1 cm) may be covered in step S209.

In step S211, the wet volume of the first ink component is subjected only to a partial drying, to produce a partially-dried layer of the first component on the ITM.

In step S213, droplets of the second (e.g. comprising colorant such as pigment particles and/or a dye) ink component are deposited (e.g. digitally deposited) onto the partially-dried layer of the first component (i.e. which is produced in step S211) so as to form a wet, colored ink-image on the ITM. For example, the deposited droplets contact the partially-dried layer of the first component at a time when the partially-dried layer of the first component is sufficiently moist and permeable such that some or all (e.g. at least 10% of, or at least 30% of, or at least a majority of) the colorant particles of the second ink aqueous component penetrate into (i.e. penetrate beneath an upper surface thereof) the partially-dried layer of the first component.

In step S217, the wet, colored ink-image (i.e. which is formed in step S213) is at least partially dried. For example, at least partial trying of step S217 is performed at least in part by heating the ink-image. Alternatively or additionally, concurrently or after the at least partial drying the ink-image is heated on the ITM before the subsequent transfer of step S221. For example, the heating (e.g. performed in step S217 or subsequent thereto but before step S221) may serves to evaporate solvent. For example, the heating (e.g. performed in step S217 or subsequent thereto but before step S221) may be sufficient render the ink image tacky and/or produce a dried, tacky ink-image-bearing residue film. An "ink-image-bearing residue film" is a residue film that contains an ink image.

In step S221, the at least partially dried ink-image is transferred from the ITM to printing substrate. For example, in embodiments where a tacky ink-image-bearing residue-film is produced in step S217 or subsequently thereto, this tacky ink-image-bearing residue-film may be transferred (i.e. in step S221) from the ITM (e.g. a transfer surface thereof) to substrate. For example, during step S221 the tacky ink-image-bearing residue-film is at a 'transfer temperature' $T_{TRANSFER}$ that is, e.g. at most 115° C., at most 110° C., at most 105° C., at most 100° C., at most 95° C., at most 90° C., at most 85° C., at most 80° C., at most 75° C., at most 70° C. In embodiments of the invention, step S221 is performed by pressured contact between the ITM surface and the substrate—e.g. pressured contact in a nip region between two opposing cylinders where the ink-image-bearing residue film is disposed during transfer).

Generally speaking, the order of steps in FIG. 2 is not required. For example, steps S201-S205 may be performed in any order. In some embodiments, steps S209-221 are performed in the order listed in FIG. 2.

A Discussion of Step S201

In some embodiments, the first ink aqueous ink component of step S201 may provide (i.e. in pure form) one of more (i.e. any combination of) of the following features A1-A24:

A1. Min wt/wt water carrier liquid—In some embodiments, the provided (i.e. before delivery to the ITM—e.g. as stored in a reservoir) first aqueous ink component treatment formulation comprises at least 35% wt/wt water or at least 40% wt/wt water or at least 50% wt/wt water or at least 55% wt/wt water.

A2. Max wt/wt water carrier liquid—The provided (i.e. before delivery to the ITM—e.g. as stored in a reservoir) first aqueous ink component comprises at most 75% wt/wt water or at most 70% wt/wt water or at most 65% wt/wt water.

A3. wt/wt water carrier liquid (specific ranges)—The provided (i.e. before delivery to the ITM—e.g. as stored in a reservoir) first aqueous ink component comprises between 35% wt/wt and 75% wt/wt water or between 40% wt/wt and 75% wt/wt water or between 40% wt/wt and 70% wt/wt water or between 50% wt/wt and 70% wt/wt water.

A4. Evaporation load—In some embodiments, the provided (i.e. before delivery to the ITM—e.g. as stored in a reservoir) first aqueous ink component has a 60° C. evaporation load that may be at most 10:1, at most 9:1, at most 8:1, at most 7:1, at most 6:1, at most 5:1, at most 4:1, at most 3.5:1, or at most 3:1. Alternatively or additionally, the 60° C. evaporation load may be at least 2:1, at least 2.2:1, or at least 2.5:1. In some embodiments, the evaporation load is between 2:1 and 10:1. In some embodiments, the evaporation load is between 2:1 and 8:1. In some embodiments, the evaporation load is between 2.5:1 and 7:1. In some embodiments, the evaporation load is between 2.5:1 and 5:1. In some embodiments, the evaporation load is between 2.5:1 and 4:1. In some embodiments, the evaporation load is between 2.5:1 and 3.5:1. In some embodiments, the evaporation load is between 2.8:1 and 4:1. In some embodiments, the evaporation load is between 2.8:1 and 3.5:1.

Not wishing to be bound by theory, in some embodiments, having an evaporation load with a relatively 'low' upper bound may be useful for (i) increasing a rate at which a viscosity of the first component increases (e.g. in step S211—for example, so as to reduce and/or counteract a tendency of the first component to bead on the ITM surface) and/or (ii) increasing a rate at which the viscosity of the mixture of the first and second components increases (e.g. in step S217—for example, to prevent colorant particles from traversing an entirety of a layer of the first component ("bleeding through" to reach the ITM surface) to contact the ITM surface or release layer. This, may, for example, obviate the need for including or relying on a presence, in the first ink component, of chelating agents or other agents that rapidly fix the solids to the target surface.

A5. Comprising one or more binders (at a minimum and/or maximum wt %)—In some embodiments, the provided (i.e. before delivery to the ITM—e.g. as stored in a reservoir) first aqueous first ink component formulation comprises (i.e. as a wt % of the first ink component including the aqueous liquid carrier of the first aqueous ink component) at least 6% wt/wt or at least 7% or at least 8% or at least 9% or at least 10% or at least 11% or at least 12%.

Binder may be useful for rendering a residue-film tacky (e.g. at a relatively 'low temperature" and/or for playing a role in maintaining cohesively of the residue-film upon transfer. As will be discussed below, in embodiments of the invention: (i) a binder fraction of the second component is lower than the binder fraction of the first ink component and (ii) during step S213-S217) binder droplets of the second component may mix with and become subsumed within (e.g. to form) a single unified film layer.

Binders play an important role in the transferability of the dried 1$^{st}$ ink component, and the dried ink image containing both ink components, from the release layer of the ITM. Binders also play an important role in the adhesion of the dried ink image to the printing substrate.

Examples of binders include polystyrene-acrylate co-polymers, poly-acrylate polymers, polyurethanes (e.g., aliphatic polyurethanes such as anionic aliphatic polyurethanes), urethane-acrylate co-polymers, and polyesters (e.g., a polyethylene terephthalate).

Exemplary styrene-acrylic (or polystyrene-acrylate) copolymers include Joncryl® 77E, Joncryl® 586, Joncryl® 90, Joncryl® 8085, and Joncryl® ECO 2177.

An exemplary polyurethane includes NeoRez® R-563, an anionic aliphatic polyurethane from DSM-PUD.

Exemplary acrylic or polyacrylic binders include Joncryl® 538, an acrylic polymer emulsion.

Exemplary polyesters include Plascoat Z-105, Plascoat Z-730, and Plascoat Z-750, (all from GOO Chemicals).

The binders may be provided in various forms, such as dispersions or emulsions, with for example water typically being the major carrier liquid.

In different embodiments, the presence of the binder may be useful for rending a residue film tacky at a particular transfer temperature $T_{TRANSFER}$ and/or providing cohesiveness upon transfer.

A6. Having a surfactant concentration in a specific range— In some embodiments, the provided (i.e. before delivery to the ITM—e.g. as stored in a reservoir) first aqueous ink component comprises at most 5% wt/wt or at most 4% wt/wt surfactants.

A7. Moderately hydrophilic initial aqueous treatment formulation—In some embodiments, the provided (i.e. before delivery to the ITM—e.g. as stored in a reservoir) first aqueous ink component) is only moderately hydrophilic—e.g. having a static surface tension at 25° C. of at most 32 dynes/cm (e.g. between 20 and 32 dynes/cm) or at most 30 dynes/cm (e.g. between 20 and 32 dynes/cm) or at most 28 dynes/cm (e.g. between 20 and 32 dynes/cm). Because the release surface of the ITM has moderately hydrophobic (or moderately hydrophilic) properties, it may not be useful to employ a first ink component having high hydrophilicity, which may increase a thermodynamic tendency towards beading during step S209.

A8. Devoid of quaternary ammonium salts or having at most a low concentration thereof—In some embodiments, the provided (i.e. before delivery to the ITM—e.g. as stored in a reservoir) first aqueous ink component is devoid of quaternary ammonium salts or comprises at most 1% wt/wt or at most 0.75% wt/wt or at most 0.5% wt/wt or at most 0.25% quaternary ammonium salts, or their neutralized counterparts.

A9. Having a viscosity in a specific range—In some embodiments, a dynamic viscosity of the provided (i.e. before delivery to the ITM—e.g. as stored in a reservoir) first aqueous ink component is at most 100 mPa·s (millipascal seconds) or at most 80 mPa·s.

A10. Having a viscosity in a specific range—In embodiments where the first ink component is delivered by droplet-deposition in step S209 (e.g. by ink-jetting), the first aqueous ink component lower viscosity may have a value of at most 35 mPa·s, at most 30 mPa·s, at most 25 mPa·s, at most 20 mPa·s, or at most 15 mPa·s.

A11. Having a viscosity in a specific range—In some embodiments, the viscosity of the provided (i.e. before delivery to the ITM—e.g. as stored in a reservoir) first aqueous ink component is at least 3 mPa·s, at least 4 mPa·s, at least 5 mPa·s, or at least 6 mPa·s.

A12. Devoid of (or having at most a low concentration of) organic solvents such as glycerol—In some embodiments, a presence of low vapor pressure organic solvents might retard the drying of the first ink component on the surface of the ITM and/or result in a treatment film lacking desired elasticity and/or cohesiveness or tensile strength desired for the transfer step. In some embodiments, the provided (i.e. before delivery to the ITM—e.g. as stored in a reservoir) first aqueous ink component may be devoid of organic solvents (irrespective of their vapor pressure) in the pure state and/or comprises at most 3%, at most 2%, at most 1%, or at most 0.5%, or at most 0.25% or at most 0.1% by weight, organic solvents. In some embodiments, the formulation is devoid of organic solvents and/or comprises at most 3%, at most 2%, at most 1%, or at most 0.5%, or at most 0.25% or at most 0.1% by weight, glycerol. In some embodiments, the formulation is completely devoid of glycerol.

A13. Devoid of (or having at most a low concentration of) chelating agents—In some embodiments, the provided (i.e. before delivery to the ITM—e.g. as stored in a reservoir) first aqueous ink component may be devoid of chelating agents and/or comprises at most 3%, at most 2%, at most 1%, or at most 0.5%, or at most 0.25% or at most 0.1% by weight, chelating agents.

A14. Devoid of (or having at most a low concentration of) water soluble film-forming polymers such as polyvinyl alcohol (PVA) or polyvinyl pyrrolidone (PVP)—In some embodiments, the provided (i.e. before delivery to the ITM—e.g. as stored in a reservoir) first aqueous ink component may be devoid of water soluble film-forming polymers such as polyvinyl alcohol (PVA) or polyvinyl pyrrolidone (PVP) and/or comprises at most 3%, at most 2%, at most 1%, or at most 0.5%, and more typically at most 0.25% or at most 0.1% by weight, water soluble film-forming polymers.

A15. Dry film glass transition temperature $T_g^{dry\_film}([1^{st}\ component])$—In some embodiments, a dry film glass transition temperature $T_g^{dry\_film}([1^{st}\ component])$ of the first ink component (i.e. as a pure component) is at most 115° C., or at most 110° C., at most 105° C., or at most 100° C., or at most 95° C., at most 90° C., at most 85° C., at most 80° C., at most 70° C., at most 65° C., at most 60° C., or at most 55° C. This reference is to the dry film glass transition temperature $T_g^{dry\_film}([1^{st}\ component])$ of the first ink component as a pure component.

A16. A dry ink film dynamic viscosity $\mu_g^{dry\_film}([1^{st}\ component]$ at 115° C.—In some embodiments, a dry ink film dynamic viscosity $\mu_g^{dry\_film}([1^{st}\ component], 115°\ C.)$ is at most $1*10^7$ mPa·s or at most $8*10^6$ mPa·s or at most $6*10^6$ mPa·s or at most $4*10^6$ mPa·s.

A17. A dry ink film dynamic viscosity $\mu_g^{dry\_film}([1^{st}\ component]$ at 110° C.—In some embodiments, a dry ink film dynamic viscosity $\mu_g^{dry\_film}([1^{st}\ component], 110°\ C.)$ is at most $1*10^7$ mPa·s, or at most $8*10^6$ mPa·s, or at most $6*10^6$ mPa·s or at most $5*10^6$ mPa·s or at most $4*10^6$ mPa·s.

A18. A dry ink film dynamic viscosity $\mu_g^{dry\_film}([1^{st}\ component]$ at 105° C.—In some embodiments, a dry ink film dynamic viscosity $\mu_g^{dry\_film}([1^{st}\ component], 105°\ C.)$ is at most $2*10^7$ mPa·s, at most $1*10^7$ mPa·s, or at most $8*10^6$ mPa·s, or at most $6*10^6$ mPa·s.

A19. A dry ink film dynamic viscosity $\mu_g^{dry\_film}([1^{st}\ component]$ at 100° C.—In some embodiments, a dry ink film dynamic viscosity $\mu_g^{dry\_film}([1^{st}\ component], 100°\ C.)$ is at most $2*10^7$ mPa·s, at most $1*10^7$ mPa·s, or at most $8*10^6$ mPa·s, or at most $6*10^6$ mPa·s.

A20. A dry ink film dynamic viscosity $\mu_g^{dry\_film}([1^{st}\ component]$ at 95° C.—In some embodiments, a dry ink film dynamic viscosity $\mu_g^{dry\_film}([1^{st}\ component], 95°\ C.)$ is at most $4*10^7$ mPa·s, at most $2*10^7$ mPa·s, at most $1*10^7$ mPa·s, at most $8*10^6$ mPa·s, or at most $6*10^6$ mPa·s.

A21. A dry ink film dynamic viscosity $\mu_g^{dry\_film}([1^{st}\ component]$ at 90° C.—In some embodiments, a dry ink film dynamic viscosity $\mu_g^{dry\_film}([1^{st}\ component], 90°\ C.)$ is at most $2*10^7$ mPa·s or at most $1.2*10^7$ mPa·s, or more typically, at most $1*10^7$ mPa·s, at most $8*10^6$ mPa·s, or at most $6*10^6$ mPa·s.

A22. A dry ink film dynamic viscosity $\mu_g^{dry\_film}([1^{st}\ component]$ at 80° C.—In some embodiments, a dry ink film dynamic viscosity $\mu_g^{dry\_film}([1^{st}\ component], 80°\ C.)$ is at most $2.5*10^7$ mPa·s or at most $1.2*10^7$ mPa·s, or more typically, at most $1*10^7$ mPa·s, at most $8*10^6$ mPa·s, or at most $8*10^6$ mPa·s.

A23. A dry ink film dynamic viscosity $\mu_g^{dry\_film}([1^{st}\ component]$ at 70° C.—In some embodiments, a dry ink film dynamic viscosity $\mu_g^{dry\_film}([1^{st}\ component], 70°\ C.)$ is at most $6*10^7$ mPa·s, at most $3*10^7$ mPa·s, or at most $1.2*10^7$ mPa·s, or more typically, at most $1*10^7$ mPa·s, at most $8*10^6$ mPa·s, or at most $8*10^6$ mPa·s.

A24. A dry ink film dynamic viscosity $\mu_g^{dry\_film}([1^{st}\ component]$ at 65° C.—In some embodiments, a dry ink film dynamic viscosity $\mu_g^{dry\_film}([1^{st}\ component], 65°\ C.)$ is at most $1*10^8$ mPa·s, at most $5*10^7$ mPa·s, or at most $2*10^7$ mPa·s, or more typically, at most $1*10^7$ mPa·s, at most $8*10^6$ mPa·s, or at most $8*10^6$ mPa·s.

A25. Devoid of starch—In some embodiments, the provided (i.e. before delivery to the ITM—e.g. as stored in a reservoir) first aqueous ink component may be devoid of starch and/or comprises at most 3%, at most 2%, at most 1%, or at most 0.5%, and more typically at most 0.25% or at most 0.1% by weight, starch.

A Discussion of Step S203

In some embodiments, the second ink aqueous ink component of step S203 may provide (i.e. in pure form) one of more (i.e. any combination of) of the following features B1-B18:

B1. Min wt/wt water carrier liquid—In some embodiments, the provided (i.e. before delivery to the ITM—e.g. as stored in a reservoir) second aqueous ink component treatment formulation comprises at least 40% wt/wt water or at least 45% wt/wt water or at least 50% wt/wt water or at least 55% wt/wt water or at least 60% wt/wt water or at least 65% wt/wt water.

B2. Percent solids (lower bound)—In some embodiments, the provided (i.e. before delivery to the ITM—e.g. as stored in a reservoir) second aqueous ink component treatment formulation comprises at least 6% wt/wt solids, or at least 7% wt/wt solids, or at least 8% wt/wt solids, where the terms 'solids' refers to material that is solid at 60° C.

B3. Percent solids (upper bound)—In some embodiments, the provided (i.e. before delivery to the ITM—e.g. as stored in a reservoir) second aqueous ink component treatment formulation comprises at most 15% wt/wt solids, or at most 14% wt/wt solids, or at most 13% wt/wt solids, or at most 12% wt/wt solid, where the terms 'solids' refers to material that is solid at 60° C.

B4. Percent solids (specific range)—In some embodiments, the provided (i.e. before delivery to the ITM—e.g. as stored in a reservoir) second aqueous ink component treatment formulation comprises between 7% wt/wt and 13% wt/wt solids.

B5. Binder Weight fraction (upper bound)—In some embodiments, the provided (i.e. before delivery to the ITM—e.g. as stored in a reservoir) second aqueous ink component formulation comprises (i.e. as a wt % of the second ink component including the aqueous liquid carrier of the second aqueous ink component) at most 3% wt/wt or at most 2.5% wt/wt or at most 2% wt/wt or at most 1.5% wt/wt or at most 1% wt/wt or at most 0.5% wt/wt binder.

B6. Binder: Pigment ratio—In some embodiments, within the provided (i.e. before delivery to the ITM—e.g. as stored in a reservoir) second aqueous ink component formulation, a ratio between (i) a weight fraction of binder within the second aqueous ink component formulation; and (ii) a weight fraction of pigment within the second aqueous ink component formulation is at most 1.5:1 or at most 1.3:1 or at most 1.2:1 or at most 1.1:1 or at most 0.8:1, or at most 0.6:1, or at most 0.4:1.

B7. Re-solubility—In some embodiments, the provided (i.e. before delivery to the ITM—e.g. as stored in a reservoir) second aqueous ink component is a resoluble ink component.

B8. Nanoparticles—In some embodiments, the provided (i.e. before delivery to the ITM—e.g. as stored in a reservoir) second aqueous ink component comprises nanoparticles—e.g. a primary colorant of the second aqueous ink component is nanoparticles.

B9. Dry film glass transition temperature $T_g^{dry\_film}$([2nd component])—In some embodiments, a dry film glass transition temperature $T_g^{dry\_film}$([2nd component]) of the second ink component (i.e. as a pure component) is at least 90° C., or at least 95° C., or at least 100° C., at least 105° C., or at least 110° C., or at least 115° C. This reference to the dry film glass transition temperature $T_g^{dry\_film}$ ([2nd component]) of the second ink component as a pure component.

B10. A dry ink film dynamic viscosity $\mu_g^{dry\_film}$([2nd component] at 115° C.—In some embodiments, a dry ink film dynamic viscosity $\mu_g^{dry\_film}$([2nd component], 115° C.) is at least $8*10^6$ mPa·s, at least $1*10^7$ mPa·s, at least $3*10^7$ mPa·s, or at least $6*10^7$ mPa·s.

B11. A dry ink film dynamic viscosity $\mu_g^{dry\_film}$([2nd component] at 110° C.—In some embodiments, a dry ink film dynamic viscosity $\mu_g^{dry\_film}$([2nd component], 110° C.) is at least $1*10^7$ mPa·s, at least $3*10^7$ mPa·s, at least $5*10^7$ mPa·s, or at least $8*10^7$ mPa·s.

B12. A dry ink film dynamic viscosity $\mu_g^{dry\_film}$([2nd component] at 105° C.—In some embodiments, a dry ink film dynamic viscosity $\mu_g^{dry\_film}$([2nd component], 105° C.) is at least at least $1.2*10^7$ mPa·s, at least $3*10^7$ mPa·s, at least $5*10^7$ mPa·s, or at least $1*10^8$ mPa·s.

B13. A dry ink film dynamic viscosity $\mu_g^{dry\_film}$([2nd component] at 100° C.—In some embodiments, a dry ink film dynamic viscosity $\mu_g^{dry\_film}$([2nd component], 100° C.) is at least $1.5*10^7$ mPa·s, at least $3*10^7$ mPa·s, at least $7*10^7$ mPa·s, or at least $2*10^8$ mPa·s.

B14. A dry ink film dynamic viscosity $\mu_g^{dry\_film}$([2nd component] at 95° C.—In some embodiments, a dry ink film dynamic viscosity $\mu_g^{dry\_film}$([2nd component], 95° C.) is at least is at least $2*10^7$ mPa·s, at least $5*10^7$ mPa·s, at least $1*10^8$ mPa·s, or at least $3*10^8$ mPa·s.

B15. A dry ink film dynamic viscosity $\mu_g^{dry\_film}$([2nd component] at 90° C.—In some embodiments, a dry ink film dynamic viscosity $\mu_g^{dry\_film}$([2nd component], 90° C.) is at least $2*10^7$ mPa·s, at least $4*10^7$ mPa·s, at least $6*10^7$ mPa·s, at least $8*10^7$ mPa·s, at least $1*10^8$ mPa·s, at least $3*10^8$ mPa, or at least $5*10^8$ mPa.

B16. A dry ink film dynamic viscosity $\mu_g^{dry\_film}$([2nd component] at 80° C.—In some embodiments, a dry ink film dynamic viscosity $\mu_g^{dry\_film}$([2nd component], 80° C.) is at least $3*10^7$ mPa·s, at least $6*10^7$ mPa·s, at least $8*10^7$ mPa·s, at least $2*10^8$ mPa·s, or at least $7*10^8$ mPa·s.

B17. A dry ink film dynamic viscosity $\mu_g^{dry\_film}$([2nd component] at 70° C.—In some embodiments, a dry ink film dynamic viscosity $\mu_g^{dry\_film}$([2nd component], 70° C.) is at least $3*10^7$ mPa·s, at least $6*10^7$ mPa·s, at least $8*10^7$ mPa·s, at least $2*10^8$ mPa·s, at least $5*10^8$ mPa·s, or at least $9*10^8$ mPa·s.

B18. A dry ink film dynamic viscosity $\mu_g^{dry\_film}$([2nd component] at 60° C.—In some embodiments, a dry ink film dynamic viscosity $\mu_g^{dry\_film}$([2nd component], 60° C.) is at least $3*10^7$ mPa·s, at least $6*10^7$ mPa·s, at least $8*10^7$ mPa·s, at least $2*10^8$ mPa·s, at least $5*10^8$ mPa·s, or at least $9*10^8$ mPa·s.

A First Discussion of Steps S201 and S203 ('Combo Features' Depending on Properties of Both the First and Second Ink Components)

In some embodiments, the first and second ink aqueous ink components respectively of steps S201 and S203 may provide (i.e. in respective pure forms) one or more (i.e. any combination of) of the following features C1-C4:

C1. Binder weight fraction ratio (upper bound)—In some embodiments, the provided (i.e. before delivery to the ITM—e.g. as stored in a reservoir) first and second aqueous ink component formulation collectively provide the following property—a ratio between (i) a weight fraction of binder in the first component and (ii) a weight fraction of binder in the second component is at least 1.5, or at least 1.75:1, or at least 2:1, or at least 2.25:1, or at least 2.25:1, or at least 3:1, or at least 4:1 or at least 5:1, or at least 6:1 or at least 7:1, or at least 8:1, or at least 9:1, or at least 10:1. This ratio may be infinite, as the $2^{nd}$ ink component may be devoid of binder.

C2. Percent Solids Ratio—In some embodiments, the provided (i.e. before delivery to the ITM—e.g. as stored in a reservoir) first and second aqueous ink component formulation collectively provide the following property—a ratio between (i) a weight fraction of solids in the first component and (ii) a weight fraction of solids in the second component is at least 1.8, at least 2.0, at least 2.2, at least 2.5, or at least 3.0, where the term 'solids' refers to material that is solid at 60° C.

C3. Difference in Dry film glass transition temperatures between $T_g^{dry\_film}$([2nd component) and $T_g^{dry\_film}$([1 wt component])—In some embodiments, a difference $T_g^{dry\_film}$([2nd component)-$T_g^{dry\_film}$([1 wt component]) is at least 0° C., or at least 1° C., or at least 2° C., or at least 3° C., or at least 4° C., or at least 5° C., or at least 6° C., or at least 7° C., or at least 8° C., or at least 9° C., or at least 10° C., or at least 12° C., or at least 15° C.

C4. A dry ink film dynamic viscosity $\mu_g^{dry\_film}$([2nd component] at 115° C.—In some embodiments, a ratio between (i) $\mu_g^{dry\_film}$([2nd component], 115° C.) and (ii) $T_g^{dry\_film}$([2nd component], 115° C.) is at least 3:1, at least 4:1, at least 5:1, at least 7:1, at least 10:1, at least 15:1, or at least 25:1, and/or within a range of 3:1 to 25:1, 3:1 to 10:1, 3:1 to 7:1, 5:1 to 25:1, 5:1 to 15:1, 5:1 to 10:1, 5:1 to 7:1, 7:1 to 25:1, 7:1 to 15:1, or 7:1 to 10:1.

A Second Discussion of Steps S201 and S203 ('Combo Features' Depending on Properties of Both the First and Second Ink Components)

In some embodiments, the first and second ink aqueous ink components respectively of steps S201 and S203 may provide (i.e. in respective pure forms) one or more (i.e. any combination of) of the following features D1-D10, each of which is descriptive of a 5:1 weight ratio mixture of the first and second components:

D1. Dry film glass transition temperature $T_g^{dry\_film}$([5:1 $2^{nd}$ component:$1^{st}$ component]) (upper bound)—In some embodiments, a dry film glass transition temperature $T_g^{dry\_film}$([5:1 $2^{nd}$ component:$1^{st}$ component]) of a 5:1 weight-ratio of the first and second components is less than 115° C., or less than 110° C., or less than 105° C., or less than 100° C., or less than 95° C., or less than 90° C., or less than 85° C., or less than 80° C., or less than 70° C., or less than 65° C., or less than 60° C., or less than 55° C.

D2. A dry ink film dynamic viscosity $\mu_g^{dry\_film}$([$1^{st}$ component] at 115° C.—In some embodiments, a dry ink film dynamic viscosity $\mu_g^{dry\_film}$([5:1 $2^{nd}$ component:$1^{st}$ component], 115° C.) of a 5:1 weight-ratio of the first and second components is at most $1*10^7$ mPa·s, or at most $8*10^6$ mPa·s, at most $6*10^6$ mPa·s, or at most $4*10^6$ mPa·s.

D3. A dry ink film dynamic viscosity $\mu_g^{dry\_film}$([$1^{st}$ component] at 110° C.—In some embodiments, a dry ink film dynamic viscosity $\mu_g^{dry\_film}$([5:1 $2^{nd}$ component:$1^{st}$ component], 110° C.) of a 5:1 weight-ratio of the first and second components is at most $1*10^7$ mPa·s, or at most $8*10^6$ mPa·s, or more typically, at most $6*10^6$ mPa·s or at most $5*10^6$ mPa·s or at most $4*10^6$ mPa·s.

D4. A dry ink film dynamic viscosity $\mu_g^{dry\_film}$([$1^{st}$ component] at 105° C.—In some embodiments, a dry ink film dynamic viscosity $\mu_g^{dry\_film}$([5:1 $2^{nd}$ component:$1^{st}$ component], 105° C.) of a 5:1 weight-ratio of the first and second components is at most $2*10^7$ mPa·s, at most $1*10^7$ mPa·s, at most $8*10^6$ mPa·s, or at most $6*10^6$ mPa·s.

D5. A dry ink film dynamic viscosity $\mu_g^{dry\_film}$([$1^{st}$ component] at 100° C.—In some embodiments, a dry ink film dynamic viscosity $\mu_g^{dry\_film}$([5:1 $2^{nd}$ component:$1^{st}$ component], 100° C.) of a 5:1 weight-ratio of the first and second components) is at most $2*10^7$ mPa·s, at most $1*10^7$ mPa·s, at most $8*10^6$ mPa·s, or at most $6*10^6$ mPa·s.

D6. A dry ink film dynamic viscosity $\mu_g^{dry\_film}$([$1^{st}$ component] at 95° C.—In some embodiments, a dry ink film dynamic viscosity $\mu_g^{dry\_film}$([5:1 $2^{nd}$ component:$1^{st}$ component], 95° C.) of a 5:1 weight-ratio of the first and second is at most $4*10^7$ mPa·s, at most $2*10^7$ mPa·s, at most $1*10^7$ mPa·s, at most $8*10^6$ mPa·s, or at most $6*10^6$ mPa·s.

D7. A dry ink film dynamic viscosity $\mu_g^{dry\_film}$([$1^{st}$ component] at 90° C.—In some embodiments, a dry ink film dynamic viscosity $\mu_g^{dry\_film}$([5:1 $2^{nd}$ component:$1^{st}$ component], 90° C.) of a 5:1 weight-ratio of the first and second components is at most $2*10^7$ mPa·s or at most $1.2*10^7$ mPa·s, or more typically, at most $1*10^7$ mPa·s, at most $8*10^6$ mPa·s, or at most $6*10^6$ mPa·s.

D8. A dry ink film dynamic viscosity $\mu_g^{dry\_film}$([$1^{st}$ component] at 80° C.—In some embodiments, a dry ink film dynamic viscosity $\mu_g^{dry\_film}$([5:1 $2^{nd}$ component:$1^{st}$ component], 80° C.) of a 5:1 weight-ratio of the first and second components is at most $2.5*10^7$ mPa·s or at most $1.2*10^7$ mPa·s, or more typically, at most $1*10^7$ mPa·s, at most $8*10^6$ mPa·s, or at most $8*10^6$ mPa·s.

D9. A dry ink film dynamic viscosity $\mu_g^{dry\_film}$([$1^{st}$ component] at 70° C.—In some embodiments, a dry ink film dynamic viscosity $\mu_g^{dry\_film}$([5:1 $2^{nd}$ component:$1^{st}$ component], 70° C.) of a 5:1 weight-ratio of the first and second components is at most $6*10^7$ mPa·s, at most $3*10^7$ mPa·s, or at most $1.2*10^7$ mPa·s, or more typically, at most $1*10^7$ mPa·s, at most $8*10^6$ mPa·s, or at most $8*10^6$ mPa·s.

D10. A dry ink film dynamic viscosity $\mu_g^{dry\_film}$([$1^{st}$ component] at 65° C.—In some embodiments, a dry ink film dynamic viscosity $\mu_g^{dry\_film}$([5:1 $2^{nd}$ component:$1^{st}$ component], 65° C.) of a 5:1 weight-ratio of the first and second components is at most $1*10^8$ mPa·s, at most $5*10^7$ mPa·s, or at most $2*10^7$ mPa·s, or more typically, at most $1*10^7$ mPa·s, at most $8*10^6$ mPa·s, or at most $8*10^6$ mPa·s.

A Discussion of Step S205 of FIG. 2

In some embodiments, the ITM provided in step S205 has a silicone based release layer, the release surface thereof may be less hydrophobic or appreciably less hydrophobic than many conventional silicone-based release layers. This structural property can be measured and characterized in various ways.

For example, as illustrated in step S205 of FIG. 2, the intermediate transfer member (ITM) may comprise a silicone-based release layer surface that is sufficiently hydrophilic to satisfy at least one of the following properties: (i) a receding contact angle of a drop of distilled water deposited on the silicone-based release layer surface is at most 60°; and (ii) a 10-second dynamic contact angle (DCA) of a drop of distilled water deposited on the silicone-based release layer surface is at most 108°.

Any one of several techniques for reducing the hydrophobicity of the silicone based release layer may be employed.

In some embodiments, polar functional groups are introduced into and/or generated in the silicone based release layer. In one example, functional groups may be added to the pre-polymeric batch (e.g. monomers in solution)—these functional groups may, upon curing, become integral part of the silicone polymer network. Alternatively, or additionally, the silicone-based release layer is pre-treated (e.g. by a corona discharge, or by an electron beam), thereby increasing a surface energy thereof.

Alternatively, the silicone based release layer may be manufactured to have a reduced hydrophobicity, even when substantially devoid of functional groups. In one example, the silicone polymer backbone of the release layer may be structured so that the polar groups thereof (e.g., O—Si—O) are oriented in a direction that is generally normal to the local plane of the ITM surface and facing 'upwards' towards the release layer surface.

In different embodiments, the ITM may provide one of more (i.e. any combination of) of the following features E1-E5:

E1: Release layer—In some embodiments, the release layer is formed of a silicone material (e.g. addition-cured)—this provides the ITM with hydrophobic properties useful in step S117;

E2: Release layer with reduced hydrophobicity—The silicone-based release layer has been produced in a manner that reduces a hydrophobicity thereof. For example, instead of relying on the addition of functional, reactive groups to imbue the release layer with hydrophilicity, it is possible to cure the silicone release layer so that polar atoms in polar groups (e.g. the oxygen atom in a polar Si—O—Si moiety) are aligned or otherwise face outwardly with respect to the release layer surface. In this example, the oxygen atom of the "Si—O—Si" is not capable, under typical process conditions, of chemically bonding to the materials within the treatment solution, to the dried ink image and/or to the dried treatment film. However, it is possible to benefit from the hydrophilicity of the outwardly-facing, polar "O".

E3: Release layer with moderately hydrophobicity—The release surface of the ITM may have moderately hydrophobic properties but is not overly hydrophobic. Thus, the release surface may have a surface energy (at 25° C.) of at least 20 dynes/cm or at least 21 dynes/cm or at least 22 dynes/cm or at least 23 dynes/cm, or at least 25 dynes/cm, at least 28 dynes/cm, at least 30 dynes/cm, at least 32 dynes/cm, at least 34 dynes/cm, or at least 36 dynes/cm, and/or at most 48 dynes/cm, at most 46 dynes/cm, at most 44 dynes/cm, at most 42 dynes/cm, at most 40 dynes/cm, at most 38 dynes/cm, or at most 37 dynes/cm or most 35 dynes/cm.

E4: Receding contact angle of a droplet of distilled water on release layer surface—A receding contact angle of a droplet of distilled water on the ink reception or release layer surface is typically at least 30°, and more typically, 30° to 80°, 35° to 80°, 30° to 75°, 35° to 75°, 30° to 65°, 30° to 65°, or 35° to 55°.

E5: Devoid of functional groups bonded within the cross-linked polymer structure—The release layer of the ITM may be devoid or substantially devoid of functional groups bonded within the cross-linked polymer structure; the inventors believe that such functional groups may increase or promote an undesired adhesion.

A Discussion of Step S209

In some embodiments, step S209 is performed to provide one or more (i.e. any combination of) following features F1-F4:

F1—a thickness of the covering wet volume of the first component (i e immediately upon formation on/application to/delivery to) the ITM surface is at least 6 μm or at least 8 μm or at least 10 μm or at least 12 μm).

F2—the first ink component is delivered to the ITM surface by droplet deposition (e.g. by ink-jetting).

F3—the first ink component is delivered to the ITM surface by droplet deposition (e.g. by ink-jetting) according to a pattern of the ink-image to be formed in step S213 (e.g. centers of the droplets of the first ink component upon impact correspond to centers of the ink-image later formed in step S213).

F4—the first ink component is delivered to the ITM surface when the ITM surface is in-motion at a velocity of at least 1 meters/second or at least 1.5 meters/second or at least 2 meters/second, to form the wet treatment layer thereon.

A Discussion of Step S211

In some embodiments, step S211 is performed to provide one of more (i.e. any combination of) following features G1-G2:

G1—a ratio between (i) a thickness of a partially-dried layer of the first component when the droplets of the second aqueous ink component impact the partially-dried layer of the first ink component in step S213 and (ii) a thickness of the covering wet volume of the first component (i.e. immediately upon formation on/application to/delivery to) the ITM surface in step S209 is at most 0.6 or at most 0.5 or at most 0.4.

G2—a ratio between (i) a thickness of a partially-dried layer of the first component when the droplets of the second aqueous ink component impact the partially-dried layer of the first ink component in step S213 and (ii) a thickness of the covering wet volume of the first component (i.e. immediately upon formation on/application to/delivery to) the ITM surface in step S209 is at least 0.25 or at least 0.3 or at least 0.35.

A Discussion of Step S213

In some embodiments, step S213 is performed to provide one of more (i.e. any combination of) following features H1-H5:

H1—the second component is delivered by ink-jetting.

H2—within the ink-jet nozzles during ink-jetting of the second component and under jetting conditions (e.g. temperature) embodiments, the second aqueous ink component is a resoluble ink component. Thus, in some embodiments, the depositing of the droplets of the second aqueous ink component is performed under a set of conditions where the second ink-component is fully resoluble.

Not wishing to be bound by theory, this may be attributable, at least in part, to the relatively low binder fraction of the second aqueous ink component provided in step S203.

H3—immediately before impact between the droplets of the second ink component and the layer of the first ink component, a liquid content of the layer of the first ink component is at least 10% wt/wt or at least 20% wt/wt or at least 30% wt/wt or at least 40% wt/wt.

H4—immediately before impact between the droplets of the second ink component and the layer of the first ink component, a thickness of the layer of first ink component is at least 1 mm or at least 1.5 μm or at least 2 μm or at least 3 μm or at least 4 μm.

H5—upon impact between the droplets of the second ink component and the layer of the first ink component, some or all the colorant particles of the second ink component penetrate into the partially-dried layer of the first ink component. In one example, for a given deposited droplet of second component, at least 10% or at least 20% or at least 30% or at least 50% or at least 70% or at least 80% or at least 90% of the colorant particles may component penetrate into and mixed with the partially-dried layer of the first ink component.

A Discussion of Step S221

In some embodiments, step S221 is performed to one of more of the following features:

I1—the transfer temperature $T_{TRANSFER}$ is at least 60° C., at least 65° C., at least 70° C., at least 75° C., at least 80° C., at least 85° C., at least 90° C., at least 95° C., at least 100° C., at least 105° C., at least 110° C., or at least 115° C.

I2—the transfer temperature $T_{TRANSFER}$ is at most 75° C., at most 80° C., or at most 85° C., or at most 90° C., or at most 95° C., or at most 100° C., or at most 105° C., or at most 110° C., or at most 115° C.

I3—the transfer temperature $T_{TRANSFER}$ is between 60° C. and 70° C.

I4—the transfer temperature $T_{TRANSFER}$ is between 65° C. and 75° C.

I5—the transfer temperature $T_{TRANSFER}$ is between 70° C. and 80° C.

I6—the transfer temperature $T_{TRANSFER}$ is between 75° C. and 85° C.

I7—the transfer temperature $T_{TRANSFER}$ is between 80° C. and 90° C.

I9—the transfer temperature $T_{TRANSFER}$ is between 85° C. and 95° C.

I10—the transfer temperature $T_{TRANSFER}$ is between 90° C. and 100° C.

I11—the transfer temperature $T_{TRANSFER}$ is between 95° C. and 105° C.

I12—the transfer temperature $T_{TRANSFER}$ is between 105° C. and 115° C.

I13—the transfer temperature $T_{TRANSFER}$ is above 115° C.

I14: a dry film glass transition temperature $T_g^{dry\_film}([2^{nd}\text{ component}])$ of the second ink component exceeds (e.g. by at least 5° C., or at least 10° C., or at least 12° C., at least 15° C., or at least 20° C. or, or at least 30° C., or at least 40° C.) the transfer temperature $T_{TRANSFER}$; and a dry film glass transition temperature $T_g^{dry\_film}([5:1\ 2^{nd}\text{ component}:1^{st}\text{ component}])$ of a 5:1 weight-ratio of the first and second components is less (e.g. by at least 5° C., or at least 10° C., or at least 12° C., at least 15° C., or at least 20° C. or at least 30° C., or at least 40° C.) than the transfer temperature $T_{TRANSFER}$.

A discussion of FIGS. 3-4

FIG. 3 is a schematic diagram of one example system for performing the method of FIG. 2. FIG. 3 is a schematic diagram of another example system for performing the method of FIG. 2. The system of FIG. 3 comprises: (i) a reservoir 120 of the first ink component which supplies the first ink component to ink-jet print nozzles of print bar 110A (i.e. print bar 110A comprising one or more print heads, each of which comprises a plurality of the ink-jet nozzles that are supplied by reservoir 120); (ii) one or more reservoirs 124A-124D of second ink-component (i.e. either having the same composition, or different compositions—for each 'second ink-component' may have a different color but share other properties (e.g. thermo-rheological properties) in common), which each supplies a respective second ink component to respective print bars 110B-110D.

In the example of FIG. 3, ITM 140 is a blanket (e.g. flexible blanket) mounted over a plurality of cylinders 104, 102—this is not a limitation, in other examples the ITM 140 may be, for example, a rigid drum. In the example of FIG. 3, print bar 110A deposits droplets (e.g. see step S209 of FIG. 2) of the first ink component on the surface of the ITM 140 to form the layer of first ink component thereon. Motion of the ITM 140 transports this layer of first ink component from a location under print bar 110A to a location under print bar 110B where the droplets of the second ink component are deposited (e.g. by ink-jetting) (e.g. see step S213 of FIG. 4) to the layer of first ink component. This causes formation of an ink-image on the surface of the ITM, which is transported to an image-transfer location LocX. As the ink-image is transported, it is heated (e.g. see step S217 of FIG. 2) (e.g. in some embodiments, at least some of the drying is performed at drying station 130) into a tacky residue film. The ink-image residue film is transferred (e.g. see step S221) at an image transfer location LocX from the surface of the ITM to substrate 148 (e.g. the transfer may be performed by applying pressure—for example, between pressure cylinder 142 and impression cylinder 146).

In the non-limiting example of FIG. 3, more than one reservoir of the second ink component is provided—e.g. each reservoir 124 contains a different type of second ink-component (e.g. of a different color). For example, the types of second ink-component may be applied sequentially to produce a color ink-image.

FIG. 4 is like FIG. 3, however, the apparatus 118 for applying the first ink component does not rely on droplet-deposition. In different examples, apparatus 118 for covering a 'large' area (e.g. at least 1 cm by 1 cm contiguously) with the volume of first ink component may include a coater and/or a spray assembly and/or bath assembly (e.g. for soaking an ITM surface). The amount of first ink component initially applied may be 'too thick' and in some embodiments, apparatus 118 includes a thinning assembly and/or a doctor blade.

Figure 5G:
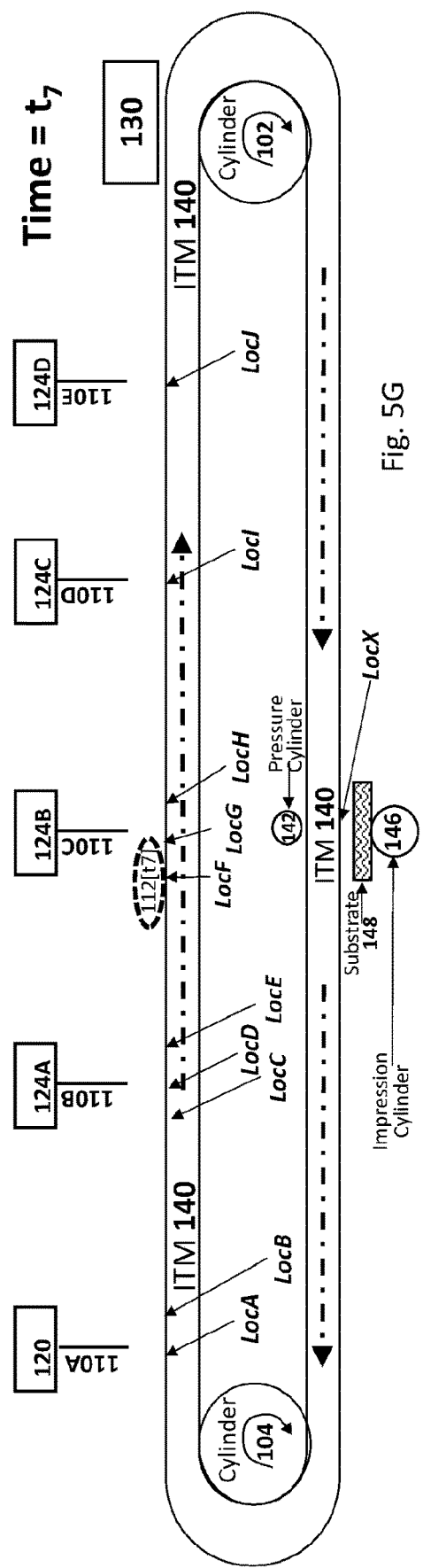
Figures 5H, 5I:
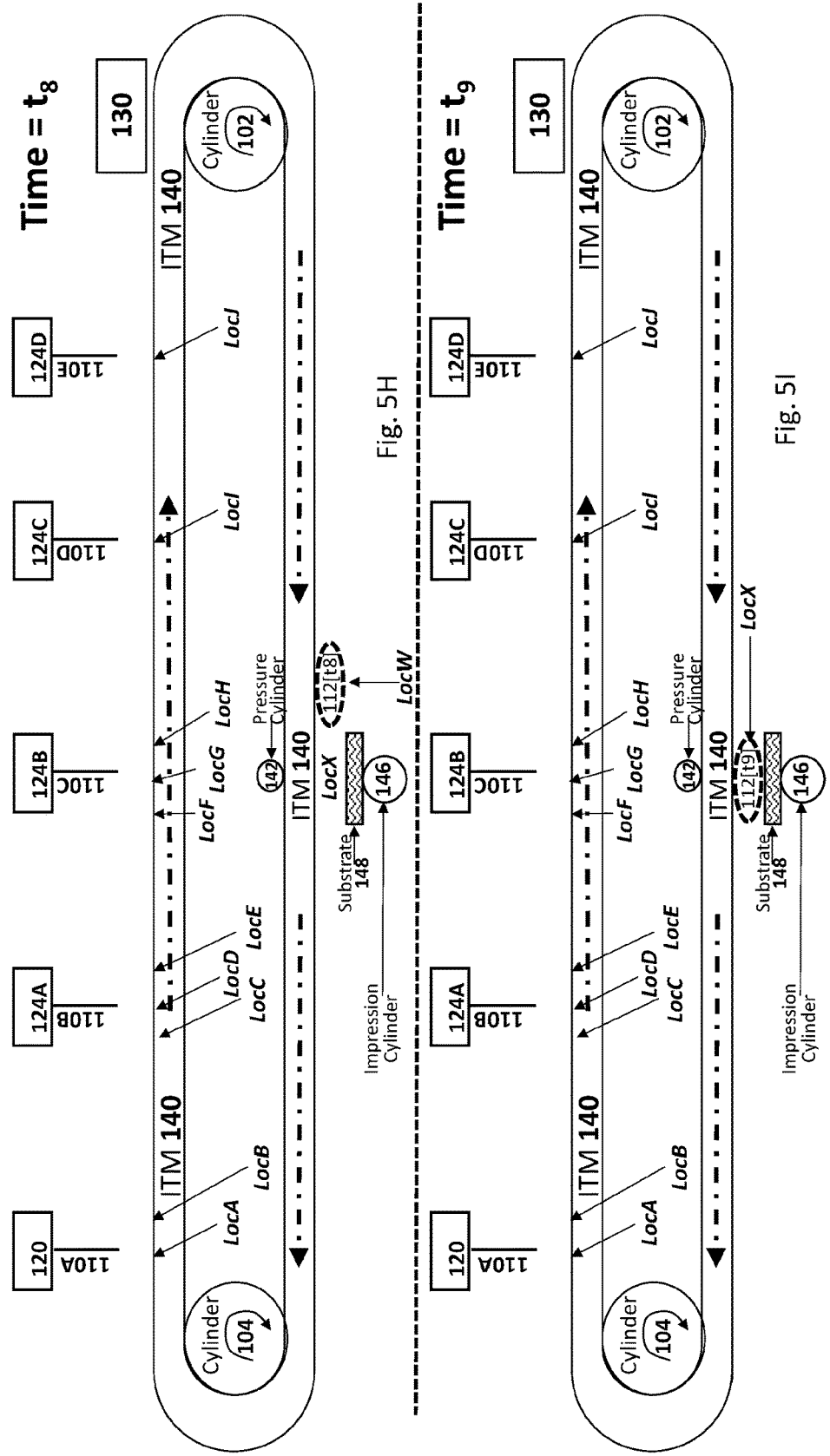
Figure 6C:
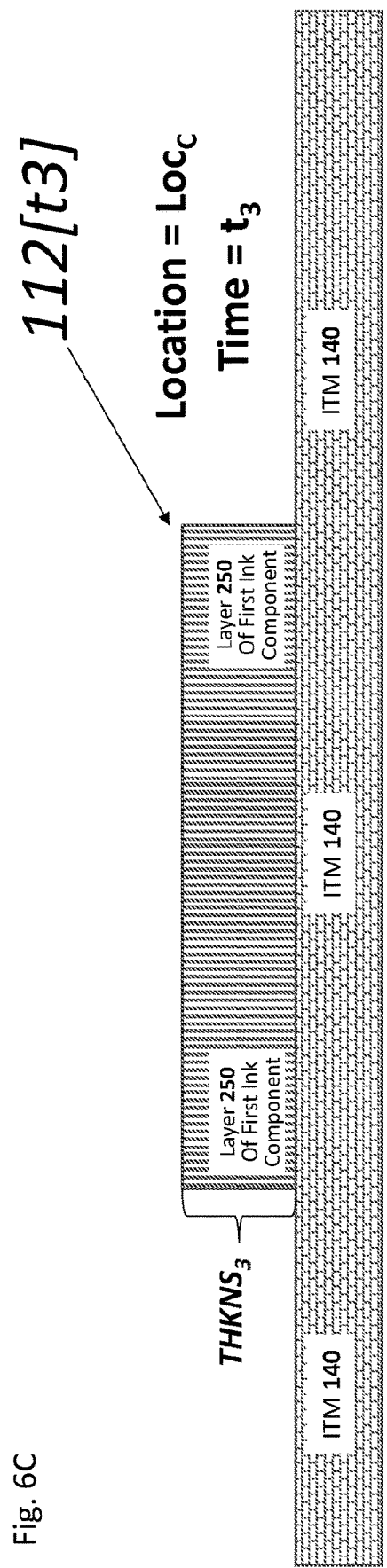
Figure 6J:
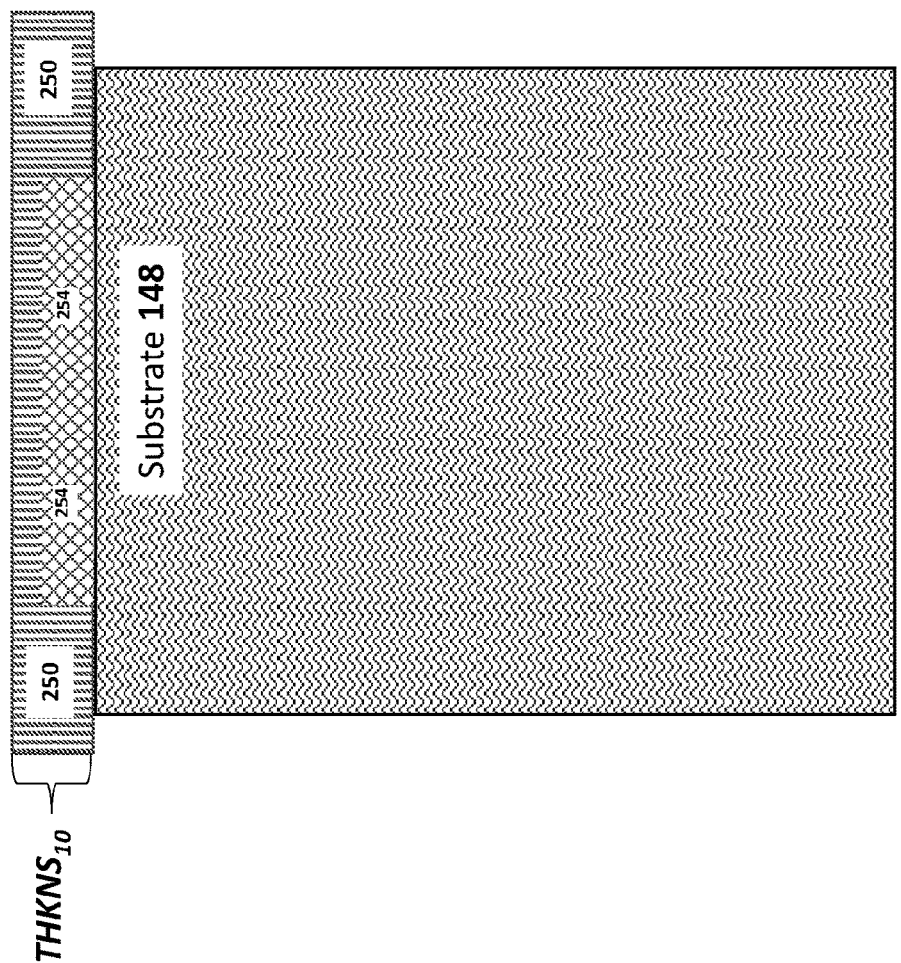
FIG. 6J illustrates schematically an ink-image-bearing residue film on a printing substrate according to one example.

One example of operation of the system of FIG. 3 is illustrated in FIGS. 5A-5I, each of which describes material 112 disposed on the surface of the ITM 140 at a different 'frame' in time. Thus, in FIG. 5A, element 112[t1] illustrates the layer of the first component immediately upon application (e.g. by droplet-deposition—for example, ink-jetting) on the surface of the ITM 140 (e.g. at a time of step S209) at location LocA directly beneath print bar 110A. In FIG. 5B, element 112[t2] illustrates the layer of the first component at a subsequent time t2, at location LocB which is slightly downstream of print bar 110A.

In FIG. 5C, element 112[t3] illustrates the layer of the first component at a subsequent time t3, at location LocC which is slightly upstream of print bar 110B. In FIG. 5D, element 112[t3] illustrates, at a subsequent time t4, the combination of the layer of the first ink component and the droplets of the second ink component that are deposited by print-bar 110B. As shown in FIG. 5D, this combination is disposed at LocD which is directly beneath print bar 110B. Time t4 therefore corresponds to a time when the droplets of the second ink component are deposited to the layer of the first ink-component in step S213 of FIG. 2.

FIGS. 5E-5H correspond to three subsequent times t5-t8 and to three subsequent locations on the ITM 140. FIG. 5I corresponds to an image transfer time t9 where the image is transferred at the image-transfer location LocX.

FIGS. 6A-6I respectively correspond to FIGS. 5A-5I and describe 112[t1] according to one particular scenario/set of operating parameters/example of first and second aqueous ink-components.

Blanket

The ITM may be manufactured in the manner described by FIGS. 7B-7G and in the description associated therewith. Such an ITM may be particularly suitable for the Nanographic Printing™ technologies of Landa Corporation.

With reference now to FIG. 7A, schematically shows a section through a carrier 10. In all the drawings, to distinguish it from the layers that form part of the finished article, the carrier 10 is shown as a solid black line. Carrier 10 has a carrier contact surface 12.

In some embodiments, carrier contact surface 12 may be a well-polished flat surface having a roughness (Ra) of at most about 50 nm, at most 30 nm, at most 20 m, at most 15 nm, at most 12 nm, or more typically, at most 10 nm, at most 7 nm, or at most 5 nm. In some embodiments, carrier contact surface 12 may between 1 and 50 nm, between 3 and 25 nm, between 3 and 20 nm, or between 5 nm and 20 nm.

The hydrophilic properties of the carrier contact surface 12 are described herein below.

In some embodiments, carrier 10 may be inflexible, being formed, for example, of a sheet of glass or thick sheet of metal.

In some embodiments, carrier 10 may advantageously be formed of a flexible foil, such as a flexible foil mainly consisting of, or including, aluminum, nickel, and/or chromium. In one embodiment, the foil is a sheet of aluminized PET (polyethylene terephthalate, a polyester), e.g., PET coated with fumed aluminum metal. The top coating of aluminum may be protected by a polymeric coating, the sheet typically having a thickness of between 0.05 mm and 1.00 mm so as to remain flexible, but difficult to bend through a small radius, so as to avert wrinkling.

In some embodiments, carrier 10 may advantageously be formed of an antistatic polymeric film, for example, a polyester film such as PET. The anti-static properties of the antistatic film may be achieved by various means known to those of skill in the art, including the addition of various additives (such as an ammonium salt) to the polymeric composition.

In a step of the present ITM manufacturing method, the results of which are shown in FIG. 7B, a fluid first curable composition (illustrated as 36 in FIG. 9B) is provided and a layer 16 is formed therefrom on carrier contact surface 12, layer 16 constituting an incipient release layer having an outer ink-transfer surface 14.

The fluid first curable composition of layer 16 may include an elastomer, typically made of a silicone polymer, for example, a polydimethylsiloxane, such as a vinyl-terminated polydimethylsiloxane.

In some embodiments, the fluid first curable material includes a vinyl-functional silicone polymer, e.g., a vinyl-silicone polymer including at least one lateral vinyl group in addition to the terminal vinyl groups, for example, a vinyl-functional polydimethyl siloxane.

In some exemplary embodiments, the fluid first curable material includes a vinyl-terminated polydimethylsiloxane, a vinyl-functional polydimethylsiloxane including at least one lateral vinyl group on the polysiloxane chain in addition to the terminal vinyl groups, a cross-linker, and an addition-cure catalyst, and optionally further includes a cure retardant.

As is known in the art, the curable adhesive composition may include any suitable amount of addition cure catalyst, typically at most 0.01% of the pre-polymer, on a per mole basis.

Exemplary formulations for the fluid first curable material are provided herein below in the Examples.

Figure 9A:
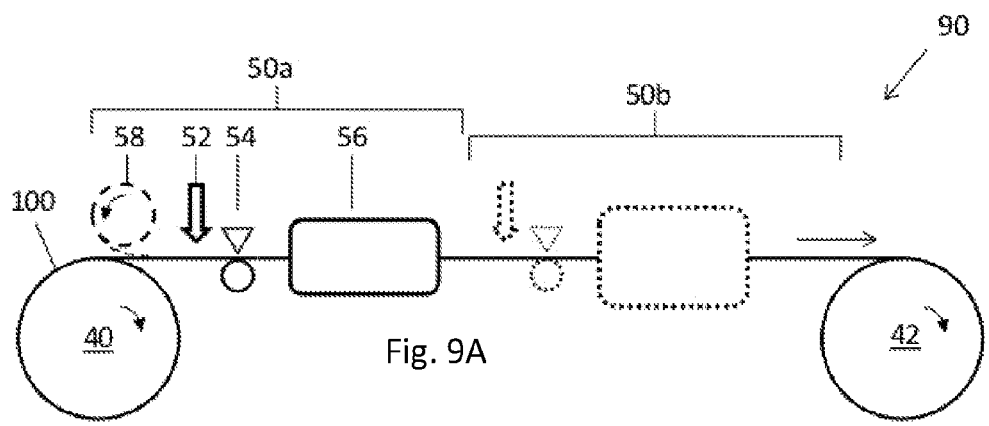
FIGS. 9A to 9D schematically display an apparatus in which some embodiments of the present method can be implemented, different manufacturing stages being illustrated.
Figure 9B:
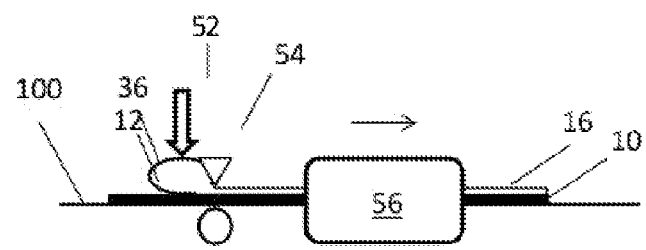

Layer 16 of the fluid first curable composition is applied to carrier contact surface 12, and is subsequently cured. Layer 16 may be spread to the desired thickness using, for example, a doctor blade (a knife on a roll), without allowing the doctor blade to contact the surface that will ultimately act as the ink-transfer surface 14 of the ITM, such that imperfections in the doctor blade will not affect the quality of the finished product. After curing, "release" layer 16 may have a thickness of between about 2 micrometers and about 200 micrometers. An apparatus in which such step and method can be implemented is schematically illustrated in FIGS. 9A and 9B.

For example, the above-detailed release layer formulation may be uniformly applied upon a PET carrier, leveled to a thickness of 5-200 micrometers (µ), and cured for approximately 2-10 minutes at 120-130° C. Surprisingly, the hydrophobicity of the ink transfer surface of the release layer so prepared, as assessed by its receding contact angle (RCA) with a 0.5-5 microliter (µl) droplet of distilled water, may be around 60°, whereas the other side of the same release layer (which served to approximate the hydrophobicity of a layer conventionally prepared with an air interface) may have an RCA that is significantly higher, typically around 90°. PET carriers used to produce ink-transfer surface 14 may typically display an RCA of around 40° or less. All contact angle measurements were performed with a Contact Angle analyzer—Krüss™ "Easy Drop" FM40Mk2 and/or a Dataphysics OCA15 Pro (Particle and Surface Sciences Pty. Ltd., Gosford, NSW, Australia).

Figure 9C:
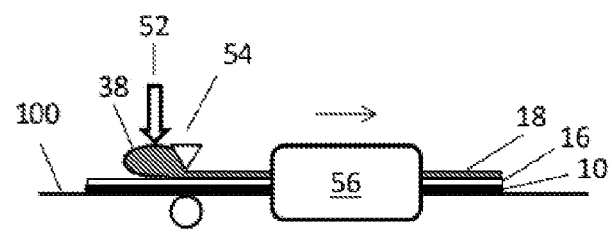

In a subsequent step of the method, the results of which are shown in FIG. 9C, an additional layer 18, referred to as a compliance layer, is applied to layer 16, on the side opposite to ink-transfer surface 14. Compliance layer 18 is an elastomeric layer that allows layer 16 and its outermost surface 14 to follow closely the surface contour of a substrate onto which an ink image is impressed. The attachment of compliance layer 18 to the side opposite to ink-transfer surface 14 may involve the application of an adhesive or bonding composition in addition to the material of compliance layer 18. Generally, compliance layer 18 may typically have a thickness of between about 100 micrometers and about 300 micrometers or more.

While compliance layer 18 may have the same composition as that of release layer 16, material and process economics may warrant the use of less expensive materials. Moreover, compliance layer 18 typically is selected to have mechanical properties (e.g., greater resistance to tension) that differ from release layer 16. Such desired differences in properties may be achieved, by way of example, by utilizing a different composition with respect to release layer 16, by varying the proportions between the ingredients used to prepare the formulation of release layer 16, and/or by the addition of further ingredients to such formulation, and/or by the selection of different curing conditions. For instance, the addition of filler particles may favorably increase the mechanical strength of compliance layer 18 relative to release layer 16.

In some embodiments, compliance layer 18 may include various rubbers. Preferably such rubbers are stable at temperatures of at least 100° C., and may include rubbers such as alkyl acrylate copolymer rubbers (ACM), methyl vinyl silicone rubber (VMQ), ethylene propylene diene monomer rubber (EPDM), fluoroelastomer polymers, nitrile butadiene rubber (NBR), ethylene acrylic elastomer (EAM), and hydrogenated nitrile butadiene rubber (HNBR).

As a non-limiting example, Silopren® LSR 2530 (Momentive Performance Materials Inc., Waterford N.Y.), a two-component liquid silicone rubber, in which the two components are mixed at a 1:1 ratio, was applied to the cured release layer 16 previously described. The silicone rubber mixture was metered/leveled with a knife blade to obtain an incipient compliance layer 18 having a thickness of about 250 micrometers, which was then cured for approximately 5 minutes at 150-160° C.

In a subsequent step of the method, the results of which are shown in FIG. 7D, a reinforcement layer or support layer 20 is constructed on compliance layer 18. Support layer 20 typically contains a fiber reinforcement, in the form of a web or a fabric, to provide support layer 20 with sufficient structural integrity to withstand stretching when the ITM is held in tension in the printing system. Support layer 20 is formed by coating the fiber reinforcement with a resin that is subsequently cured and remains flexible after curing.

Alternatively, support layer 20 may be separately formed as a reinforcement layer, including such fibers embedded and/or impregnated within the independently cured resin. In this case, support layer 20 may be attached to compliance layer 18 via an adhesive layer, optionally eliminating the need to cure the support layer 20 in situ. Generally, support layer 20, whether formed in situ on compliance layer 18 or separately, may have a thickness of between about 100 micrometers and about 500 micrometers, part of which is attributed to the thickness of the fibers or the fabric, which thickness generally varies between about 50 micrometers and about 300 micrometers. However, the support layer thickness is not limiting. For heavy-duty applications, by way of example, the support layer may have a thickness of more than 200 micrometers, more than 500 micrometers, or 1 mm or more.

For example, to the multi-layered ITM structure described herein, including a vinyl-functionalized release coating 16 and a two-component silicone rubber compliance layer 18, was applied a support layer 20 including woven fabric of glass fibers. The glass fiber fabric, having a thickness of about 100 micrometers, was a plain weave fabric having 16 yarns/cm in perpendicular directions. The glass fiber fabric was embedded into a curable fluid including a liquid silicone rubber Silopren® LSR 2530 corresponding to the compliance layer. Overall, the resulting support layer 20 had a thickness of about 200 micrometers and was cured at 150° C. for approximately 2-5 minutes. Preferably, denser weave fabrics (e.g., having 24×23 yarns/cm) may be used.

Following the in situ formation, or attachment, of support layer 20, additional layers may be built up on the reverse side thereof, as required. FIG. 7E shows an optional felt blanket 22 secured (e.g., by a cured adhesive or resin) to the reverse side of support layer 20, and FIG. 7F shows a high friction layer 24 coated onto the reverse side of blanket 22. As will be appreciated by persons skilled in the art, various relatively soft rubbers may serve for the preparation of a layer having high friction properties, silicone elastomers being but an example of such rubbers. In the absence of an intervening layer such as blanket 22, high friction layer 24 may be attached directly to support layer 20.

Figure 8A:
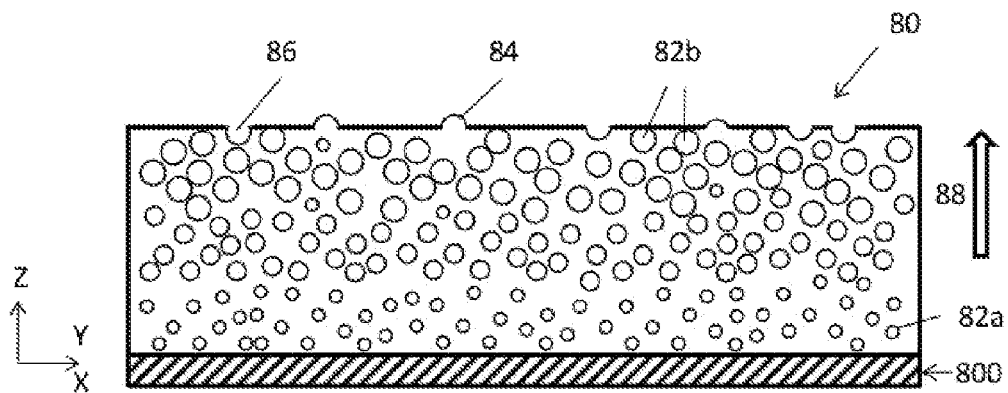
FIGS. 8A and 8B schematically illustrate a cross section through a release layer prepared according to the prior art.
Figure 8B:
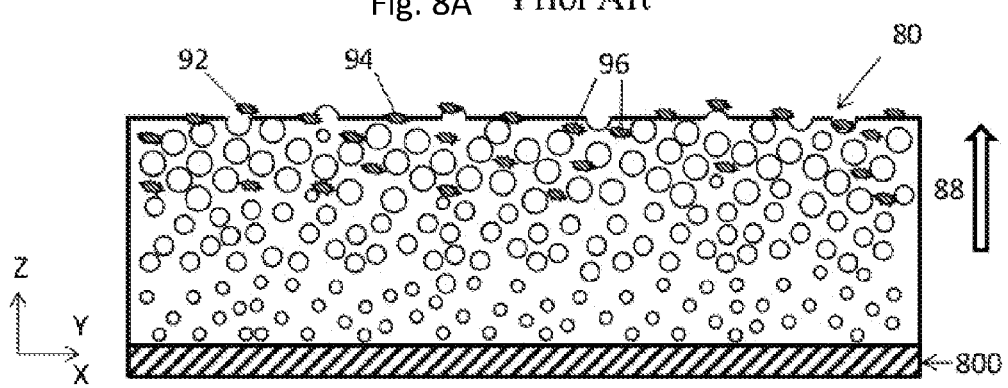
Figure 8C:
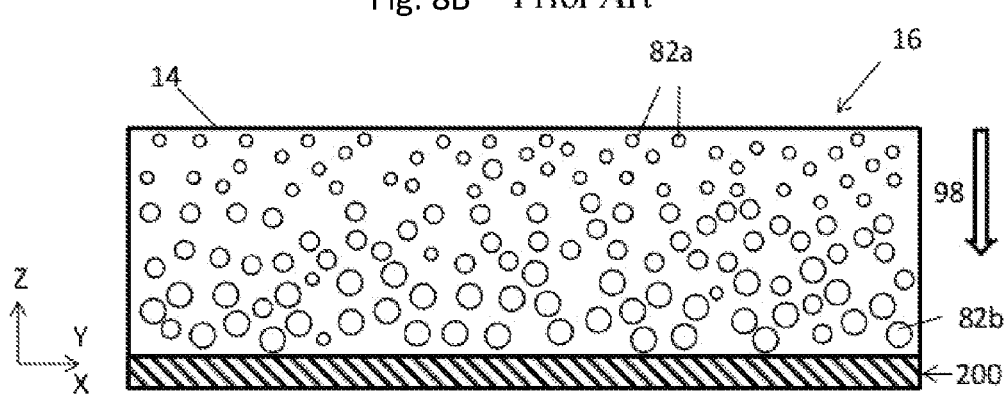
FIG. 8C schematically illustrates a cross-section through a release layer prepared according to a method of the present disclosure.

As mentioned, all layers (e.g., 18, 20, 22, 24, or any intervening adhesive or priming layer and the like) added to the release layer of the ITM jointly form the base of the structure, as shown with respect to base 200 in FIG. 8C.

Before the ITM is used, it is necessary to remove carrier 10 to expose ink-transfer surface 14 of release layer 16, as illustrated in FIG. 7G. Typically, the finished product can simply be peeled away from carrier 10.

If the carrier 10 is a flexible foil, it may be preferred to leave it in place on the ITM until such time as the ITM is to be installed into a printing system. The foil will act to protect the ink-transfer surface 14 of the ITM during storage, transportation and installation. Additionally, carrier 10 can be replaced, following completion of the manufacturing process, by an alternative foil that is suitable as a protective film.

FIGS. 9A to 9D schematically illustrate an apparatus 90 in which the ITM may be manufactured. FIG. 9A provides a schematic overview of such an apparatus 90 having an unwinding roller 40 and a winding roller 42 moving a flexible loop conveyor 100. Along the path followed by conveyor 100 can be positioned a dispensing station 52, able to dispense curable fluid compositions suitable for the desired ITMs, a leveling station 54, able to control the thickness of the curable layer as it moves downstream of the station, and a curing station 56, able to at least partially cure the layer enabling it to serve as incipient layer for a subsequent step, if any. The dispensing station 52, the leveling station 54 and the curing station 56 constitute a layer forming station 50a. As illustrated by 50b, apparatus 90 may optionally include more than one layer forming station. Furthermore, a forming station 50 may include additional sub-stations, illustrated by a dispensing roller 58 in station 50a.

In some embodiments, the need for loop conveyor 100 is obviated: carrier 10 is directly tensioned between rollers 40 and 42. Unprocessed carrier 10 is unwound from unwinding roller 40, and after passing through stations 50a and 50b, is rewound onto winding roller 42.

Though not illustrated in the Fig., the apparatus may further include upstream of the dispensing station a "surface treatment" station facilitating the subsequent application of a curable composition, or its attachment to the carrier contact surface or incipient layer as the case may be. As mentioned in relation with the carrier, the optional surface treatment station (not shown) can be suitable for physical treatment (e.g., corona treatment, plasma treatment, ozonation, etc.).

FIG. 9B schematically illustrates how in a forming station 50 of apparatus 90, a carrier 10 placed on conveyor 100 can be coated. At dispensing station 52, the curable composition 36 of release layer 16 is applied to carrier contact surface 12. As carrier 10 is driven in the direction of the arrow, the curable composition 36 is leveled to a desired thickness at leveling station 54, for instance, by using a doctor blade. As the leveled layer proceeds downstream, it enters curing station 56, configured so as to at least partially cure curable composition 36, enabling the formation of incipient layer 16 at the exit side of the curing station. Such exemplary steps have been described in connection with FIGS. 7A and 7B.

Figure 9D:
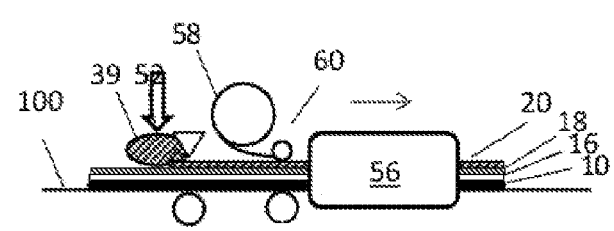

FIGS. 9C and 9D schematically illustrate how additional layers (forming the base) can be applied. In FIG. 9C, a curable composition 38 is dispensed at dispensing station 52 (which can be same or different than the station having served to coat the carrier with the release layer 16, as illustrated in FIG. 9B). Curable composition 38 is leveled to a desired thickness at leveling station 54, then enters curing station 56, and exits curing station 56 sufficiently cured to serve as incipient layer 18 for a subsequent step, and so on. Such an exemplary step has been described in connection with FIG. 7C. With reference now to FIG. 9C, FIG. 9C schematically depicts a curable composition 39 being applied at dispensing station 52. The backbone of a support layer (e.g., a fabric) can be delivered by dispensing roller 58. The exemplary fabric can be submerged into the curable composition at a station 60 prior to their entry into curing station 56. In such a manner, a support layer 20 can be formed at the exit side of the curing station.

FIGS. 8A and 8B schematically illustrate how defects would appear in a section of an outer layer 80 (e.g., a release layer) prepared according to the above-described method of the art. FIG. 8A illustrates different phenomena relating to air bubbles, which may be entrapped in any curable composition if the curing occurs before such bubbles can be eliminated (e.g., by degassing). As can be seen in the figure, as tiny bubbles 82 migrate towards the air interface, the orientation of layer 80 during manufacturing over a body 800, hence the direction of migration, being indicated by an arrow, they can merge into larger bubbles. The bubbles, independently of their size, may either remain entrapped within the bulk of the layer or on its surface, the upper part of the bubbles envelope forming protrusions 84. When bubbles adjacent to the surface burst while the curing of the layer is advanced, craters 86 may remain, even if the segment of the envelope of the bubbles protruding from the surface has disappeared. These phenomena therefore typically provide a "gradient" of air bubbles, the upper sections being generally either populated by larger bubbles than the lower sections and/or having a higher density of bubbles per cross section area or per volume, lower and higher being relative to the orientation of the layer during its manufacturing. The impact of bubbles-derived defects on the surface is self-evident, the heterogeneity of the surface typically negatively affecting any subsequent interplay, for instance with an ink image. With time, such ITM being typically operated under tension and/or under pressure, craters may widen and merge to form more significant fissures. Thus, such phenomena may affect the structural integrity of the surface and any mechanical property such integrity would have conferred to the ITM.

FIG. 8B schematically illustrates different phenomena relating to solid contaminants, such as dust. Though in the present illustration, the dust is represented as being in addition to air bubbles, this need not be necessarily the case, each such surface or layer defect able to occur independently. As can be seen in the figure, solid contaminants may remain upon the surface. If the settling of contaminants occurs after the outer layer 80 is cured, then such contaminants 92 may even be removed by suitable cleaning of the outer surface. Still, such a phenomenon is undesirable, as it would require additional processing of such an ITM before being able to use it. If such contaminations occur while the layer is still uncured, then the contaminants can be either entrapped on the surface of layer 80, (e.g., contaminant 94, which appears to be "floating"), or can even be submerged within the release layer, (e.g., contaminant 96). As can be readily understood, larger/heavier contaminants may sink more deeply than smaller ones.

The method disclosed herein includes forming a layer of a fluid first curable material with one side of the layer contacting a carrier contact surface, the layer constituting an incipient release layer. The carrier contact surface functions to protect the incipient release layer, giving the ink transfer layer desired properties, while the carrier acts as a physically robust support structure onto which other layers are added to form the ITM, until the ITM is complete. As a result, many potential sources of defect are avoided. Moreover, the finish of the ink transfer surface is primarily, if not exclusively, determined by the carrier contact surface.

FIG. 8C schematically illustrates a section through an outer layer 16 (e.g., a release layer) prepared according to the present method. For comparison with previous drawings, the section is shown without a carrier and in the same orientation as FIGS. 8A and 8B, though the manufacturing is performed in inversed orientation as shown by the arrow. The base 200, which, as shall be detailed hereinafter, is attached to the first outer layer 16 after the layer is at least partially cured, is therefore not equivalent to body 800 already serving as support during the manufacturing process. For the sole sake of illustration, layer 16 is represented as including an important number of bubbles 82, but this need not be the case. However, if present, such bubbles would display a distinct pattern than those previously described. First, as the now uppermost ink transfer surface 14 of layer 16 was previously in contact with a carrier, no protrusions can be observed, the release layer being therefore devoid of phenomena such as previously illustrated by surface protruding bubbles 84. Likewise, craters previously illustrated as cavities 86 are very unlikely, as they would imply using an incompatible curable layer and carrier. As according to the present method, the curable material due to form the outer layer is to suitably wet the carrier, it is believed that substantially no air bubbles can be entrapped between the carrier and the incipient layer formed thereon. Thus, if at all present, such bubbles would be disposed in the bulk of the layer. However, as the manufacturing is performed in inverted orientation as compared to conventional methods, the gradient of bubbles would, for the same reason, be inverted. Thus, and as depicted in FIG. 8C tiny bubbles would be closer to the outer surface than larger bubbles, which would be closer to the base.

The above-described release layer structures of the present disclosure, produced from addition-cure formulations, may contain substantially no functional groups, or an insubstantial amount (e.g., an insubstantial amount of OH groups), covalently attached within the polymer matrix. Such functional groups may include moieties such as C=O, S=O, and OH, by way of example.

Because these release layer structures contain, at most, an insubstantial amount of such functional groups, it would be expected that the release layers thereof would be highly hydrophobic. The release layer surfaces produced by this method may actually be somewhat hydrophilic, and appreciably more hydrophilic than corresponding release layers, i.e., release layers having the same composition, but manufactured using the conventional curing technique in which the release layer is exposed to air ("standard air curing"). It is believed that the intimate contact between the carrier contact surface and the incipient release layer surface, the somewhat hydrophilic properties of the carrier contact surface are induced in the release layer surface.

As discussed hereinabove, ITM release layers having low surface energies may facilitate transfer of the dried ink image to the printing substrate. However, during the ink reception stage, the aqueous ink drops jetted onto such a low-energy, hydrophobic release layer tend to bead after the initial impact, thereby compromising image quality. Higher-energy, less hydrophobic release layers may mitigate this effect, but may be detrimental to image transfer quality. It has been found that the release layer structures disclosed herein may have release surfaces of characteristically moderated hydrophobicity, as manifested by receding contact angles for distilled water of at most 80°, or at most 70°, typically, at most 60°, or at most 50°, and more typically, 30°-60°, 35°-60°, 30°-55°, 30°-50°, 30°-45°, or 35°-50°. It has been found, however, that both the ink reception and the transfer of the dry, heated ink image may be of good quality.

It must be emphasized that yet lower values of the receding contact angle (and the dynamic contact angle discussed herein below) may be achieved by employing carrier surfaces having higher hydrophilicity (lower contact angles with respect to drops of distilled water), and/or by corona (or similar) treatment.

It is believed that the above-described induced surface properties improve the interactions between polar groups (e.g., O—Si—O) on the release layer surface and corresponding polar moieties (e.g., OH groups in the water) in the aqueous liquids (e.g., aqueous inkjet inks) deposited thereon, thereby contributing to the reception of the jetted ink drops. Subsequently, after drying the ink and heating of the ink film to transfer temperatures, these interactions are weakened, enabling complete transfer of the dry or substantially dry ink image. Thus, the performance of the inventive release layer structure—at both the ink reception stage and the ink film transfer stage—is appreciably better than would have been expected for a release layer having moderate hydrophobicity, but devoid of the special surface structure and properties induced by the carrier contact surface.

Binders

Binders play an important role in the transferability of the dried $1^{st}$ ink component, and the dried ink image containing both ink components, from the release layer of the ITM. Binders also play an important role in the adhesion of the dried ink image to the printing substrate.

Various families of binders may be utilized within the $1^{st}$ ink formulations of the present invention, including polystyrene-acrylate co-polymers, poly-acrylate polymers, polyurethanes (e.g., aliphatic polyurethanes or anionic aliphatic polyurethanes), urethane-acrylate co-polymers, and polyesters (e.g., a polyethylene terephthalate).

Exemplary styrene-acrylic (or polystyrene-acrylate) copolymers include Joncryl® 77E (Tg=35° C.), Joncryl® 586 (Tg=66° C.), Joncryl® 90 (Tg=110° C.), Joncryl® 8085 (Tg=57° C.), and Joncryl® ECO 2177 (Tg=21° C.).

Exemplary polyurethanes include NeoRez® R-563, an anionic aliphatic polyurethane from DSM-PUD.

Exemplary urethanes include NeoRez® R-600, an aliphatic urethane dispersion from DSM-PUD.

Exemplary acrylic or polyacrylic binders include Joncryl® 538, an acrylic polymer emulsion (Tg=64° C.).

Exemplary polyesters include Plascoat Z-105 (Tg 52° C.), Plascoat Z-730 (Tg 46° C.), Plascoat Z-750 (Tg 52° C.) (all from GOO Chemicals).

The binders may be provided in various forms, such as dispersions or emulsions, with water typically being the major carrier liquid.

The binders should be sufficiently soft at the process transfer temperature such that the dried binder is sufficiently tacky (and cohesive) to fully transfer from the release layer to the printing substrate. Moreover, the binder must facilitate the transfer of the dried ink image (i.e., including the dried $2^{nd}$ ink component), which may contain components having poor transferability properties (e.g., the dried $2^{nd}$ ink component). Consequently, the glass transition temperature of the binders is typically at most 100° C. or at most 90° C., and more typically, at most 85° C., at most 80° C., at most 75° C., or at most 70° C.

It must be emphasized that the ink formulations may contain at least one plasticizing agent, which may serve to reduce the glass transition temperature of the binders. In some cases, a plasticizing binder having a relatively low glass transition temperature may be introduced to the $1^{st}$ ink component. This plasticizing binder may serve to lower the glass transition temperature (and required transfer temperature) of the dried $1^{st}$ ink component, and/or the glass transition temperature (and required transfer temperature) of the dried ink image.

For jetted (typically digitally applied) $1^{st}$ ink component formulations, the binder concentration (on the basis of binder solids) may be within a range of 5%-28% of the formulation, on a weight basis. For $1^{st}$ ink component formulations that are spread as a continuous layer, however, this binder concentration may be 5%-55%.

Including other non-volatile content present in the $1^{st}$ ink component formulations—including plasticizers, surfactants, etc.—the total non-volatile concentration of the formulation may thus be 8% to 35% for the jetted formulations, and 8% to 65% for the spread formulations.

Plasticizing Agents

Plasticizing agents may be added to enhance the plasticity of the material, bringing down the required temperature at which the dry film may be transferred to the printing substrate.

Families of plasticizing agents include urea derivatives and sorbitan derivatives. Such sorbitan derivatives may include derivatives such as sorbitan esters (such as SPAN 20, SPAN 40, SPAN 60, and SPAN 80) and polyethoxylated sorbitan esters (e.g., polyethoxylated sorbitan monoesters such as TWEEN 20, TWEEN 40, TWEEN 60, and TWEEN 80), which may be particularly suitable. The structure of a polyethoxylated sorbitan monoester is provided below:

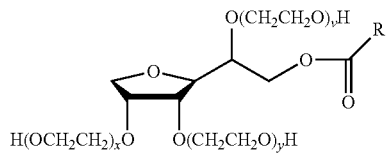

where R is the alkyl group of a fatty acid and the total number of moles of ethylene oxide is v+x+y. Typical plasticizing agents within this family include polyethoxyethylene sorbitan monolaurate, polyethoxyethylene sorbitan monopalmitate, polyethoxyethylene sorbitan monolstearate, polyethoxyethylene sorbitan tristearate and polyethoxyethylene sorbitan monooleate. The plasticizing agents may also behave as nonionic surfactants.

In some embodiments, the HLB no. of the plasticizing agent may be at least 7, at least 8, at least 9, or at least 10 (by way of example, the HLB no. of polyethoxyethylene (20) sorbitan monooleate is 15.0). The HLB no. of the polyethoxylated sorbitan monoester molecule may be adjusted by increasing or reducing the number of ethylene oxide units to (respectively) increase or reduce the hydrophilicity (and generally correspondingly, the HLB no.).

Jetted formulations of the present invention may contain at least 1%, at least 2%, at least 3%, or at least 4% of such surfactants, by weight, and more typically, within a range of 1%-7%, 1.5%-7%, 2%-7%, 2.5%-7%, 3%-7%, 1.5%-6%, 2%-6%, 2.5%-6%, 3%-6%, or 2.5%-5.5%.

Surfactants

Surfactants may be utilized to lower the surface tension of the formulations, and/or to improve wetting characteristics, e.g., with the release layer.

Various classes of surfactants may be suitable, including anionic surfactants (e.g., SDS). Surfactants of particular suitability for use in conjunction with the present silicone-based release layer include non-ionic surfactants. These may include siloxanes and siloxane copolymers such as polyether siloxane copolymers. Such surfactants are commercially available, e.g., as Tego® Wet 240, Tego® Wet 280, Tego® Twin 4100, Byk® 348 Byk® 349, and Byk® 3455.

Jetted formulations of the present invention may contain at least 1%, at least 2%, at least 3%, or at least 4% of such surfactants, by weight, and more typically, within a range of 1%-5%, 1.5%-5%, 2%-5%, 2.5%-5%, 3%-5%, 1.5%-4.5%, 2%-4.5%, 2.5%-4.5%, 3%-4.5%, or 2.5%-4%.

Spread formulations of the present invention may contain the same amounts of such surfactants as jetted formulations. However, the spread formulations may be devoid of such surfactants. More typically, the spread formulations may contain 0%-2%, 0.1%-2%, or 0.3%-1.5% of such surfactants.

Surface Energy Modifiers

Surface energy modifiers may be used to reduce the surface energy of the formulation. This may enhance wetting, e.g., wetting of the release layer surface.

Families of such surface energy modifiers include silicone-based surfactants such as polysiloxane-polyoxyalkylene copolymers. Such surface energy modifiers are commercially available, e.g., as Byk® 307, Byk® 333, and Byk® 378.

pH Modifiers pH modifiers may be used to raise or lower the acidity to within a desired range. Typically, the pH modifiers are basic, and may include an amine functionality. Specific examples include ammonia, triethanolamine, 2-Amino-2-methyl-1-propanol (commercially available as AMP 95®), and dimethylethylamine Humectants Humectants may serve to reduce the tendency of the formulation to dry, which may reduce clogging of nozzles and alleviate other disadvantageous phenomena. Families of humectants include, by way of example, alcohols, polyols, and glycols.

The concentration of the humectant or humectants within the $1^{st}$ and $2^{nd}$ ink components may typically be within the range of 5%-50% for jetted formulations, and may typically be within the range of 0%-25% for spread formulations.

Additional Discussion

Inventive concept 1. A method of printing a digital image on a printing substrate using an intermediate transfer member (ITM), the method comprising:
  a. providing:
    i. a first aqueous ink component, the first aqueous ink component optionally being transparent; and
    ii. a second aqueous ink component comprising colorant particles
  b. delivering a quantity of the first ink component to a target surface of the ITM, to cover a portion of the target surface with a wet volume of the first ink component;
  c. effecting only a partial drying of the wet volume to produce a partially-dried layer of the first ink component on the ITM;
  d. digitally depositing droplets of the second ink component onto the partially-dried layer of the first component so as to form a wet, colored ink-image on the ITM, wherein the partially-dried layer of the first ink component is sufficiently moist and permeable such that some or all of the colorant particles of the second ink component penetrate into the partially-dried layer of the first ink component;

e. at least partially drying the wet, colored ink-image;
f. transferring the at least partially dried ink-image from the ITM to printing substrate.

Inventive concept 2. The method of claim 1 wherein the at least partially dried ink-image is tacky upon transfer from the ITM in step (f).

Inventive concept 3. The method of any preceding inventive concept wherein the drying of step (e) is performed at least in part by heating and/or the at least partially dried ink-image is heated on the ITM before the transfer.

Inventive concept 4. The method of any preceding inventive concept wherein (i) the at least partial drying is performed to produce a dried, tacky ink-image-bearing residue film; and (ii) the dried, tacky ink-image-bearing residue film is transferred from the ITM to the printing substrate in step Inventive concept 5. A method of printing a digital image on a printing substrate using an intermediate transfer member (ITM), the method comprising:
a. providing:
 i. a first aqueous ink component, the first aqueous ink component optionally being transparent; and
 ii. a second aqueous ink component comprising colorant particles,
b. delivering a quantity of the first ink component to a target surface of the ITM, to cover a portion of the target surface with a wet volume of the first ink component;
c. effecting only a partial drying of the wet volume to produce a partially-dried layer of the first ink component on the ITM;
d. digitally depositing droplets of the second ink component onto the partially-dried layer of the first component so as to form a wet, colored ink-image on the ITM, wherein the partially-dried layer of the first ink component is sufficiently moist and permeable such that some or all the colorant particles of the second ink component penetrate into the partially-dried layer of the first ink component;
e. at least partially drying and heating of the wet, colored ink-image to produce a dried, tacky ink-image-bearing residue film at a transfer temperature $T_{TRANSFER}$; and
f. effecting transfer of the dried, tacky ink-image-bearing residue film that is at the transfer temperature $T_{TRANSFER}$ from the ITM to a printing substrate to produce the digital image on the printing substrate.

Inventive concept 6. The method of any preceding inventive concept, wherein the first aqueous ink component that is provided in step (a) is transparent.

Inventive concept 7. The method of any preceding inventive concept, wherein the first ink component is delivered to the ITM surface in step (b) by droplet deposition, optionally by ink-jetting.

Inventive concept 8. The method of any preceding inventive concept, wherein the first ink component is delivered to the ITM surface by droplet deposition according to a pattern of the ink-image to be subsequently formed by the digital depositing of the droplets of the second ink component.

Inventive concept 9. The method of any preceding inventive concept, wherein the second component is delivered in step (d) by ink-jetting.

Inventive concept 10. The method of inventive concept 8, wherein during ink-jetting of the second ink component and under jetting conditions, the second aqueous ink component is a resoluble ink component.

Inventive concept 11. The method of any preceding inventive concept, wherein prior to impact between the droplets of the second ink component and the layer of the first ink component, a liquid content of the layer of the first ink component is at least 10% wt/wt or at least 20% wt/wt or at least 30% wt/wt or at least 40% wt/wt.

Inventive concept 12. The method of any one of inventive concepts 1-10 wherein immediately before impact between the droplets of the second ink component and the layer of the first ink component, a liquid content of the layer of the first ink component is at least 10% wt/wt or at least 20% wt/wt or at least 30% wt/wt or at least 40% wt/wt.

Inventive concept 13. The method of any one of inventive concepts 11-12 wherein the liquid content of the layer of the first ink component is at least 20% wt/wt.

Inventive concept 14. The method of any one of inventive concepts 11-12 wherein the liquid content of the layer of the first ink component is at least 30% wt/wt.

Inventive concept 15. The method of any one of inventive concepts 11-12 wherein the liquid content of the layer of the first ink component is at least 40% wt/wt.

Inventive concept 16. The method of any preceding inventive concept, wherein upon impact between the droplets of the second ink component and the layer of the first ink component, some or all the colorant particles of the second ink component penetrate into the partially-dried layer of the first ink component.

Inventive concept 17. The method of inventive concept 16, wherein at least pP % of the colorant particles of the second ink component penetrate into and mixed with the partially-dried layer of the first ink component, and wherein pP is a positive number having a value of at least 10.

Inventive concept 18. The method of inventive concept 15, for a given deposited droplet of the second ink component, at least pP % of the colorant particles thereof penetrate into and mixed with the partially-dried layer of the first ink component, and wherein pP is a positive number having a value of at least 10.

Inventive concept 19. The method of any one of inventive concepts 17-18 wherein a value of pP is at least 20.

Inventive concept 20. The method of any one of inventive concepts 17-18 wherein a value of pP is at least 30.

Inventive concept 21. The method of any one of inventive concepts 17-18 wherein a value of pP is at least 50.

Inventive concept 22. The method of any one of inventive concepts 17-18 wherein a value of pP is at least 70.

Inventive concept 23. The method of any one of inventive concepts 17-18 wherein a value of pP is at least 80.

Inventive concept 24. The method of any preceding inventive concept wherein upon transfer from the ITM, a temperature of the least partially dried ink-image is $T_{Transfer}$.

Inventive concept 25. The method of any preceding inventive concept, wherein:
A. a dry film glass transition temperature $T_g^{dry\_film}([2^{nd}\text{ component}])$ of the second ink component exceeds the transfer temperature $T_{TRANSFER}$ by at least X° C., where X is a first positive number; and
B. a dry film glass transition temperature $T_g^{dry\_film}([5:1\ 2^{nd}\text{ component}:1^{st}\text{ component}])$ of a 5:1 weight-ratio of the first and second components is less than the transfer temperature $T_{TRANSFER}$ by at least Y° C., where Y is a second positive number.

Inventive concept 26. The method of any preceding inventive concept wherein:
A. a dry film glass transition temperature $T_g^{dry\_film}([2^{nd}\text{ component}])$ of the second ink component exceeds the transfer temperature $T_{TRANSFER}$ by at least X° C., where X is a first positive number; and B. a dry film glass transition temperature $T_g^{dry\_film}$([1$^{st}$ component]) of the first ink component is less than the transfer temperature $T_{TRANSFER}$ by at least Y° C., where Y is a second positive number.

Inventive concept 27. The method of any one of inventive concepts 25-26, wherein a value of X is at least 5 or at least 10 or at least 15 or at least 20 or at least 30 or at least 40.

Inventive concept 28. The method of any one of inventive concepts 25-26, wherein a value of Y is at least 5 or at least 10 or at least 15 or at least 20 or at least 30 or at least 40.

Inventive concept 29. The method of any one of inventive concepts 25-26, wherein a value of X is at least 5.

Inventive concept 30. The method of any one of inventive concepts 25-26, wherein a value of X is at least 10.

Inventive concept 31. The method of any one of inventive concepts 25-26, wherein a value of X is at least 15.

Inventive concept 32. The method of any one of inventive concepts 25-26, wherein a value of X is at least 20.

Inventive concept 33. The method of any one of inventive concepts 25-26, wherein a value of X is at least 30.

Inventive concept 34. The method of any one of inventive concepts 25-26, wherein a value of X is at least 40.

Inventive concept 35. The method of any one of inventive concepts 25-26 or 29-34, wherein a value of Y is at least 5.

Inventive concept 36. The method of any one of inventive concepts 25-26 or 29-34, wherein a value of Y is at least 10.

Inventive concept 37. The method of any one of inventive concepts 25-26 or 29-34, wherein a value of Y is at least 15.

Inventive concept 38. The method of any one of inventive concepts 25-26 or 29-34, wherein a value of Y is at least 20.

Inventive concept 39. The method of any one of inventive concepts 25-26 or 29-34, wherein a value of Y is at least 30.

Inventive concept 40. The method of any one of inventive concepts 25-26 or 29-34, wherein a value of Y is at least 40.

Inventive concept 41. The method of any preceding inventive concept wherein a ratio between A. a dry ink film dynamic viscosity $\mu_g^{dry\_film}$([2$^{nd}$ component], $T_{TRANSFER}$) of the second aqueous ink component at the transfer temperature $T_{TRANSFER}$; and B. a dry ink film dynamic viscosity $\mu_g^{dry\_film}$([5:1 2$^{nd}$ component:1$^{st}$ component], $T_{TRANSFER}$) of a 5:1 weight-ratio of the first and second components at the transfer temperature $T_{TRANSFER}$ is at least a positive number V, a value of V being at least 2.5 or at least 3 or at least 4 or at least 5 or at least 7 or at least 10 or at least 15 or at least 25 or at least 50.

Inventive concept 42. The method of inventive concept 41 wherein a value of V is at least 3.

Inventive concept 43. The method of inventive concept 41 wherein a value of V is at least 4.

Inventive concept 44. The method of inventive concept 41 wherein a value of V is at least 5.

Inventive concept 45. The method of inventive concept 41 wherein a value of V is at least 7.

Inventive concept 46. The method of inventive concept 41 wherein a value of V is at least 10.

Inventive concept 47. The method of inventive concept 41 wherein a value of V is at least 15.

Inventive concept 48. The method of inventive concept 41 wherein a value of V is at least 25.

Inventive concept 49. The method of inventive concept 41 wherein a value of V is at least 50.

Inventive concept 50. The method of any preceding inventive concept wherein a ratio between A. a dry ink film dynamic viscosity $\mu_g^{dry\_film}$([2$^{nd}$ component], $T_{TRANSFER}$) of the second aqueous ink component at the transfer temperature $T_{TRANSFER}$; and B. a dry ink film dynamic viscosity $\mu_g^{dry\_film}$([1$^{st}$ component], $T_{TRANSFER}$) of the first aqueous ink component at the transfer temperature $T_{TRANSFER}$ is at least a positive number W, a value of W being 2.5. or at least 3 or at least 4 or at least 5 or at least 7 or at least 10 or at least 15 or at least 25 or at least 50.

Inventive concept 51. The method of inventive concept 50, wherein the value of W is at least 3.

Inventive concept 52. The method of inventive concept 50, wherein the value of W is at least 4.

Inventive concept 53. The method of inventive concept 50, wherein the value of W is at least 5.

Inventive concept 54. The method of inventive concept 50, wherein the value of W is at least 7.

Inventive concept 55. The method of inventive concept 50, wherein the value of W is at least 10.

Inventive concept 56. The method of inventive concept 50, wherein the value of W is at least 15.

Inventive concept 57. The method of inventive concept 50, wherein the value of W is at least 25.

Inventive concept 58. The method of claim 50, wherein the value of W is at least 50.

Inventive concept 59. The method of any preceding claim, performed without forming a gel or gelatinous phase of the first aqueous ink component on the ITM surface.

Inventive concept 60. The method of any preceding claim, wherein the provided first aqueous ink component (i) comprises between 40% wt/wt and 70% wt/wt water and (ii) further comprises at least 10% wt/wt binder.

Inventive concept 61. The method of any previous claim wherein a surface energy (at 25° C.) of the ITM target surface is at least 20 dynes/cm or at least 21 dynes/cm or at least 22 dynes/cm or at least 23 dynes/cm.

Inventive concept 62. The method of any previous claim, wherein the ITM comprises a silicone-based release layer surface.

Inventive concept 63. The method of Inventive concept 62, wherein the silicone-based release layer surface is sufficiently hydrophilic to satisfy at least one of the following properties: (i) a receding contact angle of a drop of distilled water deposited on the silicone-based release layer surface is at most 60°; and (ii) a 10-second dynamic contact angle (DCA) of a drop of distilled water deposited on the silicone-based release layer surface is at most 108°.

Inventive concept 64. The method of any of inventive concepts 63, wherein the 10 second DCA is at most 108°, at most 106°, at most 103°, at most 100°, at most 96°, at most 92°, or at most 88°, optionally at least 60°, at least 65°, at least 70°, at least 75°, at least 78°, at least 80°, at least 82°, at least 84°, or at least 86°, and further optionally, within a range of 60 to 108°, 65 to 105°, 70 to 105°, 70 to 100°, 70 to 96°, 70 to 92°, 75 to 105°, 75 to 100°, 80 to 105°, 80 to 100°, 85 to 105°, or 85 to 100°.

Inventive concept 65. The method of any one of inventive concepts 63-64, wherein the silicone-based release layer surface is sufficiently hydrophilic such that a receding contact angle of a drop of distilled water deposited on the silicone-based release layer surface is at most 60°.

Inventive concept 66. The method of any one of inventive concepts 63-65, wherein the silicone-based release layer surface is sufficiently hydrophilic such that a 10-second dynamic contact angle (DCA) of a drop of distilled water deposited on the silicone-based release layer surface is at most 108°.

Inventive concept 67. The method of any one of inventive concepts 63-66, wherein the provided ITM comprises a support layer and a release layer having said silicone-based release layer surface and a second surface that (i) opposes said silicone-based release layer surface, and (ii) is attached to said support layer, and wherein said release layer is formed of an addition-cured silicone material, and wherein a thickness of said release layer is at most 500 micrometers (μm).

Inventive concept 68. The method of inventive concept 67, wherein the release layer of the provided ITM has the following structural property: said addition-cured silicone material consists essentially of an addition-cured silicone, or contains, by weight, at least 95% of said addition-cured silicone.

Inventive concept 69. The method of any one of inventive concepts 67-68, wherein functional groups within said silicone based release layer surface of the provided ITM make up at most 3%, by weight, of said addition-cured silicone material.

Inventive concept 70. The method of any one of inventive concepts 67-69, wherein a polyether glycol functionalized polydimethyl siloxane is impregnated in said addition-cured silicone material of the provided ITM.

Inventive concept 71. The method of any one of inventive concepts 67-70, wherein the release layer of the provided ITM is adapted such that polar groups of the ink reception surface have an orientation away from or opposite from the second surface.

Inventive concept 72. The method of any one of inventive concepts 63 to 71, wherein a surface hydrophobicity of said silicone-based release layer surface of the provided ITM is less than a bulk hydrophobicity of the cured silicone material within the release layer, the surface hydrophobicity being characterized by a receding contact angle of a droplet of distilled water on the ink reception surface, the bulk hydrophobicity being characterized by a receding contact angle of a droplet of distilled water disposed on an inner surface formed by exposing an area of the cured silicone material within the release layer to form an exposed area.

Inventive concept 73. The method of any of inventive concepts 63-72, further comprising, prior to the performing of steps b-f, pre-treating the silicone-based release surface with at least one of a corona treatment, a plasma treatment, and an ozonation treatment, thereby reducing a hydrophobicity of the silicone-based release surface.

Inventive concept 74. The method of any preceding inventive concept, wherein the provided first aqueous ink component comprises at least 35% wt/wt water or at least 40% wt/wt water or at least 50% wt/wt water or at least 55% wt/wt water.

Inventive concept 75. The method of any preceding inventive concept, wherein the provided first aqueous ink component comprises at most 75% wt/wt water or at most 70% wt/wt water or at most 65% wt/wt water.

Inventive concept 76. The method of any preceding inventive concept, wherein the provided first aqueous ink component comprises between 35% wt/wt and 75% wt/wt water or between 40% wt/wt and 75% wt/wt water or between 40% wt/wt and 70% wt/wt water.

Inventive concept 77. The method of any preceding inventive concept, wherein a 60° C. evaporation load of the provided first aqueous ink component is at most 10:1, at most 9:1, at most 8:1, at most 7:1, at most 6:1, at most 5:1, at most 4:1, at most 3.5:1, or at most 3:1.

Inventive concept 78. The method of any preceding inventive concept, wherein a 60° C. evaporation load of the provided first aqueous ink component is at least 2:1, at least 2.2:1, or at least 2.5:1.

Inventive concept 79. The method of any preceding inventive concept, wherein a 60° C. evaporation load of the provided first aqueous ink component is between 2:1 and 10:1, or between 2:1 and 8:1.

Inventive concept 80. The method of any preceding inventive concept, wherein a 60° C. evaporation load of the provided first aqueous ink component is between 2:1 and 9:1.

Inventive concept 81. The method of any preceding inventive concept, wherein a 60° C. evaporation load of the provided first aqueous ink component is between 2:1 and 8:1.

Inventive concept 82. The method of any preceding inventive concept, wherein a 60° C. evaporation load of the provided first aqueous ink component is between 2.5:1 and 7:1.

Inventive concept 83. The method of any preceding inventive concept, wherein a 60° C. evaporation load of the provided first aqueous ink component is between 2.5:1 and 5:1.

Inventive concept 84. The method of any preceding inventive concept, wherein a 60° C. evaporation load of the provided first aqueous ink component is between 2.5:1 and 4:1.

Inventive concept 85. The method of any preceding inventive concept, wherein a 60° C. evaporation load of the provided first aqueous ink component is between 2.5:1 and 3.5:1

Inventive concept 86. The method of any preceding inventive concept, wherein a 60° C. evaporation load is between 2.8:1 and 4:1.

Inventive concept 87. The method of any preceding inventive concept, wherein a 60° C. evaporation load of the provided first aqueous ink component is between 2.8:1 and 3.5:1.

Inventive concept 88. The method of any preceding inventive concept wherein the provided first aqueous ink component comprises at least 6% wt/wt or at least 7% wt/wt or at least 8% wt/wt or at least 9% wt/wt or at least 10% wt/wt or at least 11% wt/wt or at least 12% wt/wt binder.

Inventive concept 89. The method of any preceding inventive concept, wherein a 25° C. static surface tension of the provided first aqueous ink component is at most 32 dynes/cm, at most 30 dynes/cm or at most 28 dynes/cm, and optionally, at least 20 dynes/cm, at least 22 dynes/cm, or at least 23 dynes/cm, and further optionally, within a range of 20-33 dynes/cm, 21-31 dynes/cm, 21-30 dynes/cm, 21-28 dynes/cm, 21-27 dynes/cm, or 21-26 dynes/cm.

Inventive concept 90. The method of any preceding inventive concept wherein the provided first aqueous ink component is devoid of quaternary ammonium salts or comprises at most 1% wt/wt or at most 0.75% wt/wt or at most 0.5% wt/wt or at most 0.25% quaternary ammonium salts, or their neutralized counterparts.

Inventive concept 91. The method of any preceding inventive concept, wherein a dynamic viscosity of the provided first aqueous ink component is at most 100 mPa·s (millipascal seconds) or at most 80 mPa·s.

Inventive concept 92. The method of any preceding inventive concept, wherein a dynamic viscosity of the provided first aqueous ink component is at most 35 mPa·s, at most 30 mPa·s, at most 25 mPa·s, at most 20 mPa·s, or at most 15 mPa·s.

Inventive concept 93. The method of any preceding inventive concept, wherein a dynamic viscosity of the provided first aqueous ink component is at least 3 mPa·s, at least 4 mPa·s, at least 5 mPa·s, or at least 6 mPa·s.

Inventive concept 94. The method of any preceding inventive concept, wherein the provided first aqueous ink component is devoid of organic solvents and/or comprises at most 3%, at most 2%, at most 1%, or at most 0.5%, or at most 0.25% or at most 0.1% by weight, organic solvents.

Inventive concept 95. The method of any preceding inventive concept, wherein the provided first aqueous ink component is devoid of glycerol and/or comprises at most 3%, at most 2%, at most 1%, or at most 0.5%, or at most 0.25% or at most 0.1% by weight, glycerol.

Inventive concept 96. The method of any preceding inventive concept, wherein the provided first aqueous ink component is devoid of chelating agents and/or comprises at most 3%, at most 2%, at most 1%, or at most 0.5%, or at most 0.25% or at most 0.1% by weight, chelating agents.

Inventive concept 97. The method of any preceding inventive concept wherein, the provided first aqueous ink component is devoid of starch and/or comprises at most 3%, at most 2%, at most 1%, or at most 0.5%, or at most 0.25% or at most 0.1% by weight starch.

Inventive concept 98. The method of any preceding inventive concept, wherein the provided first aqueous ink component is devoid of water soluble film-forming polymers and/or comprises at most 3%, at most 2%, at most 1%, or at most 0.5%, and more typically at most 0.25% or at most 0.1% by weight, water soluble film-forming polymers.

Inventive concept 99. The method of any preceding inventive concept wherein a dry film glass transition temperature $T_g^{dry\_film}([1^{st}\ component])$ of the provided first ink component is at most 115° C., or at most 110° C., at most 105° C., or at most 100° C., or at most 95° C., or at most 90° C., or at most 85° C., or at most 80° C., or at most 75° C., or at most 70° C., or at most 65° C., or at most 60° C., or at most 65° C.

Inventive concept 100. The method of any preceding inventive concept, wherein a dry ink film dynamic viscosity $\mu_g^{dry\_film}([1^{st}\ component], 115°\ C.)$ of the provided first ink component is at most $1*10^7$ mPa·s or at most $8*10^6$ mPa·s or at most $6*10^6$ mPa·s or at most $4*10^6$ mPa·s.

Inventive concept 101. The method of any preceding inventive concept wherein a dry ink film dynamic viscosity $\mu_g^{dry\_film}([1^{st}\ component], 110°\ C.)$ of the provided first ink component is at most $1*10^7$ mPa·s, or at most $8*10^6$ mPa·s, or at most $6*10^6$ mPa·s or at most $5*10^6$ mPa·s or at most $4*10^6$ mPa·s.

Inventive concept 102. The method of any preceding inventive concept, wherein a dry ink film dynamic viscosity $\mu_g^{dry\_film}([1^{st}\ component], 105°\ C.)$ of the provided first ink component is at most $2*10^7$ mPa·s, at most $1*10^7$ mPa·s, at most $8*10^6$ mPa·s, or at most $6*10^6$ mPa·s.

Inventive concept 103. The method of any preceding inventive concept, wherein a dry ink film dynamic viscosity $\mu_g^{dry\_film}([1^{st}\ component], 100°\ C.)$ of the provided first ink component is at most $2*10^7$ mPa·s, or at most $8*10^6$ mPa·s, or at most $6*10^6$ mPa·s.

Inventive concept 104. The method of any preceding inventive concept, wherein a dry ink film dynamic viscosity $\mu_g^{dry\_film}([1^{st}\ component], 95°\ C.)$ of the provided first ink component is at most $4*10^7$ mPa·s, at most $2*10^7$ mPa·s, at most $1*10^7$ mPa·s, at most $8*10^6$ mPa·s, or at most $6*10^6$ mPa·s.

Inventive concept 105. The method of any preceding inventive concept wherein a dry ink film dynamic viscosity $\mu_g^{dry\_film}([1^{st}\ component], 90°\ C.)$ of the provided first ink component is at most $4*10^7$ mPa·s, at most $2*10^7$ mPa·s, at most $1.2*10^7$ mPa·s, or more typically at most $1*10^7$ mPa·s, at most $8*10^6$ mPa·s, or at most $8*10^6$ mPa·s.

Inventive concept 106. The method of any preceding inventive concept wherein the provided second aqueous ink component comprises at least 40% wt/wt water or at least 45% wt/wt water or at least 50% wt/wt water or at least 55% wt/wt water or at least 60% wt/wt water or at least 65% wt/wt water.

Inventive concept 107. The method of any preceding inventive concept wherein the provided second aqueous ink component comprises at least 6% wt/wt solids, or at least 7% wt/wt solids, or at least 8% wt/wt solids, where the terms 'solids' refers to material that is solid at 60° C.

Inventive concept 108. The method of any preceding inventive concept wherein the provided second aqueous ink component comprises at most 15% wt/wt solids, or at most 14% wt/wt solids, or at most 13% wt/wt solids, or at most 12% wt/wt solid, where the terms 'solids' refers to material that is solid at 60° C.

Inventive concept 109. The method of any preceding inventive concept wherein the provided second aqueous ink component comprises between 7% wt/wt and 13% wt/wt solids.

Inventive concept 110. The method of any preceding inventive concept wherein the provided second aqueous ink component comprises, as a wt % of the second ink component including the aqueous liquid carrier of the second aqueous ink component, at most 3% wt/wt or at most 2.5% wt/wt or at most 2% wt/wt or at most 1.5% wt/wt or at most 1% wt/wt or at most 0.5% wt/wt binder.

Inventive concept 111. The method of any preceding inventive concept, wherein within the provided second aqueous ink component, a ratio between (i) a weight fraction of binder within the second aqueous ink component; and (ii) a weight fraction of pigment within the second aqueous ink component is at most 1.5:1 or at most 1.3:1 or at most 1.2:1 or at most 1.1:1 or at most 0.8:1, or at most 0.6:1, or at most 0.4:1.

Inventive concept 112. The method of any preceding inventive concept wherein within the provided second aqueous ink component is a resoluble ink component.

Inventive concept 113. The method of any preceding inventive concept wherein within the provided second aqueous ink component comprises nanoparticles for example as a primary colorant of the second aqueous ink component.

Inventive concept 114. The method of any preceding inventive concept wherein a dry film glass transition temperature $T_g^{dry\_film}([2^{nd}\ component])$ of the second ink component (i.e. as a pure component) is at least 60° C., or at least 65° C., at least 70° C., or at least 75° C., at least 80° C., or at least 85° C., is at least 90° C., or at least 95° C., or at least 100° C., at least 105° C., or at least 110° C., or at least 115° C.

Inventive concept 115. The method of any preceding inventive concept wherein a dry ink film dynamic viscosity $\mu_g^{dry\text{-}film}$([2nd component], 115° C.) of the provided second component is at least $8*10^6$ mPa·s, at least $1*10^7$ mPa·s, at least $3*10^7$ mPa·s, or at least $6*10^7$ mPa·s.

Inventive concept 116. The method of any preceding inventive concept wherein a dry ink film dynamic viscosity $\mu_g^{dry\text{-}film}$(([2nd component], 110° C.) of the provided second component is at least $1*10^7$ mPa·s, at least $3*10^7$ mPa·s, at least $5*10^7$ mPa·s, or at least $8*10^7$ mPa·s.

Inventive concept 117. The method of any preceding inventive concept wherein a dry ink film dynamic viscosity $\mu_g^{dry\text{-}film}$([2nd component], 105° C.) is at least $1.2*10^7$ mPa·s, at least $3*10^7$ mPa·s, at least $5*10^7$ mPa·s, or at least $1*10^8$ mPa·s.

Inventive concept 118. The method of any preceding inventive concept wherein a dry ink film dynamic viscosity $\mu_g^{dry\text{-}film}$([2nd component], 100° C.) of the provided second component is at least $1.5*10^7$ mPa·s, at least $3*10^7$ mPa·s, at least $7*10^7$ mPa·s, or at least $2*10^8$ mPa·s.

Inventive concept 119. The method of any preceding inventive concept wherein a dry ink film dynamic viscosity $\mu_g^{dry\text{-}film}$([2nd component], 95° C.) of the provided second component is at least $2*10^7$ mPa·s, at least $5*10^7$ mPa·s, at least $1*10^8$ mPa·s, or at least $3*10^8$ mPa·s.

Inventive concept 120. The method of any preceding inventive concept wherein a dry ink film dynamic viscosity $\mu_g^{dry\text{-}film}$([2nd component], 90° C.)) of the provided second component is at least $2*10^7$ mPa·s, at least $4*10^7$ mPa·s, at least $6*10^7$ mPa·s, at least $8*10^7$ mPa·s, at least $1*10^8$ mPa·s, at least $3*10^8$ mPa, or at least $5*10^8$ mPa.

Inventive concept 121. The method of any preceding inventive concept wherein the provided first and second aqueous ink components collectively provide the following property: a ratio between (i) a weight fraction of binder in the first component and (ii) a weight fraction of binder in the second component is at least 1.5, or at least 1.75:1, or at least 2:1, or at least 2.25:1, or at least 2.25:1, or at least 3:1, or at least 4:1 or at least 5:1, or at least 6:1 or at least 7:1, or at least 8:1, or at least 9:1, or at least 10:1, or wherein this ratio is infinite.

Inventive concept 122. The method of any preceding inventive concept wherein the provided first and second aqueous ink components collectively provide the following property: a ratio between (i) a weight fraction of solids in the first component and (ii) a weight fraction of solids in the second component is at least 1.8, at least 2.0, at least 2.2, at least 2.5, or at least 3.0, where the term 'solids' refers to material that is solid at 60° C.

Inventive concept 123. The method of any preceding inventive concept wherein the provided first and second aqueous ink components collectively provide the following property: a difference $T_g^{dry\_film}$([2nd component)−$T_g^{dry\_film}$([1st component]) is at least 0° C., or at least 1° C., or at least 2° C., or at least 3° C., or at least 4° C., or at least 5° C., or at least 6° C., or at least 7° C., or at least 8° C., or at least 9° C., or at least 10° C., or at least 12° C., or at least 15° C.

Inventive concept 124. The method of any preceding inventive concept, wherein the provided first and second aqueous ink components collectively provide the following property: a dry film glass transition temperature $T_g^{dry\_film}$ ([5:1 $2^{nd}$ component:$1^{st}$ component]) of a 5:1 weight-ratio of the first and second components is less than 115° C., or less than 110° C., or less than 105° C., or less than 100° C., or less than 95° C., or less than 90° C., or less than 85° C., or less than 80° C., or less than 75° C., or less than 70° C., or less than 65° C., or less than 60° C., less than 55° C.

Inventive concept 125. The method of any preceding inventive concept wherein the provided first and second aqueous ink components collectively provide the following property: a dry ink film dynamic viscosity $\mu_g^{dry\text{-}film}$([5:1 $2^{nd}$ component:$1^{st}$ component], 115° C.) of a 5:1 weight-ratio of the first and second components) is at most $1*10^7$ mPa·s, or at most $8*10^6$ mPa·s, or at most $6*10^6$ mPa·s, or at most $4*10^6$ mPa·s.

Inventive concept 126. The method of any preceding inventive concept wherein the provided first and second aqueous ink components collectively provide the following property: a dry ink film dynamic viscosity $\mu_g^{dry\text{-}film}$([5:1 $2^{nd}$ component:$1^{st}$ component], 110° C.) of a 5:1 weight-ratio of the first and second components) is at most $1*10^7$ mPa·s, or at most $8*10^6$ mPa·s, or more typically at most $6*10^6$ mPa·s or at most $5*10^6$ mPa·s or at most $4*10^6$ mPa·s.

Inventive concept 127. The method of any preceding inventive concept wherein the provided first and second aqueous ink components collectively provide the following property: a dry ink film dynamic viscosity $\mu_g^{dry\text{-}film}$([5:1 $2^{nd}$ component:$1^{st}$ component], 105° C.) of a 5:1 weight-ratio of the first and second components is at most $2*10^7$ mPa·s, at most $1*10^7$ mPa·s, at most $8*10^6$ mPa·s, or at most $6*10^6$ mPa·s.

Inventive concept 128. The method of any preceding inventive concept, wherein the provided first and second aqueous ink components collectively provide the following property: a dry ink film dynamic viscosity $\mu_g^{dry\text{-}film}$([5:1 $2^{nd}$ component:$1^{st}$ component], 100° C.) of a 5:1 weight-ratio of the first and second components) is at most $2*10^7$ mPa·s, at most $1*10^7$ mPa·s, at most $8*10^6$ mPa·s, or at most $6*10^6$ mPa·s.

Inventive concept 129. The method of any preceding inventive concept, wherein the provided first and second aqueous ink components collectively provide the following property: a dry ink film dynamic viscosity $\mu_g^{dry\text{-}film}$([5:1 $2^{nd}$ component:$1^{st}$ component], 95° C.) of a 5:1 weight-ratio of the first and second is at most $2*10^7$ mPa·s, at most $1*10^7$ mPa·s, or at most $8*10^6$ mPa·s, or at most $6*10^6$ mPa·s.

Inventive concept 130. The method of any preceding inventive concept, wherein the provided first and second aqueous ink components collectively provide the following property: a dry ink film dynamic viscosity $\mu_g^{dry\text{-}film}$([5:1 $2^{nd}$ component:$1^{st}$ component], 90° C.) of a 5:1 weight-ratio of the first and second components is at most $1*10^7$ mPa·s, at most $1.2**10^7$ mPa·s or more typically at most $1*10^7$ mPa·s, or at most $8*10^6$ mPa·s.

Inventive concept 131. The method of any preceding inventive concept, wherein immediately upon application of the covering wet volume of the first component to the ITM surface, a thickness of the covering wet volume is at least 6 μm or at least 8 μm or at least 10 μm or at least 12 μm.

Inventive concept 132. The method of any preceding inventive concept, wherein immediately upon application of the covering wet volume of the first component to the ITM surface, a thickness of the covering wet volume is at least 8 μm or at least 10 μm or at least 12 μm.

Inventive concept 133. The method of any preceding inventive concept, wherein the first ink component is delivered to the ITM surface when the ITM surface is in-motion at a velocity of at least 1 meters/second or at least 1.5 meters/second or at least 2 meters/second.

Inventive concept 134. The method of any preceding inventive concept, wherein the droplets of the second ink component are deposited to onto the partially-dried layer of the first component when the ITM surface is in-motion at a velocity of at least 1 meters/second or at least 1.5 meters/second or at least 2 meters/second.

Inventive concept 135. The method of any preceding inventive concept, wherein the method is performed so that a ratio between (i) a thickness of a partially-dried layer of the first component when the droplets of the second aqueous ink component impact the partially-dried layer of the first ink component in step (d) and (ii) a thickness of the covering wet volume of the first component immediately upon application of the covering wet volume of the first component on the ITM surface is at most 0.6 or at most 0.5 or at most 0.4.

Inventive concept 136. The method of any preceding inventive concept, wherein the method is performed so that a ratio between (i) a thickness of a partially-dried layer of the first component when the droplets of the second aqueous ink component impact the partially-dried layer of the first ink component in step (d) and (ii) a thickness of the covering wet volume of the first component immediately upon application of the covering wet volume of the first component on the ITM surface is at least 0.25 or at least 0.3 or at least 0.35.

Inventive concept 137. The method of any preceding inventive concept wherein within the provided second aqueous ink component comprises nanoparticles as a primary colorant of the second aqueous ink component.

Inventive concept 138. The method of any preceding inventive concept, wherein immediately before impact between the droplets of the second ink component and the layer of the first ink component, a thickness of the layer of first ink component is at least 1 mm or at least 1.5 μm or at least 2 μm or at least 3 μm or at least 4 μm.

Inventive concept 139. The method of any preceding inventive concept, wherein the transfer temperature $T_{TRANSFER}$ is at least 60° C., or at least 65° C., at least 70° C., or at least 75° C., at least 80° C., or at least 85° C., or at least 90° C., or at least 95° C., or at least 100° C., or at least 105° C., or at least 110° C., or at least 115° C.

Inventive concept 140. The method of any preceding inventive concept, wherein the transfer temperature $T_{TRANSFER}$ is at most 65° C., or at most 70° C., or at most 75° C., or at most 80° C., or at most 85° C., or at most 90° C., or at most 95° C., or at most 100° C., or at most 105° C., or at most 110° C., or at most 115° C.

Inventive concept 141. The method of any preceding inventive concept, wherein the transfer temperature $T_{TRANSFER}$ is at least 60° C. and at most 115° C.

Inventive concept 142. The method of any one of inventive concepts 1-138, wherein the transfer temperature $T_{TRANSFER}$ is between 65° C. and 70° C.

Inventive concept 143. The method of any one of inventive concepts 1-138, wherein the transfer temperature $T_{TRANSFER}$ is between 70° C. and 75° C.

Inventive concept 144. The method of any one of inventive concepts 1-138, wherein the transfer temperature $T_{TRANSFER}$ is between 75° C. and 80° C.

Inventive concept 145. The method of any one of inventive concepts 1-138, wherein the transfer temperature $T_{TRANSFER}$ is between 80° C. and 85° C.

Inventive concept 146. The method of any one of inventive concepts 1-138, wherein the transfer temperature $T_{TRANSFER}$ is between 85° C. and 90° C.

Inventive concept 147. The method of any one of inventive concepts 1-138, wherein the transfer temperature $T_{TRANSFER}$ is between 90° C. and 95° C.

Inventive concept 148. The method of any one of inventive concepts 1-138, wherein the transfer temperature $T_{TRANSFER}$ is between 90° C. and 100° C.

Inventive concept 149. The method of any one of inventive concepts 1-138, wherein the transfer temperature $T_{TRANSFER}$ is between 95° C. and 100° C.

Inventive concept 150. The method of any one of inventive concepts 1-138, wherein the transfer temperature $T_{TRANSFER}$ is between 95° C. and 105° C.

Inventive concept 151. The method of any one of inventive concepts 1-138, wherein the transfer temperature $T_{TRANSFER}$ is between 100° C. and 105° C.

Inventive concept 152. The method of any one of inventive concepts 1-138, wherein the transfer temperature $T_{TRANSFER}$ is between 100° C. and 110° C.

Inventive concept 153. The method of any one of inventive concepts 1-138, wherein the transfer temperature $T_{TRANSFER}$ is between 105° C. and 110° C.

Inventive concept 154. The method of any one of inventive concepts 1-138, wherein the transfer temperature $T_{TRANSFER}$ is between 105° C. and 115° C.

Inventive concept 155. The method of any one of inventive concepts 1-138, wherein the transfer temperature $T_{TRANSFER}$ is between 110° C. and 115° C.

Inventive concept 156. The method of any one of inventive concepts 1-138, wherein the transfer temperature $T_{TRANSFER}$ is above 115° C.

Inventive concept 157. The method of any one of inventive concepts 1-138, wherein a dry film glass transition temperature $T_g^{dry\_film}([2^{nd}\ component])$ of the second ink component exceeds by P° C. the transfer temperature $T_{TRANSFER}$; and a dry film glass transition temperature $T_g^{dry\_film}([5:1\ 2^{nd}\ component:1^{st}\ component])$ of a 5:1 weight-ratio of the first and second components is less than the transfer temperature $T_{TRANSFER}$, by Q° C.

Inventive concept 158. The method of inventive concept 157 wherein a value of P is at least 5, or at least 10, or at least 12, or at least 15, or at least 20 or at least 30, or at least 40.

Inventive concept 159. The method of any one of inventive concepts 157-158 wherein a value of Q is at least 5, or at least 10, or at least 12, or at least 15, or at least 20 or at least 30, or at least 40.

Inventive concept 160. The method of any preceding inventive concept, wherein during step (d), the layer of the first component blocks the colorant particles of the second component from directly contacting the ITM surface so that, at a time of the transfer, a colorant-particle-free layer is present on the ITM surface below the colorant particles of the second component.

Inventive concept 161. The method of any preceding inventive concept, wherein during step (d) and while the layer of first component comprises at least 10% wt/wt water or at least 20% wt/wt water, the layer of the first component blocks the colorant particles of the second component from directly contacting the ITM surface so that, at a time of the transfer, a colorant-particle-free layer is present on the ITM surface below the colorant particles of the second component.

Inventive concept 162. A digital printing system comprising:
 a. a rotatable intermediate transfer member (ITM);
 b. drying apparatus for effecting heating material disposed on the ITM;
 c. respective reservoirs of first and second aqueous ink components, the first aqueous ink component optionally being transparent, the second aqueous ink component comprising colorant particles;

d. a first liquid delivery station at which the first reservoir is disposed, the first liquid delivery station being configured to deliver a quantity of the first ink component to a target surface of the ITM, to cover a portion of the target surface with a wet volume of the first ink component; and e. a second liquid delivery station at which the second reservoir is disposed, the second liquid delivery station configured to digitally deposit droplets of the second ink component onto the volume of the first ink component after downstream transport on the rotatable ITM, to form a wet, colored ink-image, wherein the system is controlled so that:
  i. the wet volume of the first ink component is only partial dried after covering the portion of the surface and before impact thereon of the droplets of the second ink component at the second liquid delivery station so that, the first ink component is sufficiently moist and permeable such that some or all the colorant particles of the second ink component penetrate into the partially-dried layer of the first ink component;
  ii. after formation of the ink-image at the second liquid delivery station, the ink-image is at least partially dried to produce a dried, tacky ink film, and wherein the system further comprises a transfer station at which the dried ink film is transferred from the ITM to a printing substrate.

Inventive concept 163. A digital printing system comprising:
a. a rotatable intermediate transfer member (ITM);
b. drying apparatus for effecting heating material disposed on the ITM;
c. respective reservoirs of first and second aqueous ink components, the first aqueous ink component optionally being transparent, the second aqueous ink component comprising colorant particles;
d. a first liquid delivery station at which the first reservoir is disposed, the first liquid delivery station being configured to deliver a quantity of the first ink component to a target surface of the ITM, to cover a portion of the target surface with a wet volume of the first ink component; and
e. a second liquid delivery station at which the second reservoir is disposed, the second liquid delivery station configured to digitally deposit droplets of the second ink component onto the volume of the first ink component after downstream transport on the rotatable ITM, to form a wet, colored ink-image, wherein the system is controlled so that:
  i. the wet volume of the first ink component is only partial dried after covering the portion of the surface and before impact thereon of the droplets of the second ink component at the second liquid delivery station so that, upon impact, the first ink component is sufficiently moist and permeable such that some or all the colorant particles of the second ink component penetrate into the partially-dried layer of the first ink component; and
  ii. the wet, colored image is at least partially dried on the ITM by the drying apparatus;

wherein the system further comprises a transfer station at which the at least partially dried ink-image is transferred from the ITM to printing substrate.

Inventive concept 164. The system of any one of inventive concepts 162-163 wherein the drying apparatus is a heating-drying apparatus for effecting both heating and drying of material disposed on the ITM.

Inventive concept 165. The system of inventive concept 164 wherein the heating-drying apparatus sufficiently heats the partially dried ink-image so that it is tacky upon transfer from the ITM to the substrate at the transfer station.

Inventive concept 166. The system of any of inventive concepts 162-165 wherein (i) the system is controlled so that the at least partial drying produces a dried, tacky ink-image-bearing residue film; and (ii) the dried, tacky ink-image-bearing residue film is transferred from the ITM to the printing substrate at the transfer station.

Inventive concept 167. The system of any one of inventive concepts 86-162-166 wherein:
  i. the first liquid delivery station comprises a first print-bar array of one or more print bar(s), the first print-bar array configured to deliver at least a portion of the quantity of the first liquid ink component to the target surface of the ITM by droplet deposition;
  ii. the second liquid delivery station comprises a second print-bar array of one or more print bar(s) located downstream of the first print print-bar array, the second print-bar array configured to at digitally deposit at least some of the droplets of the second ink component.

Inventive concept 168. The system of any one of inventive concepts—162-166 wherein a series of print-bars are disposed over the ITM such that:
  i. a first print-bar of the series of print-bars belongs to the first liquid delivery station and deposits the quantity of the first liquid component to the target surface by droplet deposition;
  ii. all other print-bars of the series of print-bars collectively belong to the second liquid Inventive concept 169. The system of any one of inventive concepts 162-168, wherein the first liquid delivery station comprises one or more ink-jet print heads.

Inventive concept 170. The system of any one of inventive concepts 162-169, wherein the first liquid delivery station comprises at least one of (i.e. any combination of) a coater, spray assembly, a bath assembly, a thinning assembly and a doctor blade.

EXAMPLES

Reference is now made to the following examples, which together with the above descriptions, illustrate the invention in a non-limiting fashion.

List of Materials Used:

| Ingredient | Supplier | Function | Chemical Name/Description | |
|---|---|---|---|---|
| Joncryl ® 90 | BASF | binder | Manufacturer Description: styrene-acrylic copolymer emulsion, 44% solids | |
| | | | MW | >200,000 |
| | | | Tg | 110° C. (DSC) |
| | | | $T_{MFFT}$ | >85° C. |

-continued

| Ingredient | Supplier | Function | Chemical Name/Description |
|---|---|---|---|
| Joncryl ® 538 | BASF | binder | Manufacturer Description: acrylic polymer emulsion, 46.5% solids<br>MW >200,000<br>Tg 64° C. (DSC)<br>$T_{MFFT}$ 60° C. |
| Joncryl ® 8085 | BASF | binder | Styrene-acrylic copolymer emulsion, 42.5% solids<br>Tg 57° C. |
| Tween ® 20 | Sigma-Aldrich | Plasticizing agent | PEG-20 sorbitan monolaurate |
| Tween ® 40 | Sigma-Aldrich | Plasticizing agent | PEG-20 sorbitan monopalmitate |
| Tween ® 65 | Sigma-Aldrich | Plasticizing agent | PEG-20 sorbitan tristearate |
| Tween ® 80 | Sigma-Aldrich | Plasticizing agent | PEG-20 sorbitan monooleate |
| Tween ® 60 | Sigma-Aldrich | Plasticizing agent | PEG-20 sorbitan monolstearate |
| Tego ® Wet 240 | Evonik | surfactant | Polyether siloxane copolymer |
| Tego ® Twin 4100 | Evonik | surfactant | Siloxane-based gemini surfactant |
| Byk ® 333 | BYK ® | Surface energy modifier | Polyether-modified polydimethylsiloxane |
| AMP95 ® | Angus | pH modifier | 2-Amino-2-methyl-1-propanol |
| Mogul ® L | Cabot | colorant | Black pigment |
| Triethanolamine (TEA) | Sigma-Aldrich | pH modifier | |
| Joncryl ® 142 | BASF | thickener | Acrylic colloidal emulsion 40% solids |
| Acrysol ® RM-2020E | Dow | Non-ionic urethane rheology modifier | Hydrophobically modified polyethylene oxide urethane<br>20% solids<br>Viscosity: 2500-3800 mPa · s |
| Rheovis ® PE1330 | BASF | Non-ionic urethane rheology modifier | 30% solids<br>Viscosity: 4500 mPa · s at 23° C. |
| Rheovis ® AS1125 | BASF | Rheology modifier (Acrylic thickener) | 25% solids<br>Viscosity equal to or less than 1300 mPa · s at 23° C. |
| Ganex ® P-904 LC | Ashland | Rheology modifier | alkylated polyvinyl pyrrolidones |
| Basacid ® Blau 762 | BASF | Colorant | Blue Dye<br>~20% dye |
| Efka ®4585 | BASF | Dispersing agent | Acrylic block copolymer<br>50% solids |
| Tego ®280 | Evonik | Substrate wetting and anti-cratering additive | Polyether siloxane polymer |
| Joncryl ®8078 | BASF | binder | Acrylic resin solution, 32% solids<br>Tg = 101° C. |
| Byk ® 024 | BYK ® | Defoamer | Polysiloxanes and hydrophobic solids in polyglycol |
| DMEA | Sigma-Aldrich | pH modifier | Dimethyl-ethanolamine |

Release Layer:

| Ingredient | Supplier | CAS Number | Description |
|---|---|---|---|
| DMS-V35 Resin | Gelest | 68083-19-2 | Vinyl terminated polydimethyl siloxane<br>Viscosity 5,000 mPa · s<br>MW ~49,500<br>Vinyl ~0.018-0.05 mmol/g |
| VQM-146 Resin | Gelest | 68584-83-8 | 20-25% Vinyl resin in DMS V46<br>Viscosity 50,000-60,000 mPa · s<br>Vinyl ~0.18-0.23 mmol/g |
| Inhibitor 600 Cure Retardant | Evonik | 204-070-5 | Mix of divinylpolydimethylsiloxane and 2-methylbut-3-yn-2-ol<br>Viscosity 900 mPa · s<br>Vinyl 0.11 mmol/g |
| SIP6831.2 Catalyst | Gelest | 68478-92-2 | Platinum divinyltetramethyldisiloxane<br>Platinum 2.1-2.4% |

| Ingredient | Supplier | CAS Number | Description | |
|---|---|---|---|---|
| Polymer RV 5000 (XPRV 5000) Resin | Evonik | | Vinyl-functional polydimethyl siloxanes | |
| | | | Viscosity | 3000 mPa · s |
| | | | Vinyl | 0.4 mmol/g |
| Crosslinker 100 Crosslinker | Evonik | | Polydimethyl siloxanes including SiH groups in the polymer chain | |
| | | | Hydride | 7.8 mmol/g |
| HMS-301 Crosslinker | Gelest | 68037-59-2 | Poly(dimethylsiloxane-co-methyl-hydrosiloxane), trimethylsilyl terminated | |
| | | | Hydride | 4.2 mmol/g |
| Silsurf A010-D-UP Additive | Siltech | 134180-76-0 | polyether siloxane copolymer | |
| SilGrip SR 545 Functional MQ resin | Momentive | 56275-01-5 | Silicone-based resin containing "MQ" groups | |
| | | | Viscosity | 11 mPa · s |
| Skyroll SH 92 | SKC Inc. | NR | Anti-static polyester film | |
| Skyroll SH 76 | SKC Inc. | NR | Untreated polyester film | |

Example 1

Preparation of $1^{st}$ Ink Component

The water, humectant, and any pH modifier were added and stirred in a mixing vessel. Mixing was continued as the other components were added. Any plasticizer was then added, followed by the binder/resin, followed by the surfactants.

Example 2

An exemplary $1^{st}$ ink component of the present invention had the following composition (all figures provided in weight-percent):
40% Joncryl® 538
5% Tween® 80
3.3% Tego® Wet 240
0.3% wt Byk-333
0.2% AMP 95®
8% propylene glycol
Balance: water
The composition was formulated according to the procedure provided in EXAMPLE 1. The pH was 8.0.

Example 3

Another exemplary $1^{st}$ ink component of the present invention had the following composition:
15% Joncryl® 538
2% Tween® 40
2.5% Tego® Wet 240
0.3% wt Bykc®-333
0.2% AMP 95®
32.5% propylene glycol
Balance: water
The composition was formulated according to the procedure provided in EXAMPLE 1.

Example 4

Another exemplary $1^{st}$ ink component of the present invention had the following composition:
40% Joncryl® 538
3.5% Tween® 60
3.5% Tego® Twin 4100
0.2% AMP 95® ®
8.1% propylene glycol
Balance: water
The composition was formulated according to the procedure provided in EXAMPLE 1.

Example 4A

Another exemplary $1^{st}$ ink component had the following composition:
22% Joncryl® 90
12.2% Joncryl® 8085
3.5% Tween® 20
2.5% Tego® Wet 240
0.2% AMP 95®
18% propylene glycol
Balance: water
The composition was formulated according to the procedure provided in EXAMPLE 1.

Example 4B

Another exemplary $1^{st}$ ink component had the following composition:
10% Joncryl® 90
22% Joncryl® 8085
3.5% Tween® 60
2.5% Tego® Wet 240
0.2% AMP 95®
18% propylene glycol
Balance: water
The composition was formulated according to the procedure provided in EXAMPLE 1. The pH was 7.9.

Example 5

Preparation of $2^{nd}$ Ink Component

A pigment concentrate, containing pigment, water and dispersant, is dispersed using a high shear mixer. The product obtained is then milled in a bead mill. The progress of the milling was monitored and controlled on the basis of particle size measurements (for example, Malvern® and Nanosizer® instruments). The milling was curtailed when the average particle size (d50) reached 70 to 100 nm.

Example 6

Dynamic Viscosity Measurements

The viscosity of the ink components described herein were measured at 25° C. using a viscometer (DV II+Pro by Brookfield). Viscosities were typically in the range of about 2 mPa·s to 100 mPa·s.

Example 7

Surface Tension Measurements

The surface tension of the ink components was measured using a standard liquid tensiometer (EasyDyne by Krüss) and was generally in the range of approximately 20 to 40 mN/m.

Example 8

Opacity Measurement Procedure

The opacity of the $1^{st}$ ink component was measured using an i1Pro spectrophotometer manufactured by X-Rite. The measurements were made on a Form 2A Opacity card manufactured by Leneta Company, Inc.

The opacity (by contrast ratio measurement) of each ink sample was determined according to the formula:

$$Opacity = Yb*100/Yw$$

wherein:
Yb is the measurement on the black half on the card, and
Yw is the measurement on the white half on the card;
and wherein Yb and Yw are each the average of 3 measurements at different places on the respective area. The lower the opacity, the higher the transparency.
The evaluation is generally performed in accordance with International Standard ISO 6504-3; the samples were jetted onto an ITM and the dry film was then transferred to the Leneta opacity card.

Example 9

Opacity Results

In the absence of a clear layer, the "reference" opacity card yields an opacity of approximately 0.87.

For transparent layers of the present invention disposed on top of the opacity card, the opacity ranged from 0.87 to 1.17. More generally, the opacity of transparent layers of the present invention disposed on top of the opacity card falls within a range of 0.87 to 4, 0.87 to 3, 0.87 to 2.5, 0.87 to 2, 0.87 to 1.5, 0.87 to 1.2, 0.9 to 4, 0.9 to 3, 0.9 to 2.5, 0.9 to 1.5, or 0.9 to 1.2.

Example 10

A millbase containing black pigment in a dispersant, formulated according to the method of EXAMPLE 5, had the following composition:

| Millbase Component | % wt. |
| --- | --- |
| Deionized water | 50.0% |
| Bykjet ® 9152 | 25.0% |
| Mogul ® L | 25.0% |

Example 11

An exemplary $2^{nd}$ ink component of the present invention, formulated in accordance with the procedure provided in EXAMPLE 5, and utilizing the millbase from EXAMPLE 10, had the following composition:

| Ink Component | Wt. % |
| --- | --- |
| Water | 36.2 |
| TEA | 0.3 |
| Propylene Glycol | 45.0 |
| Glycerin | 6.0 |
| Black Millbase | 12.0 |
| Tego ® Wet 240 | 0.5 |

The total non-volatile content was 12.5%. The ink had the following measured properties:

| Parameter | Measured Result |
| --- | --- |
| pHpH | 9.5 |
| Surface Tension (mN/m) | 26 |
| Viscosity (mPa · s) | 6.5 |

Example 12

Another exemplary $2^{nd}$ ink component of the present invention, formulated in accordance with the procedure provided in EXAMPLE 5, and utilizing the millbase from EXAMPLE 10, had the following composition:

| Component | Wt. % |
| --- | --- |
| AMP 95 ® | 0.5 |
| Propylene Glycol | 23.0 |
| 1,2-Hexanediol | 3.0 |
| Sorbitol | 3.0 |
| Joncryl ®142 E (40% NVS) | 3.8 |
| Black Millbase | 12.0 |
| Tego ® Wet 240 | 1.0 |
| Water | Balance |

The total non-volatile content was 11.5%. The ink had the following measured properties:

| Parameter | Measured Result |
| --- | --- |
| pH | 9.2 |
| Surface Tension (mN/m) | 25.2 |
| Viscosity (mPa · s) | 7 |

Example 12A

A millbase containing black pigment in a dispersant, formulated according to the method of EXAMPLE 5, had the following composition:

| Millbase Component | % wt. |
|---|---|
| Deionized water | 45% |
| Efka ® 4585 | 30% |
| Mogul ® L | 25% |

The solids content was approximately 40%, by weight.

Examples 13-20

Exemplary 2$^{nd}$ ink components of the present invention, formulated in accordance with the procedure provided in EXAMPLE 5, and utilizing the millbase from EXAMPLE 12A, had the following compositions:

| Ink Component -- EXAMPLE 13 | Wt. % |
|---|---|
| AMP95 | 0.6 |
| Propylene Glycol | 23.0 |
| Tween ® 20 | 3.0 |
| Joncryl ® 142 | 3.75 |
| Mogul ® L | 3.0 |
| Efka ® 4585 | 3.6 |
| Tego ® Wet 240 | 0.5 |
| Tego ® Wet 280 | 0.5 |
| Water | Balance |
| Non-Volatile Solids | 10.3% |

| Ink Component -- EXAMPLE 14 | Wt. % |
|---|---|
| AMP 95 ® | 0.6 |
| Propylene Glycol | 24.0 |
| Tween ® 20 | 3.0 |
| Mogul ® L | 3.0 |
| Efka ® 4585 | 3.6 |
| Tego ® Wet 240 | 0.5 |
| Tego ® Wet 280 | 0.5 |
| Water | Balance |
| Non-Volatile Solids | 8.8% |

| Ink Component -- EXAMPLE 15 | Wt. % |
|---|---|
| AMP 95 ® | 0.2 |
| Propylene Glycol | 20.0 |
| Tween ® 20 | 3.0 |
| Acrysol ® 2020E | 4.0 |
| Mogul ® L | 3.0 |
| Efka ® 4585 | 3.6 |
| Tego ® Wet 240 | 0.5 |
| Tego ® Wet 280 | 0.5 |
| Water | Balance |
| Non-Volatile Solids | 9.6% |

| Ink Component -- EXAMPLE 16 | Wt. % |
|---|---|
| AMP 95 ® | 0.2 |
| Propylene Glycol | 20.0 |
| Tween ® 20 | 3.0 |
| Rheovis ® AS1125 | 0.8 |
| Mogul ® L | 3.0 |
| Efka ® 4585 | 1.8 |
| Tego ® Wet 240 | 0.5 |
| Tego ® Wet 280 | 0.5 |
| Water | Balance |
| Non-Volatile Solids | 9.0% |

This formulation exhibited poor stability, which may be attributable to the presence of Rheovis® AS1125.

| Ink Component -- EXAMPLE 17 | Wt. % |
|---|---|
| AMP 95 ® | 0.2 |
| Propylene Glycol | 20.0 |
| Tween ® 20 | 3.0 |
| Rheovis ® PE1330 | 2.67 |
| Mogul ® L | 3.0 |
| Efka ® 4585 | 3.6 |
| Tego ® Wet 240 | 0.5 |
| Tego ® Wet 280 | 0.5 |
| Water | Balance |
| Non-Volatile Solids | 9.6% |

| Ink Component -- EXAMPLE 18 | Wt. % |
|---|---|
| AMP 95 ® | 0.5 |
| Propylene Glycol | 22.4 |
| Tween ® 20 | 3.0 |
| Rheovis ® AS1125 | 0.16 |
| Joncryl ® 142 | 3.0 |
| Mogul ® L | 3.0 |
| Efka ® 4585 | 3.6 |
| Tego ® Wet 240 | 0.5 |
| Tego ® Wet 280 | 0.5 |
| Water | Balance |
| Non-Volatile Solids | 10.04% |

This formulation exhibited poor stability, which may be attributable to the presence of Rheovis® AS1125.

| Ink Component -- EXAMPLE 19 | Wt. % |
|---|---|
| AMP 95 ® | 0.2 |
| Propylene Glycol | 23.0 |
| Tween ® 20 | 3.0 |
| Ganex ® P904LC | 2.0 |
| Mogul ® L | 3.0 |
| Efka ® 4585 | 3.6 |
| Tego ® Wet 240 | 0.5 |
| Tego ® Wet 280 | 0.5 |
| Water | Balance |
| Non-Volatile Solids | 10.8% |

| Ink Component -- EXAMPLE 20 | Wt. % |
|---|---|
| Triethanolamine | 0.1 |
| Propylene Glycol | 46.0 |
| Glycerin | 6.0 |
| Basacid ® Blau 762 | 12.5 |
| Tego ® Wet 240 | 0.1 |
| Water | Balance |

Example 20A

A millbase containing blue pigment in a dispersant, formulated according to the method of EXAMPLE 5, had the following composition:

| Millbase Component | % wt. |
|---|---|
| Deionized water | 40% |
| Efka ® 4585 | 35% |
| PV FAST BLUE BG-NIP | 25% |

The solids content was approximately 42.5%, by weight.

Example 21

Exemplary $2^{nd}$ ink components of the present invention, formulated in accordance with the procedure provided in EXAMPLE 5, and utilizing the millbase from EXAMPLE 12A, had the following compositions:

| Ink Component | Wt. % |
| --- | --- |
| AMP 95 ® | 0.30 |
| Propylene Glycol | 24.34 |
| Xylitol | 3.3 |
| Joncryl 8078 | 4.69 |
| MILLBASE EXAMPLE 20A | 7.60 |
| Efka ® 4585 | 4.0 |
| Tego ® Twin 4100 | 0.6 |
| Water | Balance |

Example 22

The viscosity of various exemplary $1^{st}$ ink components, measured at 25° C., is provided below (all values in mPa·s):
Example 2=6.5
Example 3=6.3
Example 4A=5.4
Example 4B=6.5

Example 23

The surface tension of the following exemplary $1^{st}$ ink components, measured at 25° C., is provided below (all values in mN/m):
Example 2=25.3
Example 4B=23.3
More generally, the surface tension of the $1^{st}$ ink component of the present invention, measured at 25° C., lies within the range of 20-35 mN/m, 20-32 mN/m, 22-28 mN/m, or 22-26 mN/m.

Example 24

Ink Drying Procedure 20 grams of sample were placed in 2 aluminum dishes (90 mm diameter). The dishes were placed in an oven set to 90° C., and dried for 48 hours minimum. The dishes were weighed after 24 and 48 hours. If the weights differed by more than 1%, an additional 24 hours heating was performed, and the dishes weighed again. This was repeated until the up to 1% weight differential criterion was met. With respect to the samples provided herein, none required more than 48 hours heating.

Example 25

Resolubility Characterization

Resolubility was determined as follows: 1 gram of ink was placed in a polypropylene beaker having a capacity of about 100 ml, and dried in an oven at 40° C. for 24 hours. Subsequently, 2 grams of fresh ink were introduced to the beaker, and the contents were mixed by swirling by hand for up to ten minutes. If no film residue remained on the bottom of the beaker, and/or the mixture passed through a 0.7 GF syringe filter without clogging, the ink is considered to be resoluble.

Example 26

Resolubility Results

The $2^{nd}$ ink components of EXAMPLES 14, 15, 17, 18, and 20 were evaluated for resolubility according to the procedure provided in EXAMPLE 25. No film residue remained on the bottom of the beaker, and the mixture passed through the syringe filter without clogging. Thus, all of these examples exhibited resolubility.

Examples 27-28

A 1:1 (wt.-wt.) mixture ("EXAMPLE 27") of the 1st ink component of EXAMPLE 2 and the $2^{nd}$ ink component of EXAMPLE 21 was prepared by mixing at room temperature. Similarly, a 2.5:1 (wt.-wt.) mixture was prepared ("EXAMPLE 28").

Example 29

Measurement of Glass Transition Temperature

Samples were placed in a Q2000 Differential Scanning calorimeter (TA Instruments) and DSC measurements were carried out. The DSC was first operated in a modulated operation mode, in order to detect any presence of minor Tg peaks. This mode had a temperature amplitude of 1.27° C., a period of 60 seconds, and a heating rate of 2° C. per minute. In the modulated operation, no such small peaks were observed. This allowed a more relaxed procedure ("standard mode of operation"), without modulation, and having a scanning rate of 8° C. per minute.

The samples were first heated to and maintained at 120° C. for 60 seconds to allow thermal equilibration, prior to initiating the scanning mode.

Examples 30-33: Glass Transition Temperature Results

Example 30

The Glass Transition Temperature (Tg) of a dried residue of the cyan-pigmented $2^{nd}$ ink component of EXAMPLE 21 was evaluated according to the procedure of EXAMPLE 29. The residue was obtained according to the drying procedure of EXAMPLE 24. No Tg was observed up to a temperature of about 120° C., only a melting point.

Examples 31-33

Following the drying procedure of EXAMPLE 24, the Tg of the $1^{st}$ ink component of EXAMPLE 2, as well as the mixtures of EXAMPLES 27-28, were evaluated according to the procedure of EXAMPLE 29. The three samples exhibited similar Glass Transition Temperatures—Tg=56±2° C. Thus, the softness and transferability of the $2^{nd}$ ink component of EXAMPLE 21 was appreciably enhanced by mixing in a 2.5:1 and even a 1:1 weight ratio of the 1$^{st}$ ink component of EXAMPLE 2.

Example 34

Thermo-Rheological Characterization of Dry Ink Films

Viscosity characterization of dry ink films were performed, as a function of temperature, using a Discovery HR-2 rheometer (TA Instruments). Following the drying procedure of EXAMPLE 24, a strain sweep of the dry ink films was first performed at a frequency of 1 Hz, to demonstrate that the behavior of the materials being characterized was well within the linear visco-elastic range. Consequently, subsequent viscosity characterizations were performed at 1 Hz.

Initially, the dried ink residue was heated to 120° C., after which any excess material was removed. After maintaining the temperature at 120° C. for 60 seconds, the viscosity was measured twice (at a 60-second interval), and the temperature was then reduced to 90° C. and maintained for 60 seconds. The viscosity was measured twice (at a 60-second interval) at 90° C., and the temperature was then reduced to 70° C. and maintained for 60 seconds. Following two viscosity measurements at 70° C. (at a 60-second interval), the temperature was reduced to 50° C., and after maintaining for 60 seconds, the two final viscosity measurements were performed at 50° C. (at a 60-second interval). The viscosity results were obtained by averaging each of the two measurements.

Examples 35-38

Thermo-Rheological Characterization—Results

Using the procedure of EXAMPLE 34, the 1$^{st}$ ink component of EXAMPLE 2, the cyan-pigmented 2$^{nd}$ ink component of EXAMPLE 21, and the mixtures of EXAMPLES 27-28, were subjected to thermo-rheological characterization. The viscosity results are provided in the following table:

| Sample | Viscosity [mPa · s] vs. Temp | | | |
| --- | --- | --- | --- | --- |
| | 120° C. | 90° C. | 70° C. | 50° C. |
| EXAMPLE 2 | 3.04E+06 | 7.48E+06 | 1.77E+07 | 5.35E+08 |
| EXAMPLE 21 | 1.12E+07 | 4.09E+07 | 4.50E+07 | 4.60E+07 |
| EXAMPLE 27 | 2.38E+06 | 7.02E+06 | 2.34E+07 | 6.23E+08 |
| EXAMPLE 28 | 2.15E+06 | 5.55E+06 | 1.78E+07 | 3.64E+08 |

Example 39

The ITM release layer of EXAMPLE 39 had the following composition (wt./wt.):

| Name | Parts |
| --- | --- |
| DMS-V35 | 70 |
| XPRV-5000 | 30 |
| VQM-146 | 40 |
| Inhibitor 600 | 5 |
| SIP6831.2 | 0.1 |
| Crosslinker HMS-301 | 12 |

The release layer was prepared substantially as described in the following preparation procedure, provided below.

Blanket Preparation Procedure (for Release Layers Cured Against a Carrier Surface)

All components of the release layer formulation were thoroughly mixed together. The desired thickness of the incipient release layer was coated on a PET sheet, using a rod/knife (other coating methods may also be used), followed by curing for 3 minutes at 150° C. Subsequently, Siloprene LSR 2530 was coated on top of the release layer, using a knife, to achieve a desired thickness. Curing was then performed at 150° C. for 3 minutes. An additional layer of Siloprene LSR 2530 was then coated on top of the previous (cured) silicone layer, and fiberglass fabric was incorporated into this wet, fresh layer such that wet silicone penetrated into the fabric structure. Curing was then performed at 150° C. for 3 minutes. A final layer of Siloprene LSR 2530 was then coated onto the fiberglass fabric and, once again, curing was performed at 150° C. for 3 minutes. The integral blanket structure was then cooled to room temperature and the PET was removed.

Example 40

The ITM release layer of EXAMPLE 40 has the following composition:

| Component Name | Parts |
| --- | --- |
| DMS-V35 | 70 |
| XPRV-5000 | 30 |
| VQM-146 | 40 |
| Inhibitor 600 | 5 |
| SIP6831.2 | 0.1 |
| Crosslinker HMS-301 | 12 |
| Silsurf A010-D-UP | 5 |

The blanket was prepared substantially as described in Example 39.

Example 41

The ITM release layer of Example 41 has the following composition:

| Component Name | Parts |
| --- | --- |
| DMS-V35 | 70 |
| XPRV-5000 | 30 |
| VQM-146 | 40 |
| Inhibitor 600 | 5 |
| SIP6831.2 | 0.1 |
| Crosslinker 100 | 6.5 |
| Silsurf A010-D-UP | 5 |

The blanket was prepared substantially as described in Example 39.

Example 42

The ITM release layer of EXAMPLE 42 has the following composition:

| Component Name | Parts |
| --- | --- |
| DMS-V35 | 100 |
| VQM-146 | 40 |
| Inhibitor 600 | 3 |
| SIP6831.2 | 0.1 |
| Crosslinker HMS-301 | 5 |

The blanket was prepared substantially as described in EXAMPLE 39.

Example 43

The ITM release layer of EXAMPLE 43 was prepared from Silopren® LSR 2530 (Momentive Performance Materials Inc., Waterford, N.Y.), a two-component liquid silicone rubber, in which the two components are mixed at a 1:1 ratio. The blanket was prepared substantially as described in EXAMPLE 39.

Example 44

The ITM release layer of EXAMPLE 44 has a composition that is substantially identical to that of EXAMPLE 4, but includes SR545 (Momentive Performance Materials Inc., Waterford, N.Y.), a commercially available silicone-based resin containing polar groups. The polar groups are of the "MQ" type, where "M" represents $Me_3SiO$ and "Q" represents $SiO_4$. The full composition is provided below:

| Component Name | Parts |
| --- | --- |
| DMS-V35 | 100 |
| VQM-146 | 40 |
| SR545 | 5 |
| Inhibitor 600 | 3 |
| SIP6831.2 | 0.1 |
| Crosslinker HMS-301 | 5 |

The blanket was prepared substantially as described in EXAMPLE 39.

Example 45

The ITM release layer of EXAMPLE 45 has a composition that is substantially identical to that of EXAMPLE 44, but includes polymer RV 5000, which includes vinyl-functional polydimethyl siloxanes having a high density of vinyl groups, as described hereinabove. The full composition is provided below:

| Component Name | Parts |
| --- | --- |
| DMS-V35 | 70 |
| RV 5000 | 30 |
| VQM-146 | 40 |
| Inhibitor 600 | 5 |
| SIP6831.2 | 0.1 |
| Crosslinker HMS-301 | 12 |
| SR545 | 5 |

The blanket was prepared substantially as described in EXAMPLE 39.

Comparative Examples 39A-39F

ITM release layers were prepared as "corresponding release layers" or "reference release layers" to the compositions of EXAMPLES 39-44, such that the corresponding release layers (designated Comparative Examples 39A-39F) had the identical compositions as Examples 39-44, respectively. However, during the curing of the release layer, the release layer surface (or "ink reception surface") was exposed to air ("standard air curing"), according to a conventional preparation procedure, provided below.

Comparative Blanket Preparation Procedure (for Release Layers Exposed to Air During Curing)

A first layer of Siloprene LSR 2530 was coated on a PET sheet, using a rod/knife, followed by curing for 3 min at 150° C., to achieve the desired thickness. An additional layer of Siloprene LSR 2530 was then coated on top of the previous (cured) silicone layer, and fiberglass fabric was incorporated into this wet, fresh layer such that wet silicone penetrated into the fabric structure. Siloprene LSR 2530 was then coated on top of the fiberglass fabric, and curing ensued at 150° C. for 3 minutes. Prior to forming the incipient release layer, all components of the release layer formulation were thoroughly mixed together. The release layer was coated on top of cured Siloprene LSR 2530 to achieve the desired thickness, and was subsequently cured at 150° C. for 3 minutes, while the release layer surface was exposed to air.

Example 46

Contact angles of drops of distilled water on release layer surfaces were measured using a dedicated Dataphysics OCA15 Pro contact angle-measuring device (Particle and Surface Sciences Pty. Ltd., Gosford, NSW, Australia). The procedure used for performing the Receding Contact Angle (RCA) and Advancing Contact Angle (ACA) measurements is a conventional technique elaborated by Dr. Roger P. Woodward ("Contact Angle Measurements Using the Drop Shape Method", inter alia, www.firsttenangstroms.com/pdfdocs/CAPaper.pdf).

The results for EXAMPLES 39-44 are provided below, along with the results for the release layers produced according to Comparative Examples 39A-39F.

In virtually all cases, the release surfaces produced against the carrier surfaces exhibited lower Receding Contact Angles than the identical formulation, cured in air. More typically, the release surfaces produced against the carrier surfaces exhibited Receding Contact Angles that were lower by at least 5°, at least 7°, at least 10°, at least 12°, or at least 15°, or were lower within a range of 5°-300, 7°-300, 10°-300, 5°-250, 5°-22°, 7°-25°, or 10°-25°.

Example 47

The release surfaces produced in EXAMPLES 39-44 and the respective release surfaces produced in Comparative Examples 39A-39F were aged at 160° C. for 2 hours, to simulate the aging of the release layer under extended operating conditions. Receding Contact Angles were measured, and the results are provided below:

| Release formulation | Release Surface vs. PET | | Comparative release formulation | Release Surface vs. Air | |
|---|---|---|---|---|---|
| | RCA before aging | RCA after aging | | RCA before aging | RCA after aging |
| Example 39 | 75° | 80° | Comparative Example 39A | 95° | 95° |
| Example 40 | 45° | 60° | Comparative Example 39B | 65° | 65° |
| Example 41 | 40° | 50° | Comparative Example 39C | 63° | 65° |
| Example 42 | 65° | 62° | Comparative Example 39D | 79° | 75° |
| Example 43 | 70° | 74° | Comparative Example 39E | 80° | 80° |
| Example 44 | 56° | 70° | Comparative Example 39F | 74° | 70° |

With regard to the comparative examples, it is evident that the receding contact angle is substantially maintained after performing the aging process. With regard to inventive Examples 39-44, however, it is evident that the receding contact angle increases, typically by 4°-15°, after performing the aging process. Without wishing to be bound by theory, the inventors believe that the increase in contact angle in the inventive release layer structures may be attributed to a loss in hydrophilic behavior (or increased hydrophobic behavior) due to some change in the position of the polar groups (e.g., Si—O—Si) at the release layer surface.

Example 47

The release layer produced in Example 2 was subjected to contact angle measurements. The receding contact angle was 45°. Significantly, the release layer surface of EXAMPLE 40, prepared against an anti-static PET carrier surface, displayed a receding contact angle that was about 50° less than the receding contact angle of the same composition prepared while exposed to air.

Example 48

The carrier surface utilized in EXAMPLE 40 was subjected to contact angle measurements, to determine both the advancing contact angle and the receding contact angle. The advancing contact angle was 40°, while the receding contact angle was 20°. Significantly, the hydrophilic behavior of the carrier surfaces has been at least partially induced in the respective release surfaces: the formulation cured while exposed to air has an RCA of 65°; the same formulation, prepared against an antistatic PET surface, has an RCA of 45°; the anti-static PET carrier used displays an RCA of 20°. Thus, this release layer structure has a release surface whose hydrophilicity/hydrophobicity properties lie in between the properties of the same formulation, cured in air, and the carrier surface itself.

Example 49

Release layer surface energies were calculated for ink reception surfaces of EXAMPLE 39, cured against an anti-static PET surface; and EXAMPLE 39, cured against an anti-static PET surface and then subjected to the standard aging procedure at 160° C., for 2 hours. These surfaces have the identical chemical formulation.

For each of these examples, the total surface energy was calculated using the classic "harmonic mean" method (also known as the Owens-Wendt Surface Energy Model, see, by way of example, KRUSS Technical Note TN306e). The results are provided below:

| Release formulation | Total Surface Energy J/m$^2$ |
|---|---|
| Example 39 -- Aged | 22.6 |
| Example 39 | 26.1 |

EXAMPLE 39, when cured against an anti-static PET surface, exhibited a total surface energy of about 26 J/m$^2$. After this formulation was subjected to the standard aging procedure, the total surface energy decreased from about 26 J/m$^2$ to under 23 J/m$^2$. This result would appear to corroborate the RCA results obtained for the various aged and un-aged materials of this exemplary formulation.

Example 50

Release layer surface energies were calculated for ink reception surfaces of the following Examples: EXAMPLE 40, cured against an anti-static PET surface; and EXAMPLE 40—Aged, cured against an anti-static PET surface and then subjected to the standard aging procedure at 160° C., for 2 hours. These examples have the identical chemical formulation.

As in EXAMPLE 49, the total surface energy was calculated using the classic "harmonic mean" method. The results are provided below:

| Release formulation | Total Surface Energy (J/m$^2$) |
|---|---|
| Example 40 -- Aged | 39.9 |
| Example 40 | 49.1 |

EXAMPLE 40, cured against an anti-static PET surface, exhibited a total surface energy of about 49 J/m$^2$, which is significantly less hydrophobic than the "air-cured" sample. After this formulation was subjected to the standard aging procedure, the total surface energy decreased from about 49 J/m$^2$ to about 40 J/m$^2$. This result would appear to corroborate the RCA results obtained for the various aged and un-aged materials of this exemplary formulation.

Example 51

The temperature on the blanket surface is maintained at 75° C. The image (typically a color gradient of 10-100%) is printed at a speed of 1.7 m/sec on the blanket, at a resolution of 1200 dpi. An uncoated paper (A4 Xerox Premium Copier Paper, 80 gsm) is set between the pressure roller and the blanket and the roller is pressed onto blanket, while the pressure is set to 3 bar. The roller moves on the paper, applying pressure on the contact line between blanket and paper and promoting the transfer process. In some cases, incomplete transfer may be observed, with an ink residue remaining on the blanket surface. In order to evaluate the extent of that ink residue, glossy paper (A4 Burgo glossy paper 130 gsm) is applied on the blanket similarly to the uncoated paper and the transfer process is again performed. Any ink that remained on blanket and was not transferred to the uncoated paper will be transferred to the glossy paper. Thus, the glossy paper may be evaluated for ink residue, according to the following scale (% of image surface area):

A—no visible residue
B—1-5% visible residue
C—more than 5% visible residue
Results of the evaluation are provided below:

| Release formulation | Transfer grade |
| --- | --- |
| Example 42 | B |
| Example 39 | B |
| Example 40 | A |
| Example 41 | A |
| Example 44 | C |

Example 52

EXAMPLE 51 was repeated for the release surfaces of EXAMPLES 40 and 41, but at a printing speed of 3.4 m/sec on the blanket Both release surfaces retained a transfer grade of A.

Example 53

The ITM release layer compositions of EXAMPLES 40 and 41 were cured against a PET substrate according to the procedure provided in EXAMPLE 39. The samples were then subjected to dynamic contact angle (DCA) measurements at 10 seconds and subsequently at 70 seconds, according to the following procedure:

The drop is placed onto a smooth PTFE film surface with as little drop falling as possible, so that kinetic energy does not spread the drop. A pendant drop is then formed. Subsequently, the specimen is raised until it touches the bottom of the drop. If the drop is large enough, the adhesion to the surface will pull it off the tip of the needle. The needle tip is positioned above the surface at such a height that the growing pendant drop will touch the surface and detach before it falls free due to its own weight.

The dynamic contact angle is then measured at 10 seconds and at 70 seconds. The results are provided below:

| | Dynamic contact angle Cured against PET | |
| --- | --- | --- |
| Example | after 10 sec | after 70 sec |
| Ex 2 | 105° | 97° |
| Ex 3 | 87° | 70° |

It is observed that the initial measurement of the dynamic contact angle, at 10 seconds, provides a strong indication of the hydrophilicity of the release layer surface. The subsequent measurement at 70 seconds provides an indication of the extent to which any liquid (such as a polyether glycol functionalized polydimethyl siloxane) disposed within the release layer has been incorporated into the drop. Such incorporation may further reduce the measured DCA.

Example 54

Figure 10A:
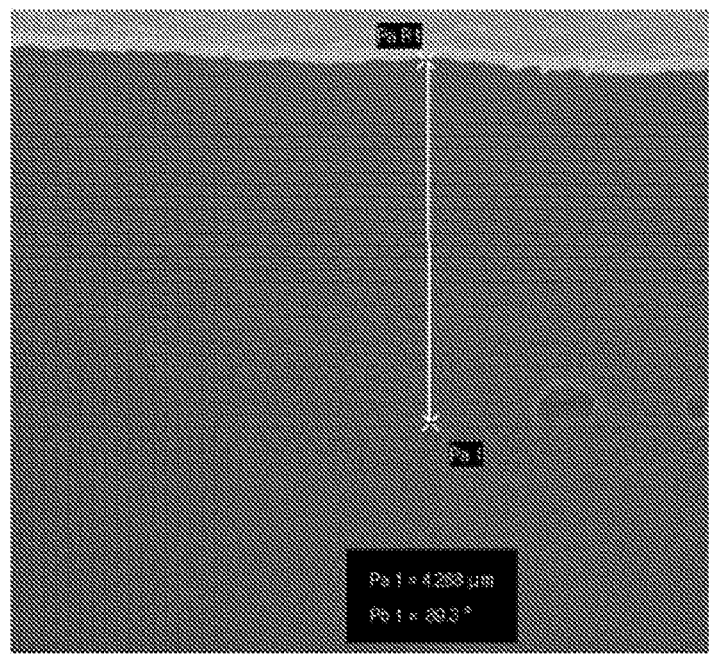
FIG. 10A is a SEM micrograph cross-section of a dried 2-part ink image, in which the $2^{nd}$ ink component was jetted onto a $1^{st}$ component layer that was substantially fully dry.

FIG. 10A is a SEM micrograph cross-section of a dried 2-part ink image, in which the $2^{nd}$ ink component (EXAMPLE 13) was jetted onto a $1^{st}$ component layer (EXAMPLE 2) that was substantially fully dry. Two distinct ink layers may be observed from the micrograph, a thinner layer that is of substantially homogeneous thickness of approximately 600 nm, on top of which is disposed a thicker layer that is also of substantially homogeneous thickness of approximately 2800 to 3000 nm.

Example 55

Figure 10B:
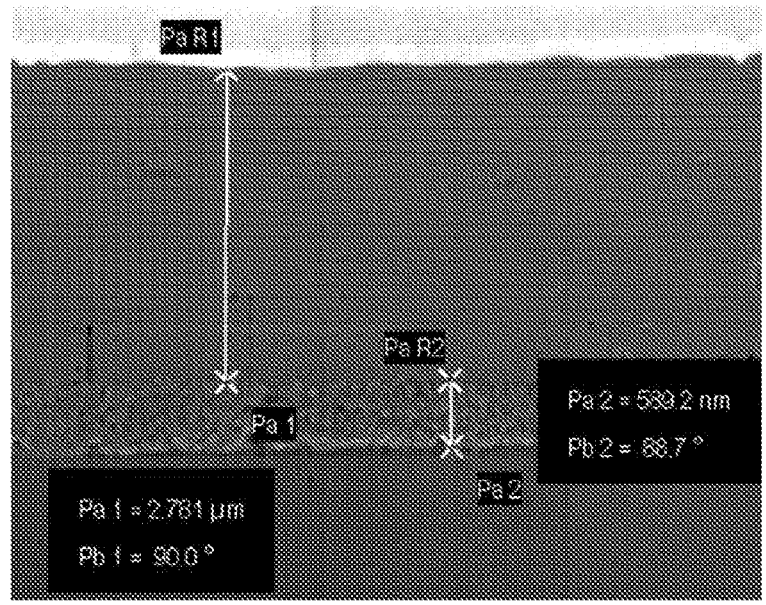
FIG. 10B is a SEM micrograph cross-section of a dried 2-part ink image, according to an embodiment of the present invention, in which the $2^{nd}$ ink component was jetted onto a $1^{st}$ ink component layer that was only partially dried.

FIG. 10B is a SEM micrograph cross-section of a dried 2-part ink image, according to an embodiment of the present invention, in which the $2^{nd}$ ink component of EXAMPLE 54 was jetted onto the $1^{st}$ ink component layer of EXAMPLE 54 that was only partially dried. This allowed the $2^{nd}$ ink component to fully penetrate into the $1^{st}$ ink component layer so as to form a single ink-image layer. The dry ink image is formed of a single ink layer (containing the solid residue from both the $1^{st}$ and $2^{nd}$ ink components) having a substantially homogeneous thickness of approximately 4000 nm.

Concluding Remarks

Unless otherwise defined, all technical and scientific terms used herein have the same meaning as commonly understood by one of ordinary skill in the art to which the invention pertains. In case of conflict, the specification, including definitions, will take precedence.

In the description and claims of the present disclosure, each of the verbs, "comprise" "include" and "have", and conjugates thereof, are used to indicate that the object or objects of the verb are not necessarily a complete listing of members, components, elements, steps or parts of the subject or subjects of the verb. These terms encompass the terms "consisting of" and "consisting essentially of".

As used herein, the singular form "a", "an" and "the" include plural references and mean "at least one" or "one or more" unless the context clearly dictates otherwise.

Unless otherwise stated, the use of the expression "and/or" between the last two members of a list of options for selection indicates that a selection of one or more of the listed options is appropriate and may be made.

As used herein in the specification and in the claims section that follows, the term "%" refers to percent by weight, unless specifically indicated otherwise.

Similarly, the term "ratio", as used herein in the specification and in the claims section that follows, refers to a weight ratio, unless specifically indicated otherwise.

In the disclosure, unless otherwise stated, adjectives such as "substantially" and "about" that modify a condition or relationship characteristic of a feature or features of an embodiment of the present technology, are to be understood to mean that the condition or characteristic is defined to within tolerances that are acceptable for operation of the embodiment for an application for which it is intended.

In the disclosure, unless otherwise stated, when a series of upper and lower limits are envisaged, every combination of upper and lower limits is explicitly envisaged. For example, in the following example where the transfer temperature $T_{TRANSFER}$ is at least 60° C., or at least 65° C., at least 70° C., or at least 75° C., at least 80° C., or at least 85° C., or at least 90° C., or at least 95° C., or at least 100° C., or at least 105° C., or at least 110° C., or at least 115° C. and the transfer temperature $T_{TRANSFER}$ is at most 65° C., or at most 70° C., or at most 75° C., or at most 80° C., or at most 85° C., or at most 90° C., or at most 95° C., or at most 100° C., or at most 105° C., or at most 110° C., or at most 115° C. Every individual temperature is explicitly envisaged: In some embodiments the transfer temperature $T_{TRANSFER}$ is at least 60° C. In some embodiments the transfer temperature $T_{TRANSFER}$ is at least 65° C. In some embodiments the transfer temperature $T_{TRANSFER}$ is at least 70° C. In some embodiments the transfer temperature $T_{TRANSFER}$ is at least 75° C. In some embodiments the transfer temperature $T_{TRANSFER}$ is at least 80° C. In some embodiments the transfer temperature $T_{TRANSFER}$ is at least 85° C. In some embodiments the transfer temperature $T_{TRANSFER}$ is at least 90° C. In some embodiments the transfer temperature $T_{TRANSFER}$ is at least 95° C. In some embodiments the transfer temperature $T_{TRANSFER}$ is at least 100° C. In some embodiments the transfer temperature $T_{TRANSFER}$ is at least 105° C. In some embodiments the transfer temperature $T_{TRANSFER}$ is at least 110° C. In some embodiments the transfer temperature $T_{TRANSFER}$ is at least 115° C.

In addition, every combination of upper and lower limits is explicitly envisaged including: transfer temperature $T_{TRANSFER}$ of 60° C.-65° C., 60° C.-70° C., 60° C.-75° C., 60° C.-80° C., 60° C.-85° C., 60° C.-90° C., 60° C.-95° C., 60° C.-100° C., 60° C.-105° C., 60° C.-110° C. and 60° C.-115° C.; 65° C.-70° C., 65° C.-75° C., 605° C.-80° C., 65° C.-85° C., 65° C.-90° C., 65° C.-95° C., 65° C.-100° C., 65° C.-105° C., 65° C.-110° C. and 65° C.-115° C., etc.

What is claimed is:

1. A method of printing a digital image on a printing substrate using an intermediate transfer member (ITM), the method comprising:
   a. providing:
      i. a first aqueous ink component; and
      ii. a second aqueous ink component comprising colorant particles;
   b. delivering a quantity of the first ink component to a target surface of the ITM, to cover a portion of the target surface with a wet volume of the first ink component;
   c. effecting only a partial drying of the wet volume to produce a partially-dried layer of the first ink component on the ITM;
   d. digitally depositing droplets of the second ink component onto the partially-dried layer of the first component so as to form a wet, colored ink-image on the ITM, wherein the partially-dried layer of the first ink component is sufficiently moist and permeable such that at least 50% the colorant particles of the second ink component penetrate into the partially-dried layer of the first ink component;
   e. at least partially drying the wet, colored ink-image;
   f. transferring the at least partially dried ink-image from the ITM to printing substrate.

2. The method of claim 1 wherein the at least partially dried ink-image is tacky upon transfer from the ITM in step (f).

3. The method of claim 1 wherein the drying of step (e) is performed at least in part by heating and/or the at least partially dried ink-image is heated on the ITM before the transfer.

4. The method of claim 1 wherein (i) the at least partial drying is performed to produce a dried, tacky ink-image-bearing residue film; and (ii) the dried, tacky ink-image-bearing residue film is transferred from the ITM to the printing substrate in step (f).

5. The method of claim 1, wherein the first aqueous ink component that is provided in step (a) is transparent.

6. The method of claim 1, wherein the second component is delivered in step (d) by ink-jetting, and wherein during ink-jetting of the second ink component and under jetting conditions, the second aqueous ink component is a resoluble ink component.

7. The method of claim 1, wherein at least 70% of the colorant particles of the second ink component penetrate into and mixed with the partially-dried layer of the first ink component.

8. The method of claim 1, wherein:
   A. upon transfer from the ITM, a temperature of the least partially dried ink-image is $T_{Transfer}$;
   B. a dry film glass transition temperature $T_g^{dry\_film}([2^{nd}$ component]) of the second ink component exceeds the transfer temperature $T_{TRANSFER}$ by at least 5° C.; and
   C. a dry film glass transition temperature $T_g^{dry\_film}([5:1\ 2^{nd}$ component: $1^{st}$ component]) of a 5:1 weight-ratio of the first and second components is less than the transfer temperature $T_{TRANSFER}$ by at least 5° C.

9. The method of claim 1 wherein:
   A. upon transfer from the ITM, a temperature of the least partially dried ink-image is $T_{Transfer}$;
   B. a dry film glass transition temperature $T_g^{dry\_film}([2^{nd}$ component]) of the second ink component exceeds the transfer temperature $T_{TRANSFER}$ by at least 5° C.; and
   B. a dry film glass transition temperature $T_g^{dry\_film}([1^{st}$ component]) of the first ink component is less than the transfer temperature $T_{TRANSFER}$ by at least 5° C.

10. The method of claim 1 wherein a ratio between
   A. upon transfer from the ITM, a temperature of the least partially dried ink-image is $T_{Transfer}$;
   B. a dry ink film dynamic viscosity $\mu_g^{dry\_film}([2^{nd}$ component], $T_{TRANSFER})$ of the second aqueous ink component at the transfer temperature $T_{TRANSFER}$; and
   C. a dry ink film dynamic viscosity $\mu_g^{dry\_film}$ ([5:1 $2^{nd}$ component: $1^{st}$ component], $T_{TRANSFER})$ of a 5:1 weight-ratio of the first and second components at the transfer temperature $T_{TRANSFER}$ is at least a positive number V, a value of V being at least 2.5.

11. The method of claim 1 wherein a ratio between
   A. upon transfer from the ITM, a temperature of the least partially dried ink-image is $T_{Transfer}$;
   B. a dry ink film dynamic viscosity $\mu_g^{dry\_film}([2^{nd}$ component], $T_{TRANSFER})$ of the second aqueous ink component at the transfer temperature $T_{TRANSFER}$; and
   C. a dry ink film dynamic viscosity $\mu_g^{dry\_film}([1^{st}$ component], $T_{TRANSFER})$ of the first aqueous ink component at the transfer temperature $T_{TRANSFER}$ is at least a positive number W, a value of W being 2 at least 3.

12. The method of claim 1, performed without forming a gel or gelatinous phase of the first aqueous ink component on the ITM surface.

13. The method of claim 1, wherein the provided first aqueous ink component (i) comprises between 40% wt/wt and 70% wt/wt water and (ii) further comprises at least 10% wt/wt binder.

14. The method of claim 1 wherein the provided first aqueous ink component is devoid of quaternary ammonium salts or comprises at most 0.25% quaternary ammonium salts, or their neutralized counterparts.

15. The method of claim 1, wherein the method is performed so that a ratio between (i) a thickness of a partially-dried layer of the first component when the droplets of the second aqueous ink component impact the partially-dried layer of the first ink component in step (d) and (ii) a thickness of the covering wet volume of the first component immediately upon application of the covering wet volume of the first component on the ITM surface is at most 0.5.

16. The method of claim 15, wherein the method is performed so that a ratio between (i) a thickness of a partially-dried layer of the first component when the droplets of the second aqueous ink component impact the partially-dried layer of the first ink component in step (d) and (ii) a thickness of the covering wet volume of the first component immediately upon application of the covering wet volume of the first component on the ITM surface is at least 0.25.

17. The method claim 1, wherein during step (d), the layer of the first component blocks the colorant particles of the second component from directly contacting the ITM surface so that, at a time of the transfer, a colorant-particle-free layer is present on the ITM surface below the colorant particles of the second component.

18. The method of claim 1, wherein during step (d) and while the layer of first component comprises at least 10% wt/wt water or at least 20% wt/wt water, the layer of the first component blocks the colorant particles of the second component from directly contacting the ITM surface so that, at a time of the transfer, a colorant-particle-free layer is present on the ITM surface below the colorant particles of the second component.

19. A system for indirect printing of a digital image on a printing substrate, the system comprising:
   a. a quantity of a first aqueous ink component;
   b. a quantity of a second aqueous ink component comprising colorant particles;
   c. an intermediate transfer member (ITM);
   b. a first print bar configured to deliver a quantity of the first ink component to a target surface of the ITM, to cover a portion of the target surface with a wet volume of the first ink component;
   d. a second print bar;
   e. a transport system for transporting material disposed on the ITM, the transport system configured to transport the wet volume, on the ITM, from the first to second print bars such that when the wet volume reaches the second print bar, the wet volume is only partially dried to produce a partially-dried layer of the first ink component on the ITM, wherein the second print bar is configured to digitally deposit droplets of the second ink component onto the partially-dried layer of the first component so as to form a wet, colored ink-image on the ITM, wherein the partially-dried layer of the first ink component is sufficiently moist and permeable such that at least 50% of the colorant particles of the second ink component penetrate into the partially-dried layer of the first ink component; and
   f. a transfer station disposed so that the transport system transports the web, colored ink-image so that it is at least partially tried upon reaching the transfer station, wherein the transfer station is configured to transfer the at least partially dried ink-image from the ITM to printing substrate.

20. The system of claim 19 wherein the first aqueous ink component is transparent.

21. The system of claim 19, configured such that at least 70% of the colorant particles of the second ink component penetrate into and mixed with the partially-dried layer of the first ink component.

22. The system of claim 19, configured such that at least 90% of the colorant particles of the second ink component penetrate into and mixed with the partially-dried layer of the first ink component.

23. The method of claim 1, wherein at least 90% of the colorant particles of the second ink component penetrate into and mixed with the partially-dried layer of the first ink component.

24. A method of printing a digital image on a printing substrate using an intermediate transfer member (ITM), the method comprising:
   a. providing:
      i. a first aqueous ink component; and
      ii. a second aqueous ink component comprising colorant particles;
   b. delivering a quantity of the first ink component to a target surface of the ITM, to cover a portion of the target surface with a wet volume of the first ink component;
   c. effecting only a partial drying of the wet volume to produce a partially-dried layer of the first ink component on the ITM;
   d. digitally depositing droplets of the second ink component onto the partially-dried layer of the first component so as to form a wet, colored ink-image on the ITM, wherein the partially-dried layer of the first ink component is sufficiently moist and permeable such that some or all the colorant particles of the second ink component penetrate into the partially-dried layer of the first ink component;
   e. at least partially drying the wet, colored ink-image;
   f. transferring the at least partially dried ink-image from the ITM to printing substrate,
wherein the method is performed such that a ratio between (i) a thickness of a partially-dried layer of the first component when the droplets of the second aqueous ink component impact the partially-dried layer of the first ink component in step (d) and (ii) a thickness of the covering wet volume of the first component immediately upon application of the covering wet volume of the first component on the ITM surface is at least 0.25.

25. The method of claim 24 wherein the ratio is at least 0.5.

26. A system for indirect printing of a digital image on a printing substrate, the system comprising:
   a. a quantity of a first aqueous ink component;
   b. a quantity of a second aqueous ink component comprising colorant particles;
   c. an intermediate transfer member (ITM);
   b. a first print bar configured to deliver a quantity of the first ink component to a target surface of the ITM, to cover a portion of the target surface with a wet volume of the first ink component;
   d. a second print bar;
   e. a transport system for transporting material disposed on the ITM, the transport system configured to transport the wet volume, on the ITM, from the first to second print bars such that when the wet volume reaches the second print bar, the wet volume is only partially dried to produce a partially-dried layer of the first ink component on the ITM, wherein the second print bar is configured to digitally deposit droplets of the second ink component onto the partially-dried layer of the first component so as to form a wet, colored ink-image on the ITM, wherein the partially-dried layer of the first ink component is sufficiently moist and permeable such that some or all the colorant particles of the second ink component penetrate into the partially-dried layer of the first ink component; and
   f. a transfer station disposed so that the transport system transports the web, colored ink-image so that it is at least partially tried upon reaching the transfer station, wherein the transfer station is configured to transfer the at least partially dried ink-image from the ITM to printing substrate,
wherein the system is configured such that a ratio between (i) a thickness of a partially-dried layer of the first component when the droplets of the second aqueous ink component impact the partially-dried layer of the first ink component in step (d) and (ii) a thickness of the covering wet volume of the first component immediately upon application of the covering wet volume of the first component on the ITM surface is at least 0.25.

27. The system of claim 26, configured such that the ratio is at least 0.5.

* * * * *